(12) United States Patent
Oren et al.

(10) Patent No.: US 11,873,160 B1
(45) Date of Patent: Jan. 16, 2024

(54) SYSTEMS AND METHODS FOR REMOTELY CONTROLLING PROPPANT DISCHARGE SYSTEM

(71) Applicant: Oren Technologies, LLC, Houston, TX (US)

(72) Inventors: John Oren, Houston, TX (US); Joshua Oren, Houston, TX (US); Peter Glynn, Houston, TX (US)

(73) Assignee: SANDBOX ENTERPRISES, LLC, Katy, TX (US)

( * ) Notice: Subject to any disclaimer, the term of this patent is extended or adjusted under 35 U.S.C. 154(b) by 0 days.

(21) Appl. No.: 14/808,737

(22) Filed: Jul. 24, 2015

Related U.S. Application Data

(60) Provisional application No. 62/145,047, filed on Apr. 9, 2015, provisional application No. 62/143,692, filed
(Continued)

(51) Int. Cl.
*B65D 88/54* (2006.01)
*B65D 88/26* (2006.01)
(Continued)

(52) U.S. Cl.
CPC ............. *B65D 88/54* (2013.01); *B65D 88/26* (2013.01); *B65D 90/66* (2013.01); *B65G 43/08* (2013.01);
(Continued)

(58) Field of Classification Search
CPC ........ B65G 43/08; B65G 43/10; B65G 65/40; B65G 2811/095; B65D 88/26; B65D 88/54; B65D 90/66
(Continued)

(56) References Cited

U.S. PATENT DOCUMENTS

| 137,871 A | 4/1873 | Worsley |
| 150,894 A | 5/1874 | Safely |

(Continued)

FOREIGN PATENT DOCUMENTS

| CA | 2023138 | 2/1992 |
| CA | 2791088 | 3/2013 |

(Continued)

OTHER PUBLICATIONS

International Search Report for PCT/US2015/024810, dated Jul. 8, 2015. (13 pages).

(Continued)

*Primary Examiner* — Timothy P. Kelly
*Assistant Examiner* — Stephanie A Shrieves
(74) *Attorney, Agent, or Firm* — Osha Bergman Watanabe & Burton LLP

(57) ABSTRACT

A proppant discharge system has a container with an outlet formed at a bottom thereof and a gate slidably affixed at the outlet so as to be movable between a first position covering the outlet and a second position opening the outlet, and a support structure having an actuator thereon. The container is removably positioned on the top surface of the support structure. The actuator is engageable with gate so as to move the gate from the first position to the second position. A conveyor underlies the container so as to receive proppant as discharged from the container through the outlet. The actuator and conveyor can be controlled remotely.

7 Claims, 32 Drawing Sheets

Related U.S. Application Data on Apr. 6, 2015, provisional application No. 62/142,221, filed on Apr. 2, 2015, provisional application No. 62/028,728, filed on Jul. 24, 2014.

(51) Int. Cl.
  *B65G 43/08* (2006.01)
  *B65D 90/66* (2006.01)
  *B65G 65/40* (2006.01)

(52) U.S. Cl.
  CPC ........ *B65G 65/40* (2013.01); *B65G 2811/095* (2013.01)

(58) Field of Classification Search
  USPC ......................................................... 141/83
  See application file for complete search history.

(56) References Cited

U.S. PATENT DOCUMENTS

| | | |
|---|---|---|
| 384,443 A | 6/1888 | Hoover |
| 448,238 A | 3/1891 | Johnson |
| 710,611 A | 10/1902 | Ray |
| 711,632 A | 10/1902 | Johnson |
| 917,649 A | 4/1909 | Otto |
| 1,143,641 A | 6/1915 | McGregor |
| 1,331,883 A | 2/1920 | Stuart |
| 1,344,768 A | 6/1920 | Messiter |
| 1,434,488 A | 11/1922 | Forsythe et al. |
| 1,520,560 A | 12/1923 | Burno |
| 1,506,936 A | 9/1924 | Lea |
| 1,526,527 A | 2/1925 | Butler |
| 1,573,664 A | 2/1926 | Wetherill |
| 1,807,447 A | 5/1931 | Smith |
| 1,850,000 A | 3/1932 | Fernand |
| 1,932,320 A | 10/1933 | Steward |
| 1,973,312 A | 9/1934 | Hardinge |
| 2,020,628 A | 11/1935 | Woodruff |
| 2,233,005 A | 2/1941 | Garlinghouse |
| 2,255,448 A | 9/1941 | Morris |
| 2,293,160 A * | 8/1942 | Miller .................... C10H 21/00 137/376 |
| 2,368,672 A | 2/1945 | McNamara |
| 2,381,103 A | 8/1945 | Frank |
| 2,385,245 A | 9/1945 | Willoughby |
| 2,413,661 A | 12/1946 | Stokes |
| 2,423,879 A | 7/1947 | De Frees |
| 2,563,470 A | 8/1951 | Kane |
| 2,564,020 A | 8/1951 | Mengel |
| 2,603,342 A | 7/1952 | Martinson |
| 2,616,758 A | 11/1952 | Meyers |
| 2,622,771 A | 12/1952 | Tulou |
| 2,652,174 A | 9/1953 | Shea et al. |
| 2,670,866 A | 3/1954 | Glesby |
| 2,678,145 A | 5/1954 | Ejuzwiak et al. |
| 2,693,282 A | 11/1954 | Sensibar |
| 2,700,574 A | 1/1955 | Tourneau |
| 2,792,262 A | 4/1955 | Hathorn |
| 2,774,515 A | 12/1956 | Johansson et al. |
| 2,791,973 A | 5/1957 | Dorey |
| 2,801,125 A | 7/1957 | Page et al. |
| 2,808,164 A | 10/1957 | Glendinning |
| 2,812,970 A | 11/1957 | Martinson |
| 2,837,369 A | 6/1958 | Stopps |
| 2,865,521 A | 12/1958 | Fisher et al. |
| 2,873,036 A | 2/1959 | Noble |
| 2,894,666 A | 7/1959 | Campbell, Jr. |
| 2,988,235 A | 6/1961 | Ronyak |
| 2,994,460 A | 8/1961 | Matthews |
| 3,041,113 A | 6/1962 | Sackett |
| 3,049,248 A | 8/1962 | Heltzel et al. |
| 3,064,832 A | 11/1962 | Heltzel |
| 3,083,879 A | 4/1963 | Coleman |
| 3,090,527 A | 5/1963 | Rensch |
| 3,109,389 A | 11/1963 | Karlsson |
| 3,122,258 A | 2/1964 | Raymond |
| 3,134,606 A | 5/1964 | Byler |
| 3,135,432 A | 6/1964 | McKinney |
| 3,163,127 A | 12/1964 | Gutridge et al. |
| 3,187,684 A | 6/1965 | Ortner |
| 3,198,494 A | 8/1965 | Curran et al. |
| 3,199,585 A | 8/1965 | Cronberger |
| 3,248,026 A | 4/1966 | Kemp |
| 3,255,927 A | 6/1966 | Ruppert et al. |
| 3,265,443 A | 8/1966 | Simas |
| 3,270,921 A | 9/1966 | Nadolske et al. |
| 3,281,006 A | 10/1966 | Wei |
| 3,294,306 A | 12/1966 | Areddy |
| 3,318,473 A | 5/1967 | Jones et al. |
| 3,326,572 A | 6/1967 | Murray |
| 3,343,688 A | 9/1967 | Ross |
| 3,353,599 A | 11/1967 | Swift |
| 3,354,918 A * | 11/1967 | Coleman .............. B65D 90/587 141/363 |
| 3,378,152 A | 4/1968 | Warner |
| 3,387,570 A | 6/1968 | Pulcrano et al. |
| 3,396,675 A | 8/1968 | Stevens |
| 3,397,654 A | 8/1968 | Snyder |
| 3,406,995 A | 10/1968 | McCarthy |
| 3,407,971 A | 10/1968 | Oehler |
| 3,425,599 A | 2/1969 | Sammarco et al. |
| 3,455,474 A | 7/1969 | Truncali |
| 3,476,270 A | 11/1969 | Cox et al. |
| 3,486,787 A | 12/1969 | Campbell |
| 3,499,694 A | 3/1970 | Coppel |
| 3,508,762 A | 4/1970 | Pratt |
| 3,524,567 A | 8/1970 | Coleman |
| 3,528,570 A | 9/1970 | Pase |
| 3,561,633 A | 2/1971 | Morrison et al. |
| 3,587,834 A | 6/1971 | Dugge |
| 3,596,609 A | 8/1971 | Ortner |
| 3,601,244 A | 8/1971 | Ort et al. |
| 3,602,400 A | 8/1971 | Cooke |
| 3,650,567 A | 3/1972 | Danielson |
| 3,653,521 A | 4/1972 | Bridge |
| 3,661,293 A | 5/1972 | Gerhard et al. |
| 3,692,363 A | 9/1972 | Tenebaum et al. |
| 3,704,797 A | 12/1972 | Suykens |
| 3,721,199 A | 3/1973 | Hassenauer |
| 3,729,121 A * | 4/1973 | Cannon ................ B65D 90/623 414/414 |
| 3,734,215 A | 5/1973 | Smith |
| 3,738,511 A | 6/1973 | Lemon et al. |
| 3,752,511 A | 8/1973 | Racy |
| 3,777,909 A | 12/1973 | Rheinfrank |
| 3,785,534 A | 1/1974 | Smith |
| 3,800,712 A | 4/1974 | Krug, Jr. |
| 3,802,584 A | 4/1974 | Sackett |
| 3,817,261 A | 6/1974 | Rogge |
| 3,820,762 A | 6/1974 | Bostrom et al. |
| 3,827,578 A | 8/1974 | Hough |
| 3,840,141 A | 10/1974 | Allom et al. |
| 3,854,612 A | 12/1974 | Snape |
| 3,861,716 A | 1/1975 | Baxter et al. |
| 3,883,005 A | 5/1975 | Stevens |
| 3,904,105 A | 9/1975 | Booth |
| 3,909,223 A | 9/1975 | Schmidt |
| 3,913,933 A | 10/1975 | Visser et al. |
| 3,933,100 A | 1/1976 | Dugge |
| 3,963,149 A | 6/1976 | Fassauer |
| 3,970,123 A | 7/1976 | Poulton et al. |
| 3,986,708 A | 10/1976 | Hellzel et al. |
| 3,997,089 A | 12/1976 | Clarke et al. |
| 3,999,290 A | 12/1976 | Wood |
| 4,003,301 A | 1/1977 | Norton |
| 4,004,700 A | 1/1977 | Empey |
| 4,019,635 A | 4/1977 | Boots |
| 4,057,153 A | 11/1977 | Weaver |
| 4,058,239 A | 11/1977 | Van Mill |
| 4,063,656 A | 12/1977 | Lambert |
| 4,073,410 A | 2/1978 | Melcher |
| 4,125,195 A | 11/1978 | Sasadi |
| 4,138,163 A | 2/1979 | Calvert et al. |
| 4,178,117 A | 12/1979 | Brugler |

(56) References Cited

U.S. PATENT DOCUMENTS

| | | |
|---|---|---|
| 4,204,773 A | 5/1980 | Bates |
| 4,210,273 A | 7/1980 | Hegele |
| 4,210,963 A | 7/1980 | Ricciardi et al. |
| RE30,358 E | 8/1980 | Sensibar |
| 4,222,498 A | 9/1980 | Brock |
| 4,227,732 A | 10/1980 | Kish |
| 4,232,884 A | 11/1980 | DeWitt |
| 4,239,424 A | 12/1980 | Pavolka |
| 4,245,820 A | 1/1981 | Muryn |
| 4,247,228 A | 1/1981 | Gray et al. |
| 4,247,370 A | 1/1981 | Nijhawan et al. |
| 4,258,953 A | 3/1981 | Johnson |
| 4,265,266 A | 5/1981 | Kierbow et al. |
| 4,278,190 A | 7/1981 | Oory et al. |
| 4,280,640 A | 7/1981 | Daloisio |
| 4,282,988 A | 8/1981 | Hulbert, Jr. |
| 4,287,921 A | 9/1981 | Sanford |
| 4,287,997 A | 9/1981 | Rolfe et al. |
| 4,289,353 A | 9/1981 | Merritt |
| 4,299,597 A | 11/1981 | Oetiker et al. |
| 4,306,895 A | 12/1981 | Thompson et al. |
| 4,329,106 A | 5/1982 | Adler |
| 4,350,241 A | 9/1982 | Wenzel |
| 4,359,176 A * | 11/1982 | Johnson ............... B61D 7/28 |
| | | 105/240 |
| 4,363,396 A | 12/1982 | Wolf et al. |
| 4,395,052 A | 7/1983 | Rash |
| 4,397,406 A | 8/1983 | Croley |
| 4,398,653 A | 8/1983 | Daloisio |
| 4,402,392 A | 9/1983 | Fabian et al. |
| 4,407,202 A | 10/1983 | McCormick |
| 4,408,886 A | 10/1983 | Sampson et al. |
| 4,410,106 A | 10/1983 | Kierbow et al. |
| 4,420,285 A | 12/1983 | Loyer et al. |
| 4,427,133 A | 1/1984 | Kierbow et al. |
| 4,428,504 A | 1/1984 | Bassett et al. |
| 4,449,861 A | 5/1984 | Saito et al. |
| 4,453,645 A | 6/1984 | Usui et al. |
| 4,474,204 A | 10/1984 | West |
| 4,475,672 A | 10/1984 | Whitehead |
| 4,478,155 A | 10/1984 | Cena et al. |
| 4,483,462 A | 11/1984 | Heintz |
| 4,513,755 A | 4/1985 | Baroni |
| 4,525,071 A | 6/1985 | Horowitz |
| 4,526,353 A | 7/1985 | Stomp |
| 4,532,098 A | 7/1985 | Campbell |
| 4,534,869 A | 8/1985 | Seibert |
| 4,552,573 A | 11/1985 | Weis |
| 4,569,394 A | 2/1986 | Sweatman et al. |
| 4,570,967 A | 2/1986 | Allnut |
| 4,571,143 A | 2/1986 | Hellerich |
| 4,588,605 A | 5/1986 | Frei et al. |
| 4,608,931 A | 9/1986 | Ruhmann et al. |
| 4,619,531 A | 10/1986 | Dunstan |
| 4,624,729 A | 11/1986 | Bresciani et al. |
| 4,626,155 A | 12/1986 | Hlinsky et al. |
| 4,626,166 A | 12/1986 | Jolly |
| 4,628,825 A | 12/1986 | Taylor et al. |
| 4,639,015 A | 1/1987 | Pitts |
| 4,648,584 A | 3/1987 | Wamser |
| 4,660,733 A | 4/1987 | Snyder et al. |
| 4,701,095 A | 10/1987 | Berryman et al. |
| 4,714,010 A | 12/1987 | Smart |
| 4,715,754 A | 12/1987 | Scully |
| 4,724,976 A | 2/1988 | Lee |
| 4,738,774 A | 4/1988 | Patrick |
| 4,741,273 A | 5/1988 | Sherwood |
| 4,761,039 A | 8/1988 | Hilaris |
| 4,779,751 A | 10/1988 | Munroe |
| 4,798,039 A | 1/1989 | Deglise |
| 4,801,389 A | 1/1989 | Brannon et al. |
| 4,819,830 A | 4/1989 | Schultz |
| 4,836,510 A | 6/1989 | Weber et al. |
| 4,836,735 A | 6/1989 | Dennehy |
| 4,848,605 A | 7/1989 | Wise |
| 4,882,784 A | 11/1989 | Tump |
| 4,889,219 A | 12/1989 | Key |
| 4,901,649 A | 2/1990 | Fehrenbach et al. |
| 4,909,378 A | 3/1990 | Webb |
| 4,909,556 A | 3/1990 | Koskinen |
| 4,917,019 A | 4/1990 | Hesch et al. |
| 4,919,583 A | 4/1990 | Speakman, Jr. |
| 4,923,358 A | 5/1990 | Van Mill |
| 4,946,068 A | 8/1990 | Erickson et al. |
| 4,947,760 A | 8/1990 | Dawson et al. |
| 4,949,714 A | 8/1990 | Orr |
| 4,954,975 A | 9/1990 | Kalata |
| 4,956,821 A | 9/1990 | Fenelon |
| 4,964,243 A | 10/1990 | Reiter |
| 4,975,205 A | 12/1990 | Sloan |
| 4,975,305 A | 12/1990 | Biginelli |
| 4,988,115 A | 1/1991 | Steinke |
| 4,995,522 A | 2/1991 | Barr |
| 5,004,400 A * | 4/1991 | Handke ............... B65G 43/08 |
| | | 414/296 |
| 5,028,002 A | 7/1991 | Whitford |
| 5,036,979 A | 8/1991 | Selz |
| 5,042,538 A | 8/1991 | Wiese |
| 5,069,352 A | 12/1991 | Harbolt et al. |
| 5,080,259 A | 1/1992 | Hadley |
| 5,082,304 A | 1/1992 | Preller |
| 5,102,281 A * | 4/1992 | Handke ............... G05D 9/12 |
| | | 414/296 |
| 5,102,286 A | 4/1992 | Fenton |
| 5,105,858 A | 4/1992 | Levinson |
| 5,131,524 A | 7/1992 | Uehara |
| 5,167,719 A | 12/1992 | Tamaki |
| 5,190,182 A | 3/1993 | Copas et al. |
| 5,195,861 A * | 3/1993 | Handke ............... B65G 43/08 |
| | | 414/296 |
| 5,199,826 A | 4/1993 | Lawrence |
| 5,201,546 A | 4/1993 | Lindsay |
| 5,224,635 A | 7/1993 | Wise |
| 5,253,746 A | 10/1993 | Friesen et al. |
| 5,253,776 A | 10/1993 | Decroix et al. |
| 5,265,763 A | 11/1993 | Heinrici et al. |
| 5,277,014 A | 1/1994 | White |
| 5,280,883 A | 1/1994 | Ibar |
| 5,286,158 A | 2/1994 | Zimmerman |
| 5,286,294 A | 2/1994 | Ebi et al. |
| 5,290,139 A | 3/1994 | Hedrick |
| 5,317,783 A | 6/1994 | Williamson |
| 5,320,046 A | 6/1994 | Hesch |
| 5,324,097 A | 6/1994 | DeCap |
| 5,339,996 A | 8/1994 | Dubbert |
| 5,345,982 A | 9/1994 | Nadeau et al. |
| 5,358,137 A | 10/1994 | Shuert et al. |
| 5,373,792 A | 12/1994 | Pileggi et al. |
| 5,392,946 A | 2/1995 | Holbrook et al. |
| 5,402,915 A | 4/1995 | Hogan |
| 5,413,154 A * | 5/1995 | Hurst, Jr. ............... B28C 7/0481 |
| | | 141/105 |
| 5,429,259 A | 7/1995 | Robin |
| 5,441,321 A | 8/1995 | Karpisek |
| 5,445,289 A | 8/1995 | Owen |
| 5,465,829 A | 11/1995 | Kruse |
| 5,470,175 A | 11/1995 | Jensen et al. |
| 5,470,176 A | 11/1995 | Corcoran et al. |
| 5,493,852 A | 2/1996 | Stewart |
| 5,498,119 A | 3/1996 | Faivre |
| 5,507,514 A | 4/1996 | Jacques |
| 5,538,286 A | 7/1996 | Hoff |
| 5,549,278 A | 8/1996 | Sidler |
| 5,564,599 A | 10/1996 | Barber et al. |
| 5,570,743 A | 11/1996 | Padgett et al. |
| 5,590,976 A | 1/1997 | Kilheffer et al. |
| 5,601,181 A | 2/1997 | Lindhorst |
| 5,602,761 A | 2/1997 | Spoerre et al. |
| 5,613,446 A | 3/1997 | DiLuigi et al. |
| 5,617,974 A | 4/1997 | Sawyer |
| 5,647,514 A | 7/1997 | Toth et al. |
| RE35,580 E | 8/1997 | Heider et al. |
| 5,667,298 A | 9/1997 | Musil |
| 5,687,881 A | 11/1997 | Rouse et al. |

(56) References Cited

U.S. PATENT DOCUMENTS

| | | |
|---|---|---|
| 5,690,466 A | 11/1997 | Gaddis et al. |
| 5,697,535 A | 12/1997 | Coleman |
| 5,706,614 A | 1/1998 | Wiley et al. |
| 5,718,555 A | 2/1998 | Swalheim |
| 5,722,552 A | 3/1998 | Olson |
| 5,722,688 A | 3/1998 | Garcia |
| 5,746,258 A | 5/1998 | Huck |
| 5,761,854 A | 6/1998 | Johnson et al. |
| 5,762,222 A | 6/1998 | Liu |
| 5,772,390 A | 6/1998 | Walker |
| 5,782,524 A | 7/1998 | Heider et al. |
| 5,785,421 A | 7/1998 | Milek |
| 5,803,296 A | 9/1998 | Olson |
| 5,806,863 A | 9/1998 | Heger et al. |
| 5,836,480 A | 11/1998 | Epp et al. |
| 5,845,799 A | 12/1998 | Deaton |
| 5,876,172 A | 3/1999 | Di Rosa |
| 5,878,903 A | 3/1999 | Ung |
| 5,906,471 A | 5/1999 | Schwoerer |
| 5,911,337 A | 6/1999 | Bedeker |
| 5,924,829 A | 7/1999 | Hastings |
| 5,927,558 A | 7/1999 | Bruce |
| 5,960,974 A | 10/1999 | Kee |
| 5,967,429 A * | 10/1999 | Ulfik ............... B02C 19/06 241/33 |
| 5,971,219 A | 10/1999 | Karpisek |
| 5,993,202 A | 11/1999 | Yamazaki et al. |
| 5,997,099 A | 12/1999 | Collins |
| 6,002,063 A | 12/1999 | Bilak et al. |
| 6,006,918 A | 12/1999 | Hart |
| 6,069,118 A | 5/2000 | Hinkel et al. |
| 6,077,068 A | 6/2000 | Okumura |
| 6,092,974 A | 7/2000 | Roth |
| 6,109,486 A | 8/2000 | Lee |
| 6,120,233 A | 9/2000 | Adam |
| D431,358 S | 10/2000 | Willemsen |
| 6,155,175 A | 12/2000 | Rude et al. |
| 6,186,654 B1 | 2/2001 | Gunteret et al. |
| 6,190,107 B1 | 2/2001 | Lanigan et al. |
| 6,192,985 B1 | 2/2001 | Hinkel et al. |
| 6,196,590 B1 | 3/2001 | Kim |
| 6,205,938 B1 | 3/2001 | Foley et al. |
| 6,210,088 B1 | 4/2001 | Crosby |
| 6,231,284 B1 | 5/2001 | Kordel |
| 6,247,594 B1 | 6/2001 | Garton |
| 6,263,803 B1 | 7/2001 | Dohr et al. |
| 6,269,849 B1 | 8/2001 | Fields |
| 6,273,154 B1 | 8/2001 | Laug |
| 6,283,212 B1 | 9/2001 | Hinkel et al. |
| 6,286,986 B2 | 9/2001 | Grimland |
| 6,296,109 B1 | 10/2001 | Nohl |
| 6,306,800 B1 | 10/2001 | Samuel et al. |
| 6,328,156 B1 | 12/2001 | Otsman |
| 6,328,183 B1 | 12/2001 | Coleman |
| 6,364,584 B1 | 4/2002 | Taylor |
| 6,374,915 B1 | 4/2002 | Andrews |
| 6,382,446 B1 | 5/2002 | Hinkle et al. |
| 6,390,742 B1 | 5/2002 | Breeden |
| 6,401,983 B1 * | 6/2002 | McDonald ............ B60P 1/56 220/1.5 |
| 6,412,422 B2 | 7/2002 | Dohr et al. |
| 6,415,909 B1 | 7/2002 | Mitchell et al. |
| 6,416,271 B1 | 7/2002 | Pigott et al. |
| 6,422,413 B1 | 7/2002 | Hall et al. |
| 6,425,725 B1 | 7/2002 | Ehlers |
| 6,450,522 B1 | 9/2002 | Yamada et al. |
| 6,457,291 B2 | 10/2002 | Wick |
| 6,498,976 B1 | 12/2002 | Ehlbeck et al. |
| 6,505,760 B1 | 1/2003 | Werner |
| 6,508,387 B1 | 1/2003 | Simon et al. |
| 6,508,615 B2 | 1/2003 | Taylor |
| 6,523,482 B2 | 2/2003 | Wingate |
| 6,537,002 B2 | 3/2003 | Gloystein |
| 6,557,896 B1 | 5/2003 | Stobart |
| 6,575,614 B2 | 6/2003 | Tosco et al. |
| 6,660,693 B2 | 12/2003 | Miller et al. |
| 6,663,373 B2 | 12/2003 | Yoshida |
| 6,666,573 B2 | 12/2003 | Grassi |
| 6,675,066 B2 * | 1/2004 | Moshgbar ............ B65G 43/08 198/678.1 |
| 6,675,073 B2 | 1/2004 | Kieman et al. |
| 6,705,449 B2 | 3/2004 | Wagstaffe |
| 6,720,290 B2 | 4/2004 | England et al. |
| 6,772,912 B1 | 8/2004 | Schall et al. |
| 6,774,318 B2 | 8/2004 | Beal et al. |
| 6,776,235 B1 | 8/2004 | England |
| 6,783,032 B2 | 8/2004 | Fons |
| 6,811,048 B2 | 11/2004 | Lau |
| 6,828,280 B2 | 12/2004 | England et al. |
| 6,835,041 B1 | 12/2004 | Albert |
| 6,882,960 B2 | 4/2005 | Miller |
| 6,902,061 B1 | 6/2005 | Elstone |
| 6,915,854 B2 | 7/2005 | England et al. |
| 6,953,119 B1 | 10/2005 | Wening |
| 6,955,127 B2 | 10/2005 | Taylor |
| 6,964,551 B1 | 11/2005 | Friesen |
| 6,968,946 B2 | 11/2005 | Shuert |
| 6,974,021 B1 | 12/2005 | Boevers |
| 7,008,163 B2 | 3/2006 | Russell |
| 7,051,661 B2 | 5/2006 | Herzog et al. |
| 7,084,095 B2 | 8/2006 | Lee et al. |
| 7,104,425 B2 * | 9/2006 | Le Roy ............... B65D 88/128 220/1.5 |
| 7,140,516 B2 | 11/2006 | Bothor |
| 7,146,914 B2 | 12/2006 | Morton et al. |
| 7,201,290 B2 | 4/2007 | Mehus et al. |
| 7,214,028 B2 | 5/2007 | Boasso |
| 7,240,681 B2 | 7/2007 | Saik |
| 7,252,309 B2 | 8/2007 | Eng Soon et al. |
| 7,284,579 B2 | 10/2007 | Elgan et al. |
| 7,284,670 B2 | 10/2007 | Schmid |
| 7,316,333 B2 * | 1/2008 | Wegner ............... B65D 88/005 222/181.1 |
| 7,367,271 B2 | 5/2008 | Early |
| 7,377,219 B2 | 5/2008 | Brandt |
| 7,410,623 B2 | 8/2008 | Mehus et al. |
| 7,475,796 B2 | 1/2009 | Garton |
| 7,500,817 B2 | 3/2009 | Furrer et al. |
| 7,513,280 B2 | 4/2009 | Brashears et al. |
| 7,591,386 B2 | 9/2009 | Hooper |
| 7,640,075 B2 * | 12/2009 | Wietgrefe ............ B65D 90/66 198/530 |
| 7,695,538 B2 | 4/2010 | Cheng |
| 7,753,637 B2 | 7/2010 | Benedict et al. |
| 7,798,558 B2 | 9/2010 | Messier |
| 7,802,958 B2 | 9/2010 | Garcia et al. |
| 7,803,321 B2 | 9/2010 | Lark et al. |
| 7,837,427 B2 | 11/2010 | Beckel |
| 7,841,394 B2 | 11/2010 | McNeel et al. |
| 7,845,516 B2 | 12/2010 | Pessin et al. |
| 7,858,888 B2 | 12/2010 | Lucas et al. |
| 7,867,613 B2 | 1/2011 | Smith |
| 7,891,304 B2 | 2/2011 | Herzog et al. |
| 7,891,523 B2 | 2/2011 | Mehus et al. |
| 7,896,198 B2 | 3/2011 | Mehus et al. |
| 7,921,783 B2 | 4/2011 | Forbes et al. |
| 7,967,161 B2 | 6/2011 | Townsend |
| 7,980,803 B2 | 7/2011 | Brandstätter et al. |
| 7,997,213 B1 * | 8/2011 | Gauthier ............. B65D 88/022 108/53.1 |
| 7,997,623 B2 | 8/2011 | Williams |
| 8,083,083 B1 | 12/2011 | Mohns |
| 8,201,520 B2 | 6/2012 | Meritt |
| 8,313,278 B2 | 11/2012 | Simmons et al. |
| 8,366,349 B2 | 2/2013 | Beachner |
| 8,375,690 B2 | 2/2013 | LaFargue et al. |
| 8,379,927 B2 | 2/2013 | Taylor |
| 8,387,824 B2 | 3/2013 | Wietgrefe |
| 8,393,502 B2 | 3/2013 | Renyer et al. |
| 8,424,666 B2 | 4/2013 | Berning et al. |
| 8,469,065 B2 | 6/2013 | Schroeder et al. |
| D688,351 S | 8/2013 | Oren |
| 8,505,780 B2 | 8/2013 | Oren |
| 8,544,419 B1 | 10/2013 | Spalding et al. |

(56) References Cited

U.S. PATENT DOCUMENTS

| | | |
|---|---|---|
| 8,545,148 B2 | 10/2013 | Wanek-Pusset et al. |
| 8,562,022 B2 | 10/2013 | Nadeau et al. |
| 8,573,387 B2 | 11/2013 | Trimble |
| 8,573,917 B2 | 11/2013 | Renyer |
| 8,585,341 B1 * | 11/2013 | Oren .................... B65D 90/587 414/407 |
| D694,670 S | 12/2013 | Oren |
| 8,616,370 B2 | 12/2013 | Allegretti |
| 8,622,251 B2 | 1/2014 | Oren |
| 8,636,832 B2 | 1/2014 | Stutzman et al. |
| 8,646,641 B2 | 2/2014 | Moir |
| 8,662,525 B1 | 3/2014 | Dierks et al. |
| 8,668,430 B2 | 3/2014 | Oren |
| D703,582 S | 4/2014 | Oren |
| 8,820,559 B2 | 9/2014 | Beitler et al. |
| 8,827,118 B2 | 9/2014 | Oren |
| 8,881,749 B1 | 11/2014 | Smith |
| 8,887,914 B2 | 11/2014 | Allegretti |
| 8,905,266 B2 | 12/2014 | De Brabanter |
| 8,915,691 B2 | 12/2014 | Mintz |
| 9,051,801 B1 | 6/2015 | Mintz |
| 9,052,034 B1 | 6/2015 | Wegner et al. |
| D740,556 S | 10/2015 | Huber |
| 9,162,261 B1 | 10/2015 | Smith |
| 9,267,266 B2 | 2/2016 | Cutler et al. |
| 9,296,572 B2 | 3/2016 | Houghton et al. |
| 9,309,064 B2 | 4/2016 | Sheesley |
| 9,410,414 B2 | 8/2016 | Tudor |
| D780,883 S | 3/2017 | Schaffner et al. |
| D783,771 S | 4/2017 | Stegemoeller et al. |
| D783,772 S | 4/2017 | Stegemoeller, III et al. |
| 9,624,036 B2 | 4/2017 | Luharuka et al. |
| 9,688,492 B2 | 6/2017 | Stutzman et al. |
| 9,796,318 B1 | 10/2017 | Nolasco |
| 2001/0022308 A1 | 9/2001 | Epp et al. |
| 2001/0038777 A1 | 11/2001 | Cassell |
| 2001/0045338 A1 | 11/2001 | Ransil et al. |
| 2002/0134550 A1 | 9/2002 | Leeson et al. |
| 2002/0139643 A1 | 10/2002 | Peltier et al. |
| 2003/0006248 A1 | 1/2003 | Gill et al. |
| 2003/0024971 A1 | 2/2003 | Jones |
| 2003/0111470 A1 | 6/2003 | Fouillet et al. |
| 2003/0145418 A1 | 8/2003 | Ikeda et al. |
| 2003/0156929 A1 | 8/2003 | Russell |
| 2004/0065699 A1 | 4/2004 | Schoer et al. |
| 2004/0074922 A1 | 4/2004 | Bother et al. |
| 2004/0084874 A1 | 5/2004 | McDougall et al. |
| 2004/0206646 A1 | 10/2004 | Goh |
| 2004/0245284 A1 | 12/2004 | Mehus et al. |
| 2005/0158158 A1 | 7/2005 | Porta |
| 2005/0201851 A1 | 9/2005 | Jonkka |
| 2006/0012183 A1 | 1/2006 | Marchiori et al. |
| 2006/0027582 A1 | 2/2006 | Beach |
| 2006/0053582 A1 | 3/2006 | Engel et al. |
| 2006/0091072 A1 | 5/2006 | Schmid et al. |
| 2006/0151058 A1 | 7/2006 | Salaoras et al. |
| 2006/0180062 A1 | 8/2006 | Furrer et al. |
| 2006/0180232 A1 | 8/2006 | Glewwe et al. |
| 2006/0239806 A1 | 10/2006 | Yelton |
| 2006/0267377 A1 | 11/2006 | Lusk et al. |
| 2006/0277783 A1 | 12/2006 | Garton |
| 2006/0289166 A1 | 12/2006 | Stromquist et al. |
| 2007/0096537 A1 | 5/2007 | Hicks |
| 2007/0125543 A1 | 6/2007 | McNeel et al. |
| 2007/0194564 A1 | 8/2007 | Garceau et al. |
| 2008/0008562 A1 | 1/2008 | Beckel et al. |
| 2008/0029546 A1 | 2/2008 | Shuld |
| 2008/0029553 A1 | 2/2008 | Culleton |
| 2008/0058228 A1 | 3/2008 | Wilson |
| 2008/0017905 A1 | 7/2008 | McGough et al. |
| 2008/0179054 A1 | 7/2008 | McGough et al. |
| 2008/0179324 A1 | 7/2008 | McGough et al. |
| 2008/0213073 A1 | 9/2008 | Benedict et al. |
| 2008/0226434 A1 | 9/2008 | Smith et al. |
| 2008/0264641 A1 | 10/2008 | Slabaugh et al. |
| 2008/0277423 A1 | 11/2008 | Garton |
| 2008/0315558 A1 | 12/2008 | Cesterino |
| 2009/0038242 A1 | 2/2009 | Cope |
| 2009/0078410 A1 * | 3/2009 | Krenek ................ B60P 1/6418 206/525 |
| 2009/0223143 A1 | 9/2009 | Esposito |
| 2009/0278326 A1 | 11/2009 | Rowland et al. |
| 2010/0021258 A1 | 1/2010 | Kim |
| 2010/0037572 A1 | 2/2010 | Cheng |
| 2010/0038143 A1 | 2/2010 | Burnett et al. |
| 2010/0040446 A1 | 2/2010 | Renyer |
| 2010/0065466 A1 | 3/2010 | Perkins |
| 2010/0072308 A1 | 3/2010 | Hermann et al. |
| 2010/0080681 A1 | 4/2010 | Bain |
| 2010/0108711 A1 | 5/2010 | Wietgrefe |
| 2010/0129193 A1 | 5/2010 | Sherrer |
| 2010/0199668 A1 | 8/2010 | Coustou et al. |
| 2010/0207371 A1 | 8/2010 | Van Houdt et al. |
| 2010/0278621 A1 | 11/2010 | Redekop |
| 2010/0288603 A1 | 11/2010 | Schafer |
| 2010/0320727 A1 | 12/2010 | Haut et al. |
| 2011/0011893 A1 | 1/2011 | Cerny |
| 2011/0017693 A1 | 1/2011 | Thomas |
| 2011/0101040 A1 | 5/2011 | Weissbrod |
| 2011/0109703 A1 | 5/2011 | Williams |
| 2011/0121003 A1 | 5/2011 | Moir |
| 2011/0127178 A1 | 6/2011 | Claussen |
| 2011/0160104 A1 | 6/2011 | Wu et al. |
| 2011/0162838 A1 | 7/2011 | Mackenzie et al. |
| 2011/0168593 A1 | 7/2011 | Neufeld et al. |
| 2011/0222983 A1 | 9/2011 | Dugic et al. |
| 2011/0297702 A1 | 12/2011 | Hildebrandt et al. |
| 2012/0017812 A1 | 1/2012 | Renyer |
| 2012/0090956 A1 | 4/2012 | Brobst |
| 2012/0103848 A1 | 5/2012 | Allegretti et al. |
| 2012/0219391 A1 | 8/2012 | Teichrob et al. |
| 2012/0247335 A1 | 10/2012 | Stutzman et al. |
| 2012/0255539 A1 | 10/2012 | Kolecki |
| 2013/0004272 A1 * | 1/2013 | Mintz .................. B65D 88/54 414/304 |
| 2013/0022441 A1 | 1/2013 | Uhryn et al. |
| 2013/0206415 A1 * | 8/2013 | Sheesley ............... B65G 65/00 166/308.1 |
| 2013/0209204 A1 | 8/2013 | Sheesley |
| 2013/0233545 A1 | 9/2013 | Mahoney |
| 2013/0284729 A1 | 10/2013 | Cook et al. |
| 2013/0309052 A1 | 11/2013 | Luharuka |
| 2013/0323005 A1 | 12/2013 | Rexius et al. |
| 2014/0020765 A1 | 1/2014 | Oren |
| 2014/0020892 A1 | 1/2014 | Oren |
| 2014/0023465 A1 | 1/2014 | Oren et al. |
| 2014/0034662 A1 | 2/2014 | Chalmers et al. |
| 2014/0044507 A1 | 2/2014 | Naizer et al. |
| 2014/0076569 A1 * | 3/2014 | Pham .................. B65D 88/54 166/305.1 |
| 2014/0077484 A1 | 3/2014 | Harrell |
| 2014/0083554 A1 | 3/2014 | Harris |
| 2014/0093319 A1 | 4/2014 | Harris et al. |
| 2014/0097182 A1 | 4/2014 | Sheesley |
| 2014/0166647 A1 | 6/2014 | Sheesley |
| 2014/0202590 A1 | 7/2014 | Higgins |
| 2014/0203046 A1 | 7/2014 | Allegretti |
| 2014/0234059 A1 | 8/2014 | Thomeer |
| 2014/0305769 A1 * | 10/2014 | Eiden, III .............. B65G 65/42 222/173 |
| 2014/0321950 A1 | 10/2014 | Krenek et al. |
| 2014/0377042 A1 | 12/2014 | McMahon |
| 2015/0004895 A1 | 1/2015 | Hammers et al. |
| 2015/0069052 A1 | 3/2015 | Allegretti et al. |
| 2015/0079890 A1 | 3/2015 | Stutzman et al. |
| 2015/0086307 A1 | 3/2015 | Stefan |
| 2015/0086308 A1 | 3/2015 | McIver et al. |
| 2015/0107822 A1 | 4/2015 | Tudor |
| 2015/0110565 A1 | 4/2015 | Harris |
| 2015/0115589 A1 | 4/2015 | Thiessen |
| 2015/0159232 A1 | 6/2015 | Zucchi et al. |
| 2015/0209829 A1 | 7/2015 | De Siqueira et al. |
| 2015/0284183 A1 | 10/2015 | Houghton et al. |
| 2016/0148813 A1 | 5/2016 | Rogers et al. |

(56) References Cited

U.S. PATENT DOCUMENTS

| | | |
|---|---|---|
| 2016/0177678 A1 | 6/2016 | Morris et al. |
| 2016/0185522 A1 | 6/2016 | Herman et al. |
| 2016/0273355 A1 | 9/2016 | Gosney et al. |
| 2016/0280480 A1 | 9/2016 | Smith et al. |
| 2017/0129721 A1 | 5/2017 | Harris et al. |
| 2017/0217353 A1 | 8/2017 | Vander Pol |
| 2018/0009401 A1 | 1/2018 | Miller et al. |

FOREIGN PATENT DOCUMENTS

| | | | | |
|---|---|---|---|---|
| CN | 2037354 | 5/1989 | | |
| CN | 2059909 | 8/1990 | | |
| CN | 2075632 | 4/1991 | | |
| CN | 1329562 | 1/2002 | | |
| CN | 2517684 | 10/2002 | | |
| CN | 1635965 | 7/2005 | | |
| CN | 2913250 | 6/2007 | | |
| CN | 201161588 | 12/2008 | | |
| CN | 201390486 | 1/2010 | | |
| CN | 101823630 | 9/2010 | | |
| CN | 102101595 | 6/2011 | | |
| CN | 201881469 | 6/2011 | | |
| CN | 102114985 | 7/2011 | | |
| CN | 203033469 | 7/2013 | | |
| CN | 103350017 | 10/2013 | | |
| CN | 203580948 | 5/2014 | | |
| DE | 3108121 | 9/1982 | | |
| DE | 3342281 | 6/1985 | | |
| DE | 4008147 | 9/1990 | | |
| DE | 4217329 | 5/1993 | | |
| DE | 20317967 | 3/2004 | | |
| EP | 0016977 | 10/1980 | | |
| EP | 0019967 | 12/1980 | | |
| EP | 322283 | 6/1989 | | |
| EP | 0564969 | 10/1993 | | |
| EP | 0997607 | 5/2000 | | |
| EP | 1052194 | 11/2000 | | |
| EP | 1167236 | 1/2002 | | |
| EP | 1598288 | 11/2005 | | |
| EP | 1775190 | 4/2007 | | |
| EP | 1795467 | 6/2007 | | |
| EP | 2062832 | 5/2009 | | |
| EP | 2311757 | 4/2011 | | |
| FR | 2173445 | 10/1973 | | |
| FR | 2640598 | 6/1990 | | |
| GB | 1000621 | 8/1965 | | |
| GB | 1296736 | 11/1972 | | |
| GB | 1333976 | 10/1973 | | |
| GB | 2066220 | 7/1981 | | |
| GB | 2204847 | 11/1988 | | |
| GB | 2374864 | 10/2002 | | |
| JP | S4871029 | 9/1973 | | |
| JP | S4876041 | 9/1973 | | |
| JP | S58161888 | 10/1983 | | |
| JP | 410087046 | 4/1998 | | |
| JP | 410087046 A | * | 4/1998 | ............ B64G 21/20 |
| JP | 10264882 | 10/1998 | | |
| JP | 11034729 | 2/1999 | | |
| JP | 2007084151 | 4/2007 | | |
| MX | 2012011046 | 5/2013 | | |
| NL | 8105283 | 6/1983 | | |
| WO | 1990008082 | 7/1990 | | |
| WO | 1992002437 | 2/1992 | | |
| WO | 1993001997 | 2/1993 | | |
| WO | 1993006031 | 4/1993 | | |
| WO | 1996025302 | 8/1996 | | |
| WO | 2003024815 | 3/2003 | | |
| WO | 2006039757 | 4/2006 | | |
| WO | 2007005054 | 1/2007 | | |
| WO | 2007057398 | 5/2007 | | |
| WO | 2007061310 | 5/2007 | | |
| WO | 2008012513 | 1/2008 | | |
| WO | 2009087338 | 7/2009 | | |
| WO | 2010026235 | 3/2010 | | |
| WO | 2012021447 | 2/2012 | | |
| WO | 2012058059 | 5/2012 | | |
| WO | 2011099358 | 6/2013 | | |

OTHER PUBLICATIONS

European Search Report for Application No. 15167039.5, dated Sep. 8, 2015. (7 pages).
SandBox Logistics, "Mine to Wellhead Logistics," Houston, TX, May 2013.
SandBox Logistics, screenshots from video made in Apr. 2013 and publicly shown in May 2013, Arnegard, North Dakota.
International Search Report for PCT/US15/35635, dated Oct. 30, 2015. (12 pages).
PCT International Search Report for PCT/US15/49074, dated Dec. 17, 2015. (11 pages).
PCT International Search Report for PCT/US15/57601, dated May 6, 2016. (11 pages).
SandBox Logistics, LLC, screenshots from video dated Sep. 19, 2013.
SandBox Logistics, LLC, screenshots from video dated Aug. 22, 2014.
SandBox Logistics, LLC, screenshots from video dated Oct. 11, 2013.
SandBox Logistics, LLC, screenshots from video dated Apr. 10, 2013.
Grit Energy Solutions, LLC, Fidelity, Screenshots from video dated May 16, 2014.
Grit Energy Solutions, LLC, Gate, Screenshots from video dated Dec. 6, 2013, https://www.youtube.com/user/gritstack.
Grit Energy Solutions, LLC, Screen, Screenshots from video dated Dec. 6, 2013, https://www.youtube.com/user/gritstack.
Grit Energy Solutions, LLC, The Grit Stack System—Live Frac, Screenshots from video dated Jun. 15, 2015, https://www.youtube.com/user/gritstack.
Grit Energy Solutions, LLC, The Grit Stack System, Screenshots from video dated Feb. 7, 2014, https://www.youtube.com/user/gritstack.
Frac Sand Primer by Brian D. Olmen, Kelrick, LLC, from Hydraulic Fracturing by Michael Berry Smith and Carl Montgomery (CRC Press, Dec. 16, 2015), p. 384.
Premier Silica LLC, Sands Application in the Energy Market, Irving, TX, Copyright 2016.
Getty, John, Montana Tech; ASTM International, Overview of Proppants and Existing Standards and Practices, Jacksonville, FL, Jan. 29, 2013.
Arrows Up, Inc., Jumbo BTS—Bulk Transport System, Aug. 1, 2014.
Arrows Up, Inc., Reusable Packaging Association, Member Spotlight: John Allegretti, President & CEO, Arrows Up, Inc., Jun. 23, 2016.
Seed Today, Arrows Up, Inc. Bulk Transport System (BTS), Country Journal Publishing Co., Decatur, IL, Mar. 2, 2011.
SeedQuest, Arrows Up, Inc. launches innovative bulk transport system for see, Barrington, IL, Mar. 2, 2011.
Monster Tanks, Inc., Sand Monster Website, http://monstertanksinc.com/sandmonster.html, 2012.
Solaris Oilfield Infrastructure, Mobile Sand Silo System, 2016.
Final Office Action dated Sep. 27, 2016 for co-pending U.S. Appl. No. 13/555,635.
Non-Final Office Action dated Mar. 23, 2016 for co-pending U.S. Appl. No. 13/555,635.
Final Office Action dated Jul. 30, 2015 for co-pending U.S. Appl. No. 13/555,635.
Non-Final Office Action dated Oct. 22, 2014 for co-pending U.S. Appl. No. 13/555,635.
Final Office Action dated Jun. 21, 2016 for co-pending U.S. Appl. No. 13/628,702.
Non-Final Office Action dated Feb. 23, 2016 for co-pending U.S. Appl. No. 13/628,702.
Final Office Action dated Sep. 22, 2015 for co-pending U.S. Appl. No. 13/628,702.

(56) References Cited

OTHER PUBLICATIONS

Non-Final Office Action dated Jul. 28, 2015 for co-pending U.S. Appl. No. 13/628,702.
Final Office Action dated Mar. 24, 2015 for co-pending U.S. Appl. No. 13/628,702.
Non-Final Office Action dated Sep. 18, 2014 for co-pending U.S. Appl. No. 13/628,702.
Final Office Action dated Jun. 27, 2016 for co-pending U.S. Appl. No. 14/831,924.
Non-Final Office Action dated Feb. 16, 2016 for co-pending U.S. Appl. No. 14/831,924.
Final Office Action dated Jun. 27, 2016 for co-pending U.S. Appl. No. 14/923,920.
Non-Final Office Action dated Feb. 9, 2016 for co-pending U.S. Appl. No. 14/923,920.
Final Office Action dated Sep. 15, 2016 for co-pending U.S. Appl. No. 14/943,111.
Non-Final Office Action dated Apr. 5, 2016 for co-pending U.S. Appl. No. 14/943,111.
Final Office Action dated Jul. 18, 2016 for co-pending U.S. Appl. No. 14/948,494.
Non-Final Office Action dated Apr. 8, 2016 for co-pending U.S. Appl. No. 14/948,494.
Non-Final Office Action dated Sep. 6, 2016 for co-pending U.S. Appl. No. 15/144,296.
Non-Final Office Action dated Jul. 25, 2016 for co-pending U.S. Appl. No. 13/660,855.
Final Office Action dated Apr. 28, 2016 for co-pending U.S. Appl. No. 13/660,855.
Non-Final Office Action dated Oct. 6, 2015 for co-pending U.S. Appl. No. 13/660,855.
Final Office Action dated Aug. 6, 2015 for co-pending U.S. Appl. No. 13/660,855.
Non-Final Office Action dated Apr. 29, 2015 for co-pending U.S. Appl. No. 13/660,855.
Final Office Action dated Dec. 17, 2014 for co-pending U.S. Appl. No. 13/660,855.
Non-Final Office Action dated Sep. 4, 2014 for co-pending U.S. Appl. No. 13/660,855.
Final Office Action dated Sep. 24, 2013 for co-pending U.S. Appl. No. 13/660,855.
Non-Final Office Action dated May 14, 2013 for co-pending U.S. Appl. No. 13/660,855.
Non-Final Office Action dated Jul. 5, 2016 for co-pending U.S. Appl. No. 14/996,362.
Non-Final Office Action dated Jul. 6, 2016 for co-pending U.S. Appl. No. 15/144,450.
Final Office Action dated Sep. 29, 2016 for co-pending U.S. Appl. No. 13/768,962.
Non-Final Office Action dated Apr. 5, 2016 for co-pending U.S. Appl. No. 13/768,962.
Final Office Action dated Oct. 9, 2015 for co-pending U.S. Appl. No. 13/768,962.
Non-Final Office Action dated May 1, 2015 for co-pending U.S. Appl. No. 13/768,962.
Non-Final Office Action dated Jul. 18, 2016 for co-pending U.S. Appl. No. 15/152,744.
Non-Final Office Action dated Apr. 13, 2016 for co-pending U.S. Appl. No. 14/738,485.
Non-Final Office Action dated Sep. 7, 2016 for co-pending U.S. Appl. No. 14/841,942.
Final Office Action dated May 12, 2016 for co-pending U.S. Appl. No. 14/841,942.
Non-Final Office Action dated Nov. 30, 2015 for co-pending U.S. Appl. No. 14/841,942.
Non-Final Office Action dated Jul. 21, 2016 for co-pending U.S. Appl. No. 15/083,596.
Non-Final Office Action dated Aug. 19, 2016 for co-pending U.S. Appl. No. 15/084,613.
Non-Final Office Action dated Sep. 6, 2016 for co-pending U.S. Appl. No. 15/143,942.
Final Office Action dated Sep. 1, 2016 for co-pending U.S. Appl. No. 14/848,447.
Non-Final Office Action dated Apr. 8, 2016 for co-pending U.S. Appl. No. 14/848,447.
Non-Final Office Action dated May 13, 2016 for co-pending U.S. Appl. No. 14/986,826.
Final Office Action dated Sep. 15, 2016 for co-pending U.S. Appl. No. 14/922,836.
Non-Final Office Action dated Feb. 4, 2016 for co-pending U.S. Appl. No. 14/922,836.
Final Office Action dated Aug. 25, 2016 for co-pending U.S. Appl. No. 14/927,614.
Non-Final Office Action dated Mar. 1, 2016 for co-pending U.S. Appl. No. 14/927,614.
Non-Final Office Action dated Apr. 29, 2016 for co-pending U.S. Appl. No. 14/943,182.
Final Office Action dated Sep. 15, 2016 for co-pending U.S. Appl. No. 14/882,973.
Non-Final Office Action dated Feb. 11, 2016 for co-pending U.S. Appl. No. 14/882,973.
Non-Final Office Action dated Aug. 11, 2016 for co-pending U.S. Appl. No. 13/625,675.
Final Office Action dated Nov. 11, 2015 for co-pending U.S. Appl. No. 13/625,675.
Non-Final Office Action dated Mar. 11, 2015 for co-pending U.S. Appl. No. 13/625,675.
Non-Final Office Action dated Oct. 27, 2016 for co-pending U.S. Appl. No. 15/219,676.
Non-Final Office Action dated Nov. 9, 2016 for co-pending U.S. Appl. No. 14/948,494.
Final Office Action dated Nov. 4, 2016 for co-pending U.S. Appl. No. 14/738,485.
Non-Final Office Action dated Dec. 28, 2016 for co-pending U.S. Appl. No. 13/628,702.
Non-Final Office Action dated Jan. 13, 2017 for co-pending U.S. Appl. No. 14/923,920.
Final Office Action dated Jan. 12, 2017 for co-pending U.S. Appl. No. 14/841,942.
Non-Final Office Action dated Dec. 23, 2016 for co-pending U.S. Appl. No. 14/485,686.
Non-Final Office Action dated Jan. 27, 2017 for co-pending U.S. Appl. No. 14/485,687.
Non-Final Office Action dated Dec. 20, 2016 for co-pending U.S. Appl. No. 14/831,924.
Final Office Action dated Jan. 19, 2017 for co-pending U.S. Appl. No. 13/660,855.
Final Office Action dated Nov. 25, 2016 for co-pending U.S. Appl. No. 15/152,744.
Non-Final Office Action dated Dec. 15, 2016 for co-pending U.S. Appl. No. 14/848,447.
Non-Final Office Action dated Dec. 9, 2016 for co-pending U.S. Appl. No. 14/927,614.
International Search Report for PCT Application No. PCT/US2016/050859 dated Dec. 9, 2016.
Non-Final Office Action dated Apr. 3, 2017 for co-pending U.S. Appl. No. 13/555,635.
Non-Final Office Action dated Feb. 14, 2017 for co-pending U.S. Appl. No. 14/943,111.
Final Office Action dated Mar. 7, 2017 for co-pending U.S. Appl. No. 15/144,296.
Non-Final Office Action dated Apr. 6, 2017 for co-pending U.S. Appl. No. 13/768,962.
Non-Final Office Action dated Mar. 6, 2017 for co-pending U.S. Appl. No. 15/152,744.
Non-Final Office Action dated Feb. 24, 2017 for co-pending U.S. Appl. No. 14/943,182.
International Search Report and Written Opinion for PCT/US2017/012271, dated May 22, 2017.
Non-Final Office Action dated Apr. 24, 2017 for co-pending U.S. Appl. No. 14/738,485.

(56) References Cited

OTHER PUBLICATIONS

Final Office Action dated May 4, 2017 for co-pending U.S. Appl. No. 15/143,942.
Final Office Action dated May 30, 2017 for co-pending U.S. Appl. No. 13/625,675.
Final Office Action dated Apr. 19, 2017 for co-pending U.S. Appl. No. 15/219,640.
Non-Final Office Action dated Jun. 1, 2017 for co-pending U.S. Appl. No. 15/219,640.
Final Office Action dated May 2, 2017 for co-pending U.S. Appl. No. 15/219,676.
Non-Final Office Action dated May 10, 2017 for co-pending U.S. Appl. No. 14/882,973.
Final Office Action dated Jun. 1, 2017 for co-pending U.S. Appl. No. 13/628,702.
Final Office Action dated Jul. 3, 2017 for co-pending U.S. Appl. No. 14/923,920.
Non-Final Office Action dated Jun. 28, 2017 for co-pending U.S. Appl. No. 15/589,185.
Final Office Action dated Jun. 7, 2017 for co-pending U.S. Appl. No. 14/848,447.
Final Office Action dated Jun. 28, 2017 for co-pending U.S. Appl. No. 14/485,687.
Final Office Action dated Jun. 6, 2017 for co-pending U.S. Appl. No. 14/927,614.
Final Office Action dated Jun. 21, 2017 for co-pending U.S. Appl. No. 14/943,182.
Non-Final Office Action dated Jul. 26, 2017 for co-pending U.S. Appl. No. 15/463,201.
Final Office Action dated Jul. 27, 2017 for co-pending U.S. Appl. No. 14/738,485.
Non-Final Office Action dated Aug. 3, 2017 for co-pending U.S. Appl. No. 15/219,676.
Beckwith, Robin, Proppants: Where in the World, Proppant Shortage, JPT, Apr. 2011 (6 pages).
Kullman, John, The Complicated World of Proppant Selection . . . , South Dakota School of Mines & Technology, Oct. 2011 (65 pages).
Lafollette, Randy, Key Considerations for Hydraulic Fracturing of Gas Shales, BJ Services Company, Sep. 9, 2010 (53 pages).
WW Trailers Inc., Model GN2040EZ datasheet, Portland, OR, Jan. 2007 (4 pages).
WW Trailers Inc., Model GN204S9A datasheet, Portland, OR, Jan. 2007 (4 pages).
Yergin, Daniel, The Quest: Energy, Security, and the Remaking of the Modern World, 2011.
Gold, Russell, The Boom: How Fracking Ignited the American Energy Revolution and Changed the World, 2014.
Yergin, Daniel, Stepping on the Gas, Wall Street Journal, Apr. 2, 2011.
Raimi, Daniel et al., Dunn County and Watford City, North Dakota: A case study of the fiscal effects of Bakken shale development, Duke University Energy Initiative, May 2016.
Local Economic Impacts Related to Marcellus Shale Development, The Center for Rural Pennyslvania, Sep. 2014.
Eagle Ford Shale Task Force Report, Railroad Commission of Texas, Convened and Chaired by David Porter, Mar. 2013.
*Sandbox Logistics LLC et al* v. *Grit Energy Solutions LLC*, 3:16-cv-00012, 73. Parties' P.R. 4-3 Joint Claim Construction and Prehearing Statement by Oren Technologies LLC, SandBox Enterprises LLC, SandBox Logistics LLC, Nov. 17, 2016.
Beard, Tim, Fracture Design in Horizontal Shale Wells—Data Gathering to Implementation, EPA Hydraulic Fracturing Workshop, Mar. 10-11, 2011.
Economic Impact of the Eagle Ford Shale, Center for Community and Business Research at the University of Texas at San Antonio's Institute for Economic Development, Sep. 2014.
Kelsey, Timothy W. et al., Economic Impacts of Marcellus Shale in Pennsylvania: Employment and Income in 2009, The Marcellus Shale Education & Training Center, Aug. 2011.

2006 Montana Commercial Vehicle Size and Weight and Safety Trucker's Handbook, Montana Department of Transportation Motor Carrier Services Division, Fifth Edition, Jun. 2010.
Budzynski, Brian W., Never Meant to Take the Weight, Roads & Bridges, Apr. 2015.
Interstate Weight Limits, 23 C.F.R. § 658, Apr. 1, 2011.
VIN Requirements, 49 C.F.R. § 565, Oct. 1, 2011.
Benson, Mary Ellen et al., Frac Sand in the United States—A Geological and Industry Overview, U.S. Department of the Interior, U.S. Geological Survey, 2015-2017.
Beekman, Thomas J. et al., Transportation Impacts of the Wisconsin Fracture Sand Industry, Wisconsin Department of Transportation, Mar. 2013.
U.S. Silica Company, Material Safety Data Sheet, Jan. 2011.
Texas Transportation Code, Chapter 621, General Provisions Relating to Vehicle Size and Weight (Sec. 621.101 effective Sep. 1, 2005 and Section 621.403 effective Sep. 1, 1995).
Garner, Dwight, Visions of an Age When Oil Isn't King, New York Times, Sep. 20, 2011.
Non-Final Office Action dated Sep. 8, 2017 for co-pending U.S. Appl. No. 15/475,354.
Non-Final Office Action dated Sep. 8, 2017 for co-pending U.S. Appl. No. 15/143,942.
International Search Report and Written Opinion for PCT/US17/34603 dated Aug. 22, 2017.
Non-Final Office Action dated Aug. 30, 2017 for co-pending U.S. Appl. No. 14/943,182.
Non-Final Office Action dated Aug. 4, 2017 for co-pending U.S. Appl. No. 13/625,675.
International Search Report for related International Application No. PCT/US2012/066639, dated Feb. 25, 2013.
International Search Report for related International Application No. PCT/US2013/035442, dated Jun. 23, 2013.
International Search Report for related International Application No. PCT/US2013/032819, dated May 23, 2013.
International Search Report for related International Application No. PCT/US2013/049028, dated Mar. 4, 2014.
International Preliminary Report on Patentability for PCT/US2012/066639, dated Feb. 26, 2013.
International Preliminary Report on Patentability for PCT/US2013/032819, dated Sep. 23, 2014.
International Search Report for PCT/US2015/012990, dated May 6, 2015. (15 pages).
FA-35 Desert Frac-Sanders. NOV (National Oilwell Varco). Mar. 19, 2012. (https://web.archive.org/web/20120319070423/ http://www.nov.com/Well_Service_and_Completion/Frac_Sand_Handling_Equipment/Frac_Sanders(FS-35.aspx).
File History for U.S. Appl. No. 61/538,616, Robert A. Harris, filed Sep. 23, 2011. (21 pages).
Final Office Action dated Oct. 13, 2017 for co-pending U.S. Appl. No. 15/398,950.
Non-Final Office Action dated Sep. 21, 2017 for co-pending U.S. Appl. No. 15/413,822.
Non-Final Office Action dated Oct. 5, 2017 for co-pending U.S. Appl. No. 14/848,447.
Final Office Action dated Sep. 21, 2017 for co-pending U.S. Appl. No. 14/922,836.
Non-Final Office Action dated Sep. 27, 2017 for co-pending U.S. Appl. No. 14/996,362.
Non-Final Office Action dated Sep. 28, 2017 for co-pending U.S. Appl. No. 13/628,702.
Randy Lafollette, Key Considerations for Hydraulic Fracturing of Gas Shales, May 12, 2010.
Case No. 4:17-cv-00589, Plaintiffs' P.R. 3-1 and 3-2 Infringement Contentions and Disclosures, Jun. 8, 2017.
Non-Final Office Action dated Apr. 26, 2018 for co-pending U.S. Appl. No. 15/616,783.
Final Office Action dated Apr. 23, 2018 for co-pending U.S. Appl. No. 14/848,447.
Final Office Action dated Mar. 16, 2018 for co-pending U.S. Appl. No. 14/996,362.
Final Office Action dated Mar. 14, 2018 for co-pending U.S. Appl. No. 15/144,450.

(56) References Cited

OTHER PUBLICATIONS

Smith, Ryan E., Prefab Architecture, A Guide to Modular Design and Construction, John Wiley & Sons, Inc., 2010.
Osha-Niosh, Hazard Alert: Worker Exposure to Silica during Hydraulic Fracturing, Jun. 2012.
Tremoglie, Michael P., Legal NewsLine, Osha, NIOSH issue fracking health alert (/stories/510527440-oshaniosh-issue-fracking health-alert), Jun. 25, 2012.
Beckwith, Robin, Proppants: Where in the World, Journal of Petroleum Technology, Apr. 2011.
Final Office Action dated Feb. 27, 2018 for co-pending U.S. Appl. No. 15/143,942.
Final Office Action dated Jan. 22, 2018 for co-pending U.S. Appl. No. 13/628,702.
Final Office Action dated Jan. 25, 2018 for co-pending U.S. Appl. No. 15/602,666.
Final Office Action dated Feb. 6, 2018 for co-pending U.S. Appl. No. 15/475,354.
Non-Final Office Action dated Feb. 9, 2018 for co-pending U.S. Appl. No. 15/587,926.
Non-Final Office Action dated Feb. 15, 2018 for co-pending U.S. Appl. No. 14/922,836.
Final Office Action dated Dec. 27, 2017 for co-pending U.S. Appl. No. 14/943,182.
ISO 1496-1: International Standard, Series 1 Freight Containers—Specification and Testing—Part 1, General Cargo Containers, Fifth Edition, Aug. 15, 1990.
ISO 6346: International Standard, Freight Containers—Coding, Identification and Marking, Third Edition, Dec. 1, 1995.
ISO/IEC 15416: International Standard, Information Technology—Automatic Identification and Data Capture Techniques—Bar Code Print Quality Test Specification—Linear Symbols, First Edition, Aug. 15, 2000.
Hoel, Lester A., Giuliano, Genevieve and Meyer, Michael D., Portions of Intermodal Transportation: Moving Freight in a Global Economy, Copyright Eno Transportation Foundation, 2011.
International Organization for Standardization, ISO 668:1995(E).
International Organization for Standardization, ISO 668:1995(E)/Amd.1:2005(E).
International Organization for Standardization, ISO 668:1995(E)/Amd.2:2005(E).
International Organization for Standardization, ISO 1496-1:1990/Amd.1:1993(E).
International Organization for Standardization, ISO 1496-1:1990/Amd.2:1998(E).
International Organization for Standardization, ISO 1496-1:1990/Amd.3:2005(E).
International Organization for Standardization, ISO 1496-1:1990/Amd.4:2006(E).
International Organization for Standardization, ISO 1496-1:1990/Amd.5:2006(E).
Rastikian, K. et al., Modelling of sugar drying in a countercurrent cascading rotary dryer from stationary profiles of temperature and moisture, Journal of Food Engineering 41 (1999).
Itsumi Nagahama, English translation of Japan Unexamined Application No. S4871029, Dec. 14, 1971.

* cited by examiner

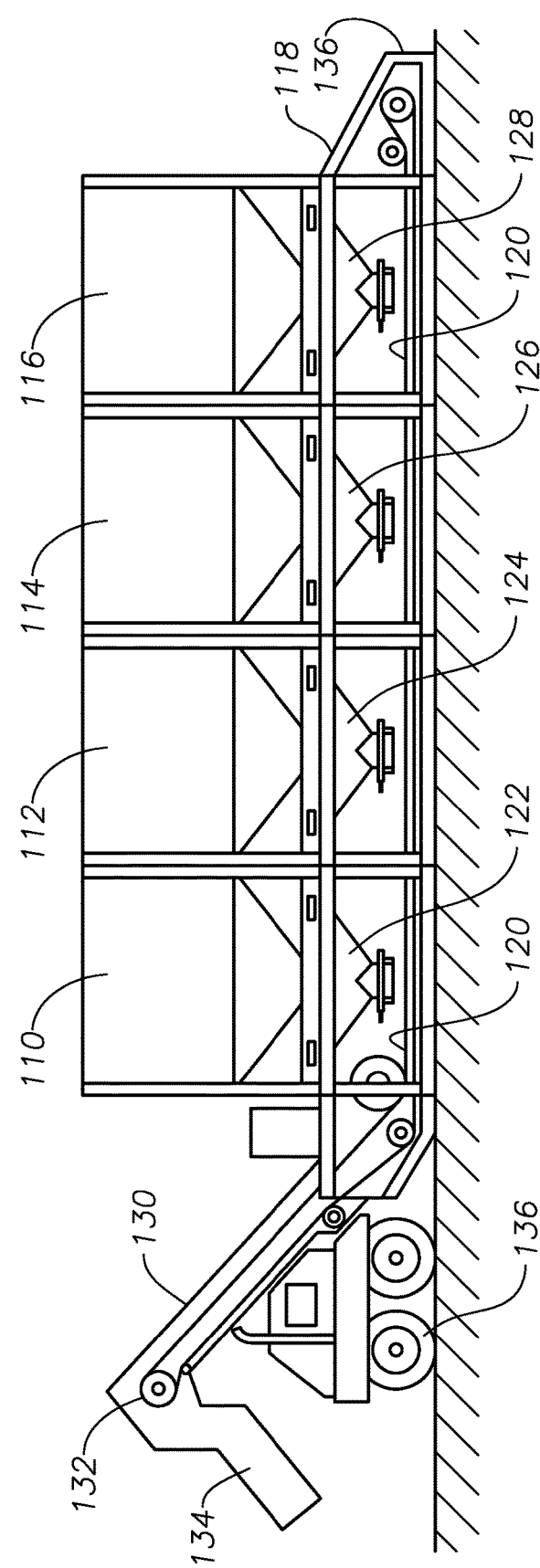
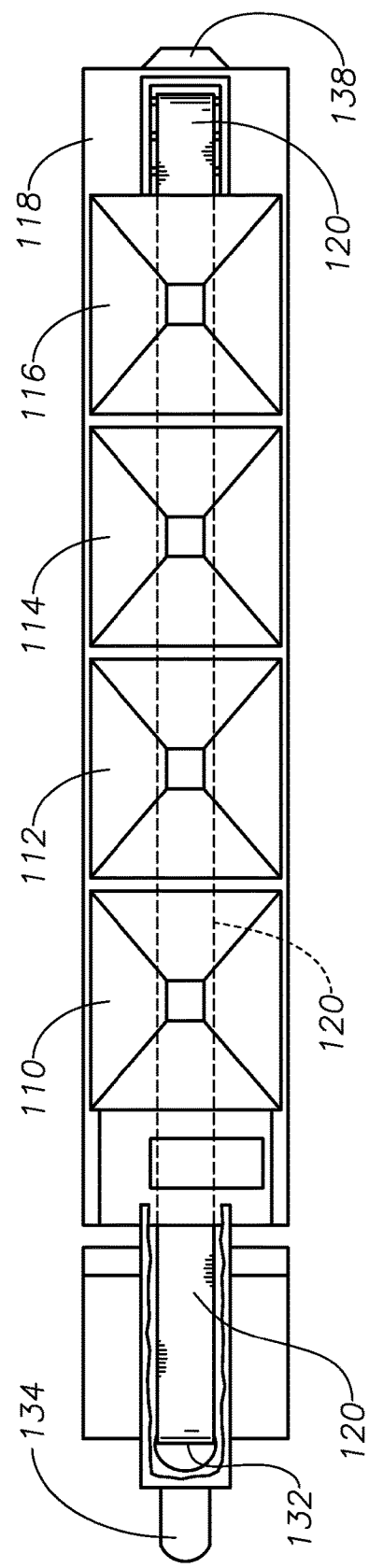
FIG. 9
FIG. 10

SYSTEMS AND METHODS FOR REMOTELY CONTROLLING PROPPANT DISCHARGE SYSTEM

RELATED APPLICATIONS

This application is related to and claims priority to, and the benefit of, U.S. Provisional Application No. 62/028,728, filed Jul. 24, 2014, titled "Computer Systems, and Computer Programs for Remotely Controlling Proppant Discharge System," U.S. Provisional Application No. 62/142,221, filed on Apr. 2, 2015, titled "Work Flow for Transporting Proppant," U.S. Provisional Application No. 62/143,692, filed Apr. 6, 2015, titled "Work Flow for Transporting Proppant," and U.S. Provisional Application No. 62/145,047, filed Apr. 9, 2015, titled "Work Flow for Transporting Proppant," each of which are incorporated herein in their entireties by reference.

FIELD OF THE INVENTION

The present invention relates to storage containers and, more particularly, to proppant discharge systems.

BRIEF DESCRIPTION OF RELATED ART

Hydraulic fracturing is the propagation of fractions in a rock layer caused by the presence of pressurized fluid. Hydraulic fractures may form naturally, in the case of veins or dikes, or may be man-made in order to release petroleum, natural gas, coal seam gas, or other substances for extraction. Fracturing is done from a wellbore drilled into reservoir rock formations. The energy from the injection of a highly-pressurized fracking fluid creates new channels in the rock which can increase the extraction rates and ultimate recovery of fossil fuels. The fracture width is typically maintained after the injection by introducing a proppant into the injected fluid. Proppant is a material, such as grains of sand, ceramic, or other particulates, that prevents the fractures from closing when the injection is stopped.

With the rise of hydraulic fracturing over the past decade, there has been a steep climb in proppant demand. Global supplies are currently tight. The number of proppant suppliers worldwide has increased since 2000 from a handful to well over fifty sand, ceramic proppant and resin-coat producers.

BRIEF SUMMARY OF THE INVENTION

Typically, in any hydraulic fracturing operation, a large amount of proppant is required. Typically, it has been difficult to effectively store the proppant at the fracturing sites. Additionally, it has been found to be rather difficult to effectively transport the proppant to the desired location. Often, proppant is hauled to the desired locations on the back of trucks and is clumped onsite. Under such circumstances, the proppant is often exposed to adverse weather conditions.

One embodiment of the present invention is a proppant discharge system that has a container with a pair of sidewalls, a pair of end walls, a bottom and a top. The container has an inlet formed at or adjacent to the top. The container has an outlet formed at the bottom thereof. A gate is slidably affixed at the outlet of the container so as to be movable between a first position covering the outlet and a second position opening the outlet. A support structure has a top surface and at least one actuator. The container is removably positioned on the top surface of the support structure. The actuator is engageable with the gate so as to move the gate from the first position to the second position. In particular, the gate has a pin extending therefrom. The actuator has a receptacle. The pin is receivable within the receptacle.

A conveyor underlies the top surface of the support structure so as to receive proppant as discharged from the container through the outlet of the container. A hopper is positioned on the support structure below the top surface thereof. The hopper is positioned directly below the gate of the container. The hopper has an opening at a bottom thereof. The bottom of the hopper is positioned above the conveyor. A metering gate is positioned adjacent to the opening at the bottom of the hopper metering gate. The metering gate is movable between a closed position and an open position. The opening at the bottom of the hopper has a plurality of slots formed therein. The metering gate also has a plurality of slots formed therethrough. The plurality of slots of the metering gate are at least partially aligned with the plurality of slots of the hopper when the metering gate is in the open position. The opening, at the bottom of the hopper has an inverted V-shape configuration. The metering rate has an inverted V-shaped configuration matching with the opening at the bottom of the hopper. The metering gate is slidable relative to the opening at the bottom of the hopper. An actuator affixed to the metering gate so as to move the metering gate between the closed position and the open position.

A frame is affixed to the conveyor and extends therealong. A discharge chute is connected to the frame and is cooperative with the end of the conveyor so as to discharge the proppant from the conveyor to a desired location. A plurality of wheels can be rotatably mounted to the frame so as to allow the conveyor to be transported to the desired location.

In addition, some embodiments of the present invention include actuators, which can be remotely controlled by a computer or other controlling device, to open and close the gates associated with the containers, hoppers, and conveyors. Embodiments to remotely control a proppant discharge system can include one or more processors, one or more input/output units adapted to be in communication with the one or more processors, and non-transitory computer-readable media in communication with the one or more processors. The media can have one or more computer programs with computer-readable instructions stored therein that when executed cause the system to perform a number of steps. The steps also can be performed in accordance with various method embodiments.

For example, the steps can include analyzing, using the one or more processors, data received from one or more of a plurality of sensors attached to a conveyor of a proppant discharge system and a plurality of containers positioned above the conveyor, the data indicating one or more of the following: speed of conveyor, weight of proppant discharged from the container positioned above the conveyor, amount of silica dust, and emergency signals. The steps further can include transmitting electrical signals to an actuator controller attached to an actuator of the proppant discharge system to adjust an amount of proppant discharged from the container responsive to analyzing the data.

BRIEF DESCRIPTION OF THE SEVERAL VIEWS OF THE DRAWINGS

FIG. 9 is a side devotional view showing a plurality of containers as placed upon the support structure in accordance with the system of the preferred embodiment of the present invention.

FIG. 10 is a plan view showing a plurality of containers as placed upon the support structure in accordance with the preferred embodiment of the system of the present invention.

DETAILED DESCRIPTION OF THE INVENTION

Figure 1:
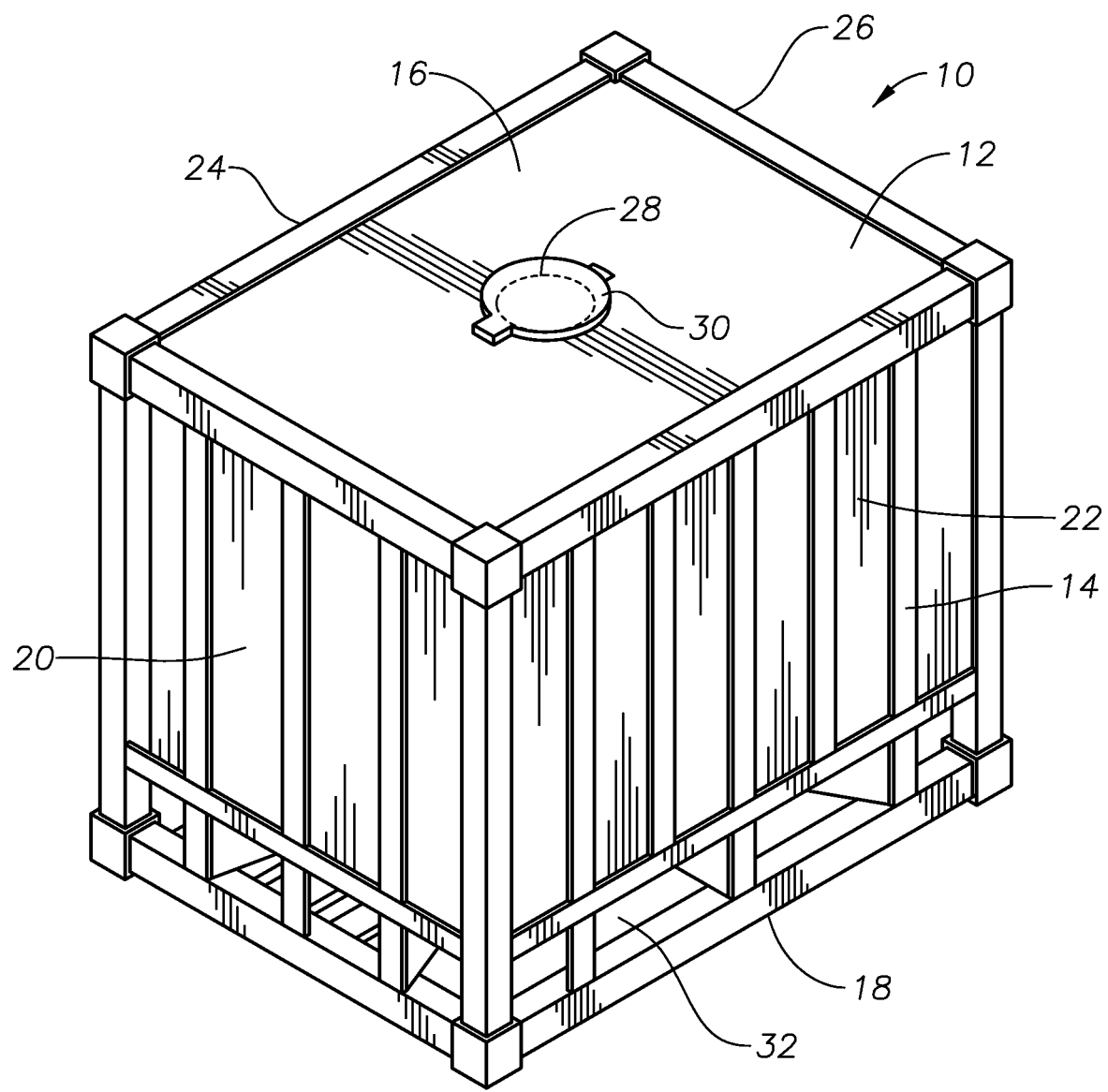
FIG. 1 is a perspective view of the container in accordance with the preferred embodiment of the present invention.

FIG. 1 shows a container 10 in accordance with an embodiment of the invention. The container 10 is in the nature of a box 12 having an exterior frame 14. The box 12 includes a top 16, a bottom 18, an end wall 20 and a side wall 22. The side wall 24 is opposite to the side wall 22. There also an end wall 26 that is opposite to that of end will 20. An inlet 28 is formed through the top 16 of the box 12. A hatch 30 is removably or hingedly affixed over the inlet 28 so as to allow proppant to be introduced into the interior volume of the container 10.

In FIG. 1, it can be seen that the frame 14 extends generally around the exterior of the end walls 20 and 26 and over the side walls 22 and 24. As such as will be described hereinafter, there is a funnel-shaped bottom of the container that has exterior surfaces exposed through the frame 14. During the course of international shipment, it is important to avoid closed spaces within such a container. As such, the exposure of the surfaces through the openings 32 at the bottom of the frame 14 will allow inspectors to have visual access to the areas adjacent to this funnel-shaped area.

Figure 2:
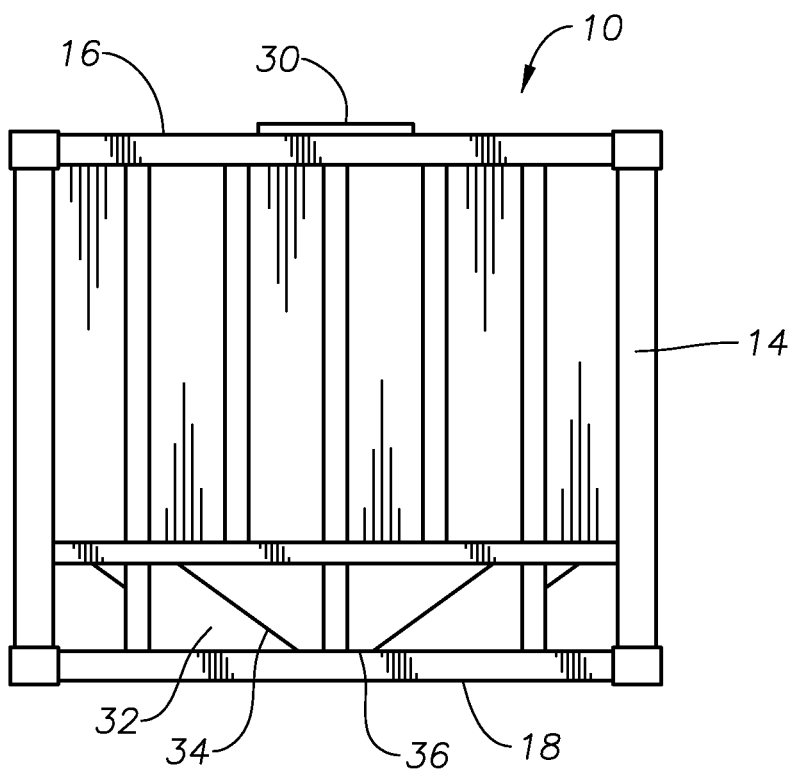
FIG. 2 is a side elevational view of the container in accordance with the preferred embodiment of the present invention.

As can be seen in FIG. 2, the container 10 is illustrated as having the top 16 and the bottom 18. The frame 14 provides structural support for the container 10 and generally surrounds the exterior of the container. The frame is formed of a plurality of vertical bars that extend so as to form a cage-like configuration around the walls 20, 22, 24 and 26. The bottom 18 is generally of a planar shape so that the bottom 18 can be placed upon the support structure (to be described hereinafter). Importantly, the area 32 shows that the funnel-shaped portion 34 is exposed through the openings of the frame 14. As such, there will be no closed or sealed areas within the interior of the container 10. The hatch 30 is positioned over the inlet 28 at the top 16 of the container 10. As a result, the proppant can be introduced through the inlet 28 when the hatch 30 is opened so as to fill the interior volume of the container 10. The funnel-shaped, area 34 defines an outlet 36 located at the bottom 18 of the container 10.

As can be seen in FIGS. 1 and 2, the container 10 is a ten-foot ISO container. In accordance with standard ISO terminology, this means that the container has a length of ten feet, a width of eight feet and a height of 8.5 feet. The height can also be 9.5 feet. This configuration allows between 43,000 and 48,000 pounds of proppant to be introduced into the interior volume or the container.

Figure 3:
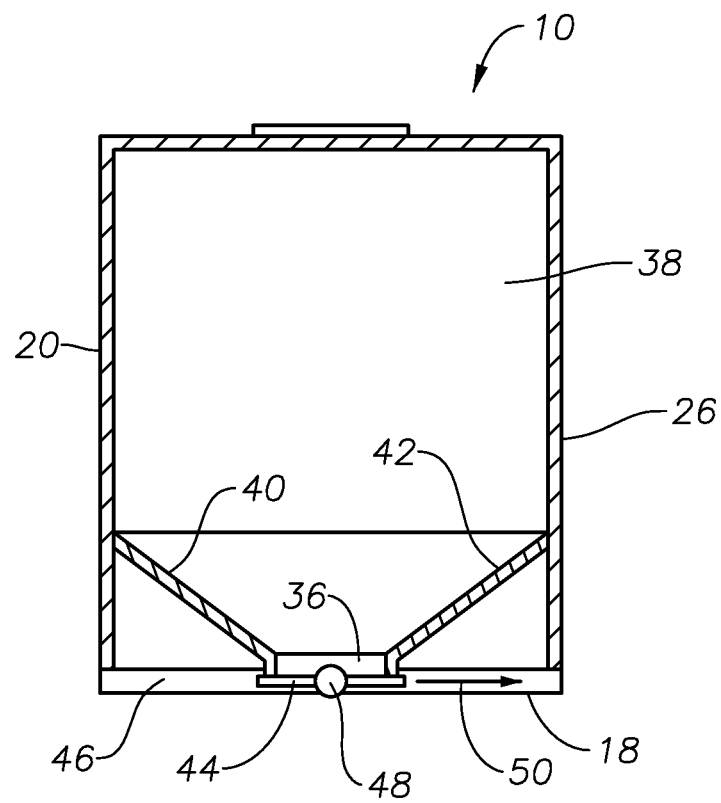
FIG. 3 is a cross-sectional view showing the container of the preferred embodiment of the present invention.

FIG. 3 shows a partial cross-sectional view of the container 10. It can be seen that the container 10 has an interior volume 38. The outlet 36 is formed adjacent to the bottom 18 of the container 10. A first ramp 40 will extend from the end wall 20 to the outlet 36. A second ramp 42 will extend from the end wall 22 to the outlet 36. The ramps 40 and 42 will serve to funnel, the proppant that is retained within the interior volume 38 of the container 10 toward the outlet 36. Importantly, a gate 44 is positioned within a track 46 located at the bottom 18 of the container 10. The gate 44 is in the nature of flat plate which, as shown in FIG. 3, covers the outlet 36. The gate 44 includes a pin 48 (in the nature of king bolt) that extends outwardly from the gate 44. When an actuator is connected to the pin 48, it can move the gate 44 from the position closing the outlet 36 to a position opening the outlet 36. Allow 50 shows the movement of the gate 44 between these positions. Since the gate 44 has a width that generally corresponds to the size of the outlet 36, the gate 44 will only need to move for a small amount of travel so as to move the gate 44 to the open position.

Figure 4:
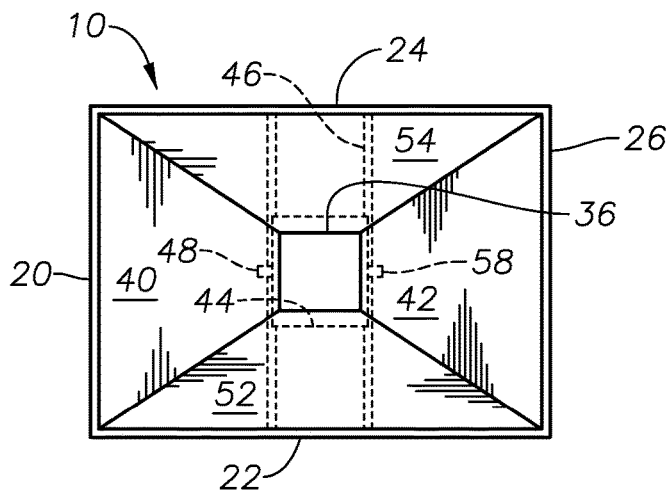
FIG. 4 is a plan view showing the interior of the container of the preferred embodiment of the present invention.

FIG. 4 is an interior view of the container 10. As can be seen, the first ramp 40 will extend from the end wall 20 to the outlet 36. The second ramp 42 extends from the end wall 26 to the outlet 36. A third ramp 52 will extend from the side wall 22 to the outlet 36. Another ramp 54 will extend horn the side wall 24 to the outlet 36. As such, the ramps 40, 42, 52 and 54 form the funnel-like shape so that the proppant that is received within the interior volume 38 of the container 10 can flow free downwardly toward the outlet 36.

In FIG. 4, it can be seen that the gate 44 is positioned within the track 46. FIG. 4 shows the gate 44 in its closed position. An actuator can be used so as to move the gate 44 from the position shown in FIG. 4 in a direct on toward either the side wall 22 or the side wall 24. Pins 48 and 58 are illustrated as extending outwardly of the sides of the gate 44. As such, a suitable actuator, such as a hydraulic piston-and-cylinder arrangement, can be connected to these pins 4S and/or 50 so as to achieve the requisite movement of the gate 44 from the closed position to the open position.

Figure 5:
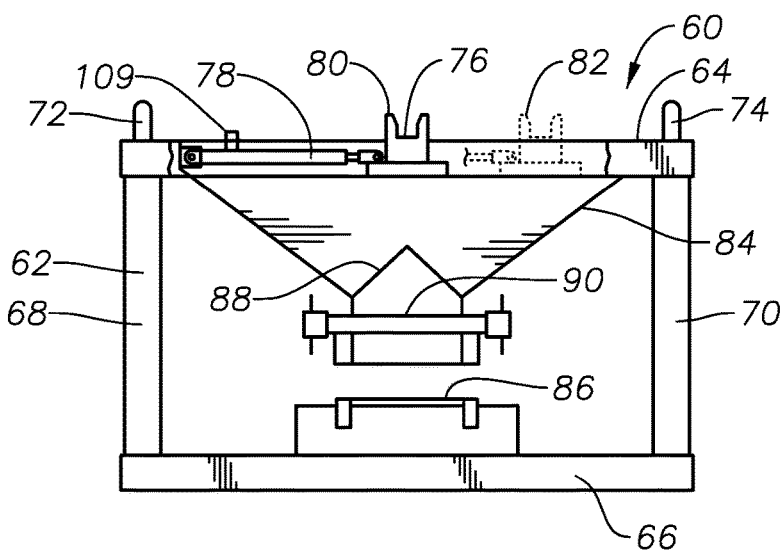
FIG. 5 is an isolated end view showing the support structure of the system of the preferred embodiment of the present invention.

FIG. 5 is an end view showing the support structure 60 as used in the proppant discharge system of the present invention. The support structure 60 has a frame 62 which forms a top surface 64, a bottom surface 66, and sides 68 and 70. The top 64 of the frame 62 has a surface upon which the container 10 can be placed. Suitable pin connections 72 and 74 extend upwardly from the top surface 64 so as to engage corresponding receptacles on the container 10. These pins 72 and 74 can be utilized so as to assure that the container 10 is properly positioned upon the support structure 60.

A receptacle 76 is positioned at or adjacent to the top surface 64. The actuator 78 is affixed to the frame 62 and extends to the receptacle 76. As can be seen, the receptacle 76 has a slot formed in the top end thereof. The slot of the receptacle 76 is suitable for receiving one of the pins 48 and 58 of the gate 44 of the container 10. Once the receptacle 76 receives the pin 48 therein, the actuator 78 can be actuated so as to move the receptacle (and its received pin) from the first position 80 to a second position 82. When the receptacle 82 (along with the pin received therein) is moved to the second position 82, the gate 44 will be opened so that the proppant can be discharged through the outlet 36 of the container 10. Since pins 48 and 58 are symmetrically placed, and since the container 10 is rather symmetrical, the support, structure 60 is particularly adapted to the variety of orientations with the container 10 can be placed upon the top surface 64. Attached to the actuator 78 is an actuator controller 109 adapted to control the actuator responsive to electrical signals. The actuator controller 109 is adapted to receive electronic signals from one or more remote computer systems. This enables the actuator 78, and in turn the gate 44, to be controlled remotely by the computer systems.

In FIG. 5, it can be seen that there is a hopper 84 that is positioned below the top surface 64. Hopper 84 serves to receive a portion of the proppant as discharged through the outlet 36 of the container 10 when the gate 44 is in the open position. As such, the hopper 84 can be utilized so as to properly meter the proppant onto the conveyor 86. Conveyor 86 is located below the opening 88 of the hopper 84.

As can be seen in FIG. 5, hopper 84 has an opening 88 of a generally inverted V-shaped configuration. There is a metering gate 90 that is mated with the opening 88 and also has a V-shaped configuration. The metering gate 90 can be moved a small distance so as to allow for the selected and controlled discharge of proppant from the hopper 84 onto the conveyor 86.

Figure 6:
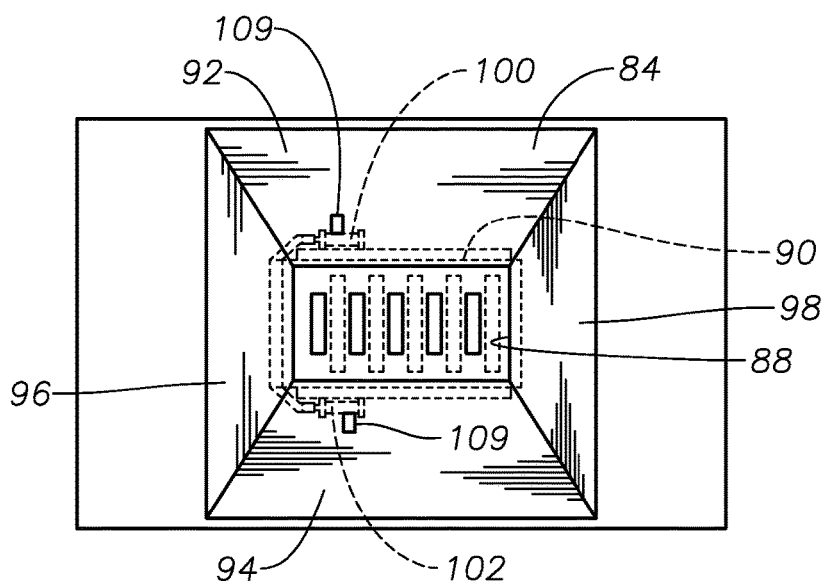
FIG. 6 is a plan view of the support structure of the system of the present invention.

FIG. 6 shows the interior of the hopper 84. Hopper 84 includes side walls 92 and 94 and end walls 96 and 98. The walls 92, 94, 96 and 98 are formed into a funnel-like shape so as to move the proppant downwardly toward the metering gate 90. In FIG. 6, it can be seen that the opening 88 of the hopper 84 has a plurality of slots formed therein. Similarly, the metering gate 90 has a plurality of slots formed therethrough. The structures between the slots are solid. As such, when the slots of the metering gate 90 are aligned with the slots of the opening 88, then proppant can be discharged onto the underlying conveyor 86. A small movement of the metering gate 90 in one direction or another, will block the flow of the proppant through the slots of the opening 88 of hopper 84. As such, very small actuators 100 and 102 can be used so as to achieve the proper metering of the proppant onto the conveyor. If a small flow rate of proppant is desired, then the actuators 100 and 102 will move the metering gate 90 only a small distance. If a greater flow rate is required, then the actuators 100 and 102 will move the metering gate 90 so that the slots of the metering, gate 90 fully correspond with the slots of the opening 88 so as to achieve a maximum flow of proppant from the hopper 84 down to the conveyor. Attached to each of the actuators 100, 102 is an actuator controller 109 adapted to control the actuator responsive to electrical signals. The actuator controller 109 is adapted to receive electronic signals from one or more remote computer systems. This enables the actuators 100, 102, and in turn the metering gate, to be remotely controlled by the computer systems.

Figure 7:
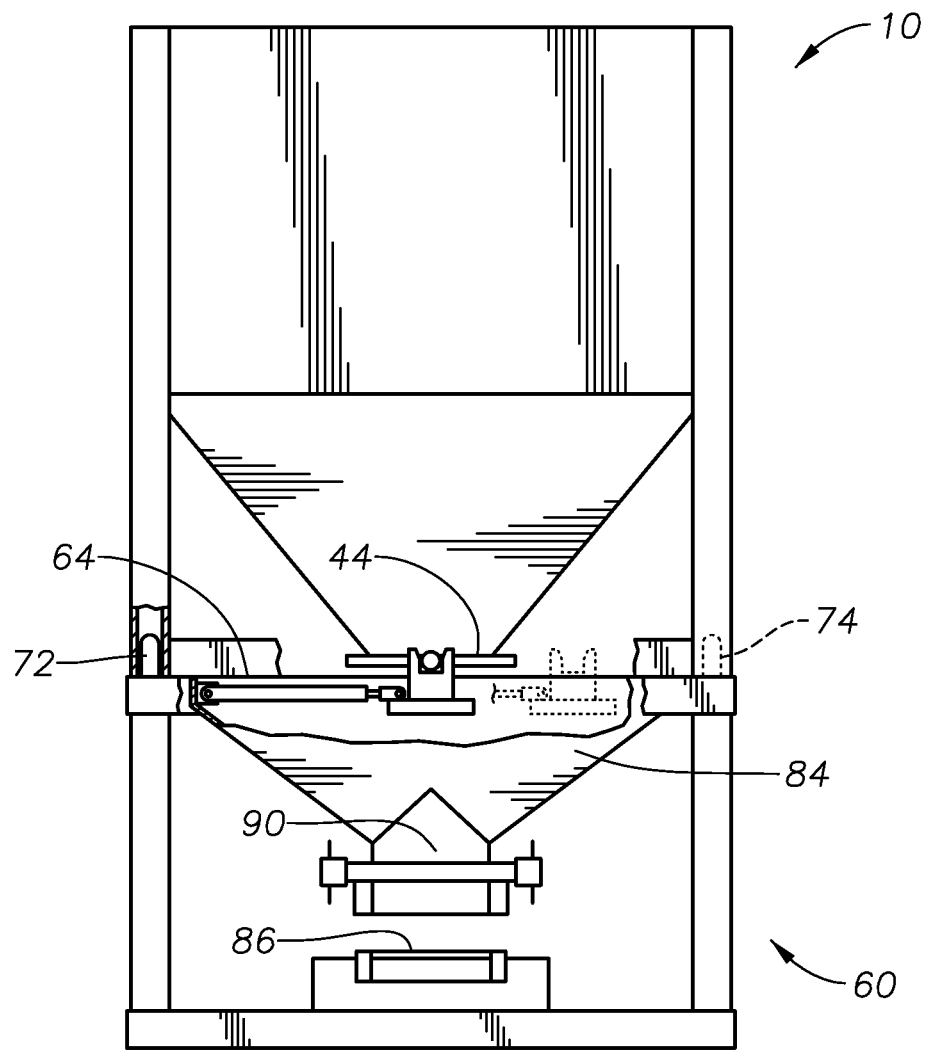
FIG. 7 is an end view showing the placement of the container upon the support structure in accordance with the preferred embodiment of the system of the present invention.

FIG. 7 shows the container 10 as placed upon the top surface 64 of the support structure 60. In normal use, a forklift can be utilized so as to properly position the container 10 in a proper position upon the pins 72 and 74 of the support structure 60. Initially, the gate 44 of the container 10 will be closed. Additionally, the metering gate 90 can also be closed. When the container 10 is properly positioned, the gate 44 can be moved to an open position so that the proppant is discharged into the hopper 84. The hopper 84 can then be filled with proppant. When it is desired to move the proppant from the hopper 84, along the conveyor, to the desired destination, then the metering gate 90 can be opened so as to achieve the desired flow rate of proppant through the opening 88 of the hopper 84.

Figure 8:
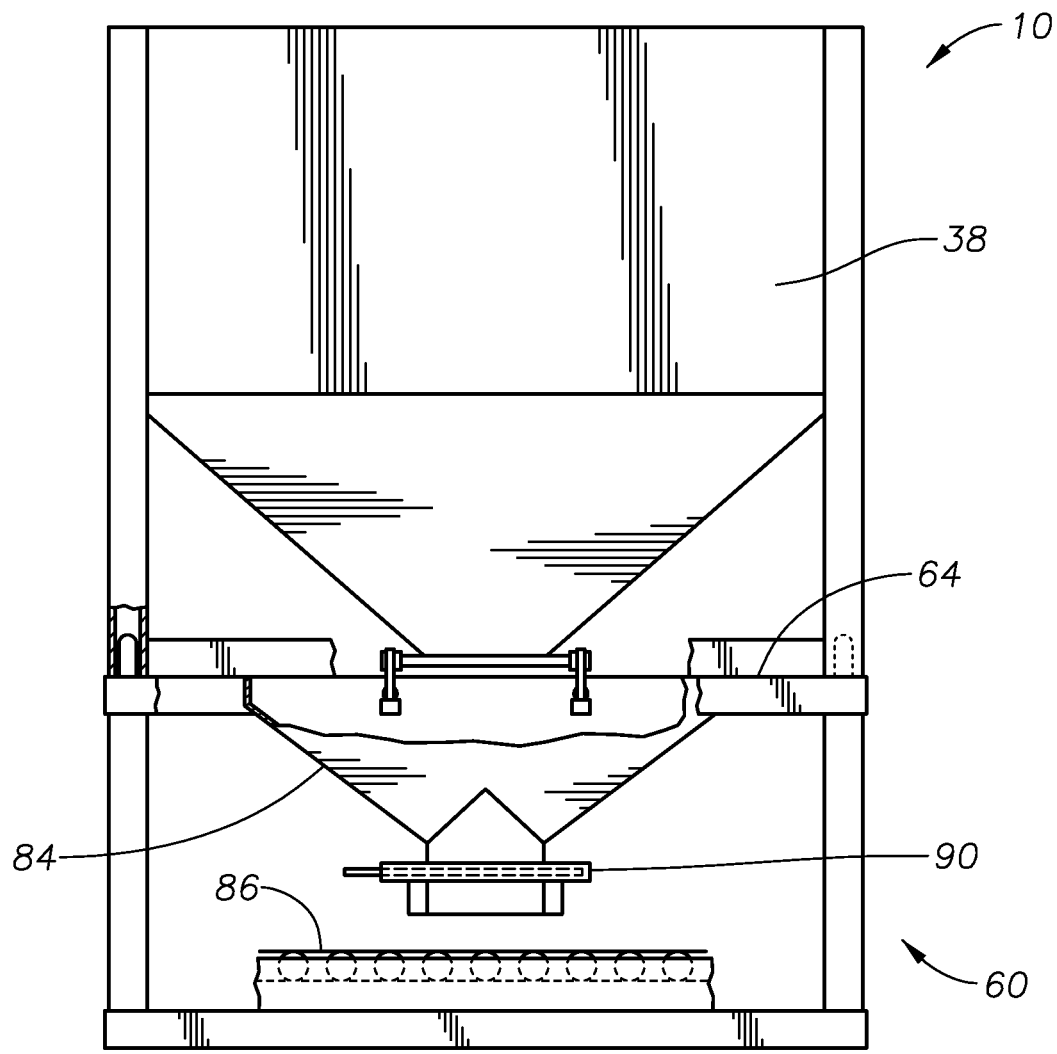
FIG. 8 is a side view of the container as place on the support structure in accordance with the preferred embodiment of the system of the present invention.

FIG. 8 shows a side view in which the container 10 is placed upon the top surface 64 of the support structure 60. The conveyor 86 is illustrated as extending longitudinally. As such when the proppant passes through the metering gate 90 associated with the hopper 84, any proppant within the interior volume 38 of the container 10 can be delivered, in a controlled manner, onto the conveyor.

FIG. 9 is an illustration of containers 110, 112, 114 and 116 as placed upon the support structure 118. The support structure 118 has a sufficient length so as to accommodate the containers 110, 112, 114 and 116. It can be seen that the conveyor 120 is arranged beneath the top surface of the support structure 118 and below the respective hoppers 122, 124, 126 and 128 below the respective containers 110, 112, 114 and 116. The conveyor 120 is an endless conveyor that is suitably wound around sheaves and idlers so as to travel a desired path. The proppant that is discharged from the containers 110, 112, 114 and 116 is discharged onto the conveyor 120 so as to travel therealong and along upwardly extending section 130. The end 132 of the Conveyor 120 will open to a chute 134. The chute 134 can be directed toward the desired purposes at the fracturing site.

As such, the array of containers 110, 112, 114 and 116 can be configured so as to replace existing storage facilities at the fracturing site. The support structure 118, along, with the conveyor 120, can be easily transportable by a truck upon a roadway because of the use of the wheels 136. The forward end 138 can be suitably connected to a truck so as to allow for the easy transport of the system of the present invention. In addition, sensors, control lights, and cameras can be attached to the conveyor 120 to measure one or more conditions or functions of the conveyor or proppant discharge systems. According to an embodiment of the invention, a plurality of sensors and cameras attached to the conveyor 120 are configured to communicate with one or more remote computer systems. One or more sensors and cameras can further be attached to each container. The data measured and transmitted by the sensors or cameras can indicate, for example, the speed of the conveyor 120, weight of the proppant discharged from the containers, the amount of silica dust, and emergency stop signals.

FIG. 10 illustrates an exemplary placement of the containers 110, 112, 114 and 116 upon the support structure 118. The end 138 includes a suitable hitch connection for attachment to a truck. The conveyor 120 extends below the containers 110, 112, 114 and 116 so as to deliver the proppant to the chute 134. FIG. 10 illustrates that the chute 134 is suitably pivotable in cooperation with the end 132 of the conveyor 120 so as to allow for the controlled and directed discharge of the proppant to the desired location.

The container 10 of the present invention is manufactured as a single unit. The gate 44 of the container 10 is specifically engineered to align with the actuator 78 located on the conveying system. The actuator 78 can be hydraulically controlled and can accept the pin 48 which is attached to the gate 44. When the actuator 78 is activated, it can cause the gate 44 to move horizontally so as to allow for the discharge of proppant therefrom.

The container of the present invention can be specifically applied for transport via rail. In particular, the railcar can be designed so as to accommodate up to four containers 10. As such, the railcar can carry approximately 180,000 pounds of proppant when the four containers are placed on the railcar. The railcar can be similar to current inter-modal railcars that carry twenty foot, forty foot and fifty-three foot inter-modal containers. The railcar would include typical inter-modal load-locks which are evenly spaced down to chassis of the railcar. The container should be constructed of materials wide enough to keep the overall loaded weight of the container under currently regulated railroad weight guidelines. Additionally, it must be strong enough to bear the load of the loaded container. This development allows sand mines to load proppant directly into a container 10 in order to speed up the loading process. It also eliminates the need to build a silo storage at the mine site. Once the container arrives at its designated location or region, trans-load processes to pneumatic trailers, silos or flat storage, are thus eliminated.

The present invention is an improved delivery system that can be used at the well-site. The support structure 60 includes a fabricated steel frame upon which multiple containers can be positioned. The containers lock into receptacles that secure the containers to the frame. The container will then sit above a conveying system that delivers the proppant from the container as the gate is opened to a master-conveying belt. The cradle is outfitted with a hydraulic system which can control the opening and closing of the gates. The containers of the present invention can be combined as an attachment or cartridge compatible with existing devices. By replacing existing hoppers on these devices with the removable containers of the present invention, even greater efficiencies can be attained in the proppant delivery process.

The conveying system of the present invention is an alternative method of delivering proppant from the container to the blender belt for the mixing unit once delivered to the well-site. The present invention allows the flow of sand to be metered onto the conveyor belt through a hydraulic system of flow gates. The container is first lifted into position onto the support structure. The bottom flow gate is received by the receptacle of the hydraulic actuator so as to create a lock between the pin of the gate and the hydraulic system. The hydraulic system then opens the flow gate and the proppant so as to gravity-feed into a hopper located on the support structure. Another set of flow gates associated with the hopper system are then opened by way of another hydraulic system. This allows the proppant to be metered and to flow onto a conveyor belt. The conveyor belt can then deliver the proppant to the blender or the T-Belt. The proppant can then be mixed with other materials in the blender.

Currently, expensive pneumatic bulk trucks are utilized in the delivery of proppant to a well-site. Once on-site, the trucker employs a power take-off unit to "blow" the sand into the sand storage devices. This delivery often takes over one (1) hour to complete. By delivering sand to the well in the ten-foot containers of the present invention, the use of expensive pieces of specialized equipment are eliminated. The container can ride on a standard flatbed, step-deck, low-boy, or other more commonly-used trailer. As such, the process of the present invention is able to tap into a much larger universe of available trucking capacity. This can reduce the transportation costs to the well. While pneumatic trailer deliveries are priced in "round trip" miles, the delivery of the container of the present invention by a more common piece of equipment (capable of getting a "back-haul") significantly reduces the overall transportation cost. As an example, there is a great need for parts, tools and other wellhead equipment to be taken off the well-site for repair or return to a manufacturer or rental company. The flatbed trailer, now empty, has the ability to accept that load while it is on-site rather than calling in another trucking company to provide that service. The reduced need for "hot-shot" service is another significant value to the service company and ultimately the exploration and production company.

In terms of returning empty containers to the sand distribution facilities, a total of four (4) empty containers can be returned by a single flatbed trailer. This provides a 4:1 level of efficiency in removing the containers from the well-site. Additionally, at forty foot container chassis will be used in the movement of both empty and full containers. The support structure, just like the containers, can be delivered to the well-site by a typical flatbed truck. The support structure could be towed via, truck to the site in manner similar to any other trailer.

Another important advantage to the present invention is the small footprint that the ten-foot ISO containers of the present invention occupy relative to the capacity of sand that they can store. When the containers are stacked three high, the containers can store approximately 135,000 pounds in a footprint of eighty square feet. The available space at the wellhead, and in potential proppant minimizes the footprint that is required for a given amount of proppant at such a location.

Since environmental and safety concerns surrounding well-site operations is becoming an increasing concern, the present invention minimizes the amount of particulate matter that is released into the air. Proppant is currently delivered to the frac site via pneumatic trailers. Pneumatic pressure is used to pressurize the trailer and then "blow" the material into a sand storage unit. This process creates an immense amount of particulate matter than can then be inhaled by personnel at the frac-site. Additionally, while blowing the sand into the sand storage facility, the sand storage facility must vent the pressurized air to the atmosphere. This creates an even greater exposure to particulate matter. The constant need to take delivery of proppant on-site creates a constant environment of dust and small particles in the air. Because the present invention eliminates pneumatic deliveries, the process of the present invention significantly reduces the amount of particulate matter on the frac-site. The gravity-feed delivery method front the container to the blender greatly improves the safety of well-site personnel. Embodiments of the invention also serve to reduce trucking emissions by reducing the amount of trucks that are being used or waiting. The safety at the wellhead is improved by reducing such truck traffic.

Figure 11:
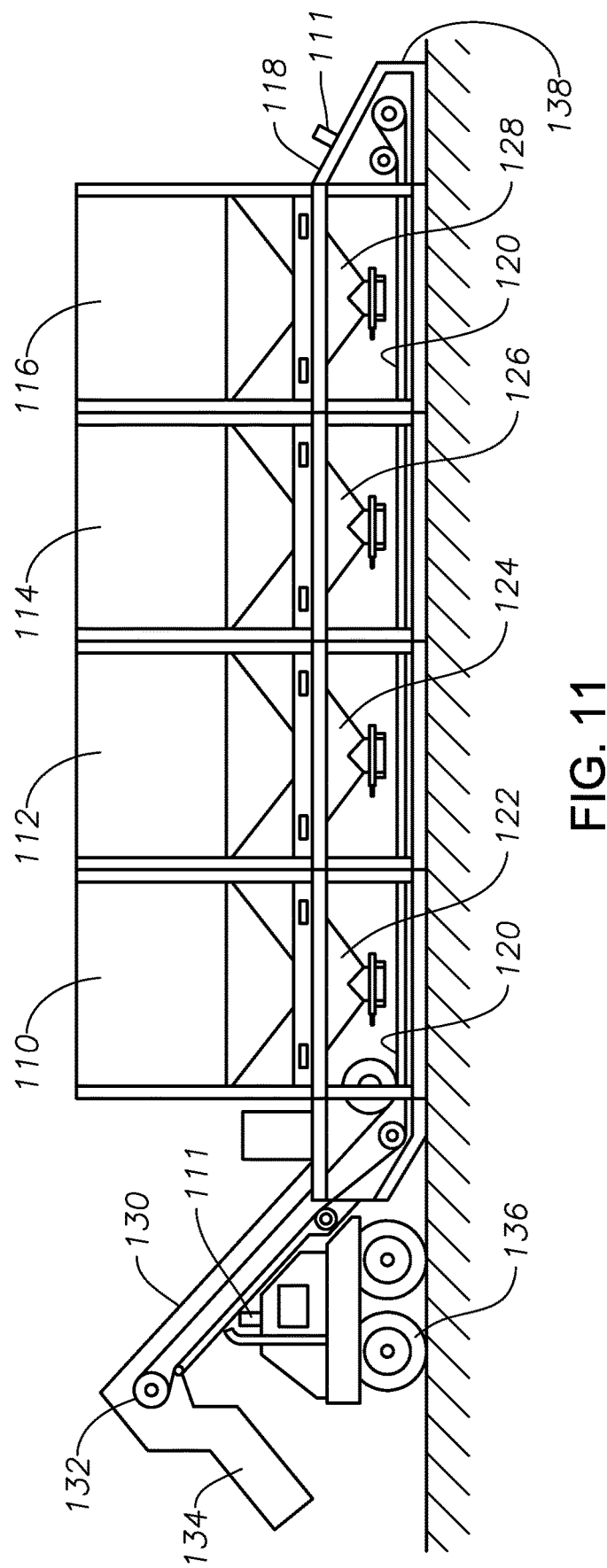
FIG. 11 illustrates the proppant discharge system according to an embodiment of the invention.

As illustrated in FIG. 11, embodiments of the invention further can include one or more conveyor controllers 111 positioned on the conveyor and adapted to control movement of the conveyor. The conveyor controllers 111 are adapted to receive electronic signals from one or more remote computer systems. This enables the conveyor to be remotely controlled by the computer systems.

Figure 12:
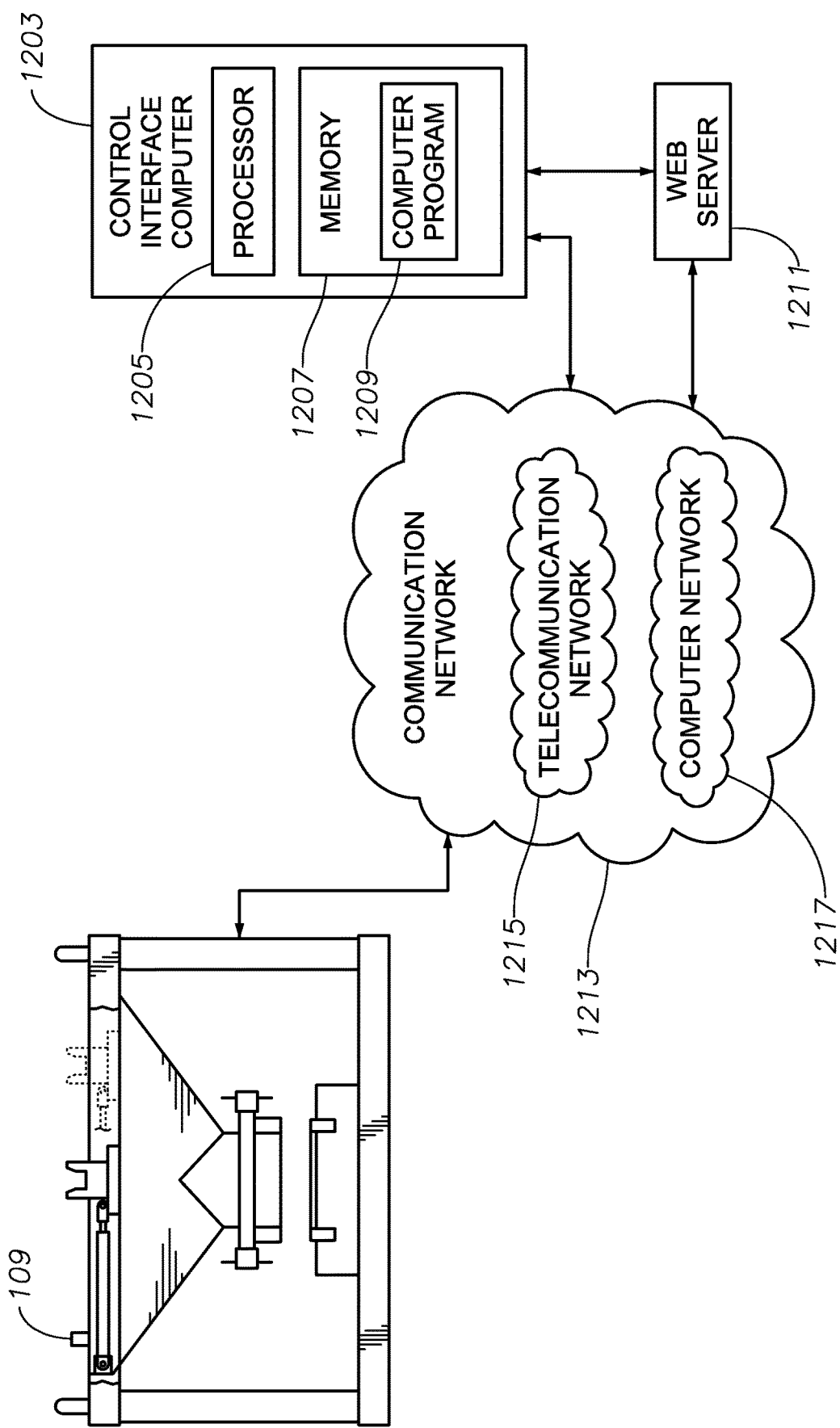
FIG. 12 illustrates a remote computer system for controlling the proppant discharge system according to an embodiment of the invention.
Figure 13:
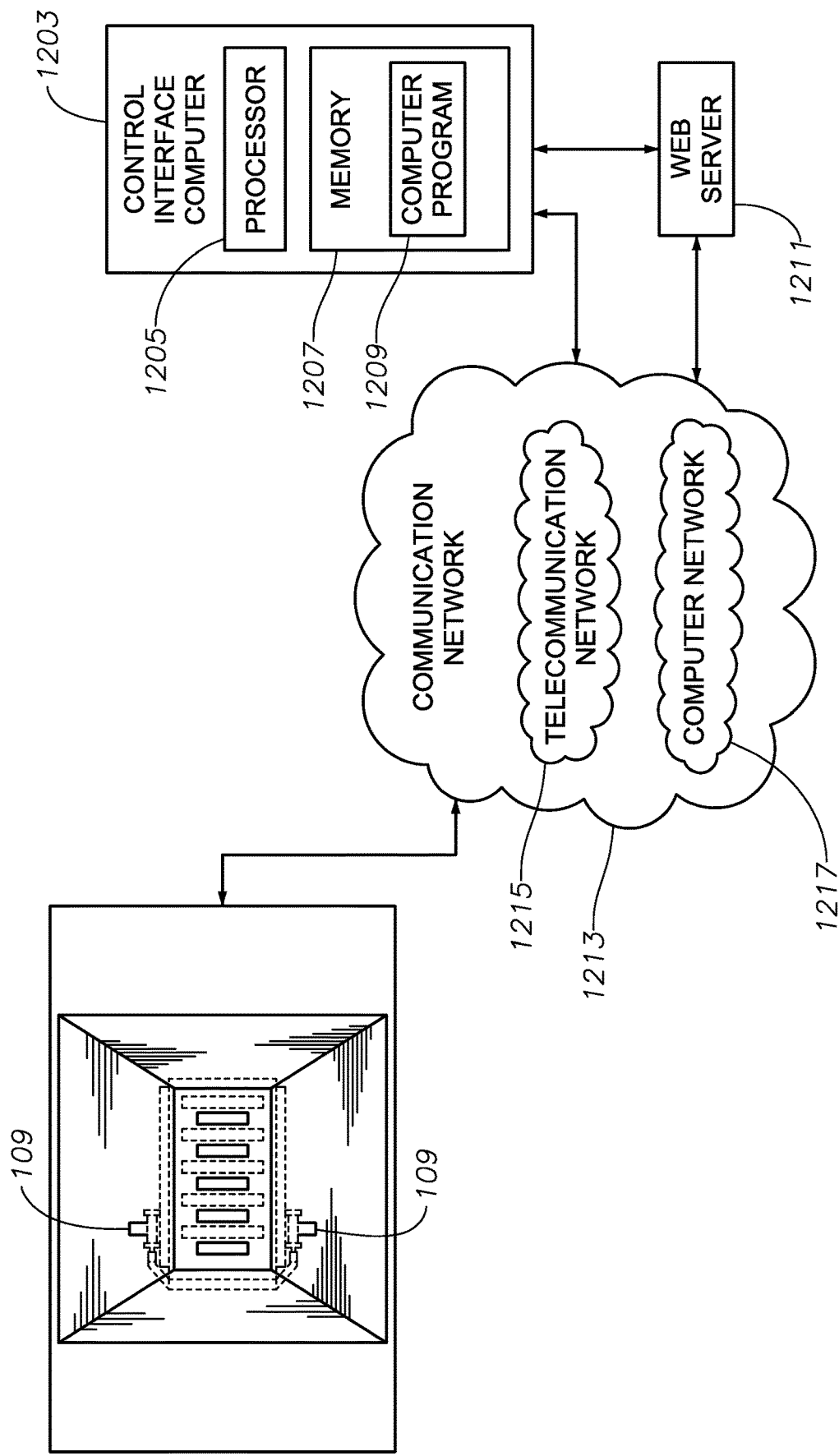
FIG. 13 illustrates a remote computer system for controlling the proppant discharge system according to an alternate embodiment of the invention.

As illustrated in FIGS. 12 and 13, the control interface computer system 1203 can be positioned remote from the proppant discharge system and be configured to remotely control and monitor the operations of the proppant discharge system. The computer system 1203, according to an embodiment, is in communication with a web server 1211 so that the proppant discharge system can be controlled using a web based platform. According to some embodiments, the computer system 1203 is positioned within or near the fracturing site data van and receives data from the proppant discharge system using one or more electrical cables or wireless means known to those skilled in the art. According to certain embodiments, transceivers or repeaters are used to facilitate communication between the proppant discharge system and the control interface computer system 1203. Embodiments of the invention include communicating on or more electrical signals wirelessly, using one or more physical cables, or a combination thereof. For example, the control interface computer 1203 and/or the web server 1211 can link to a communication network 1213. The communication network 1213 can include any telecommunication network 1215 or computer network 1217 or a combination thereof, or can comprise other means of communication as known to those skilled in the art. The communication network 1213 in FIGS. 12 and 13 is shown in communication with actuator 109 in order to remotely actuate the actuator. In embodiments of the invention, a similar configuration is used to communicate with and control the conveyor or other aspects of a proppant discharge system.

The remote computer system includes one or more processors 1204, one or more input/output units adapted to be in communication with the one or more processors 1204, and one or more non-transitory computer-readable memories 1206 in communication with the one or more processors 1204, the one or more memories having one or more computer programs 1208 with computer-readable instructions. The computer program 1208 causes the computer system to perform a number of steps, such as, for example, analyzing, using the one or more processors 1204, data received from one or more of a plurality of sensors attached to a conveyor of a proppant discharge system and a plurality of containers positioned above the conveyor, the data indicating one or more of the following: speed of conveyor, weight of proppant discharged from the container positioned above the conveyor, amount of silica dust, and emergency signals. The computer program 1208 further can include instructions that cause the computer system to perform the operations of transmitting electrical signals to an actuator controller attached to an actuator 109 of the proppant discharge system to adjust an amount of proppant discharged from the container responsive to analyzing the data, transmitting electrical signals to a conveyor controller to adjust movement of the conveyor. The computer program 1208 further can cause the computer system to perform the operations of monitoring feedback data received from one or more of the plurality of sensors to determine whether the proppant discharged from the container is satisfying predetermined site requirement.

Embodiments of the computer program can further cause the system to perform the operations of: receiving, via a communication network, data from one or more of a plurality of sensors of a proppant discharge system having one or more containers positioned above a conveyor, the data indicating an amount of proppant discharged from the one or more container positioned above the conveyor, analyzing, using the one or more processors, the received data to predetermined site requirements, and transmitting electrical signals to an actuator controller attached to an actuator of the proppant discharge system to adjust a rate proppant is discharged from the container responsive to analyzing the data.

Figure 14:
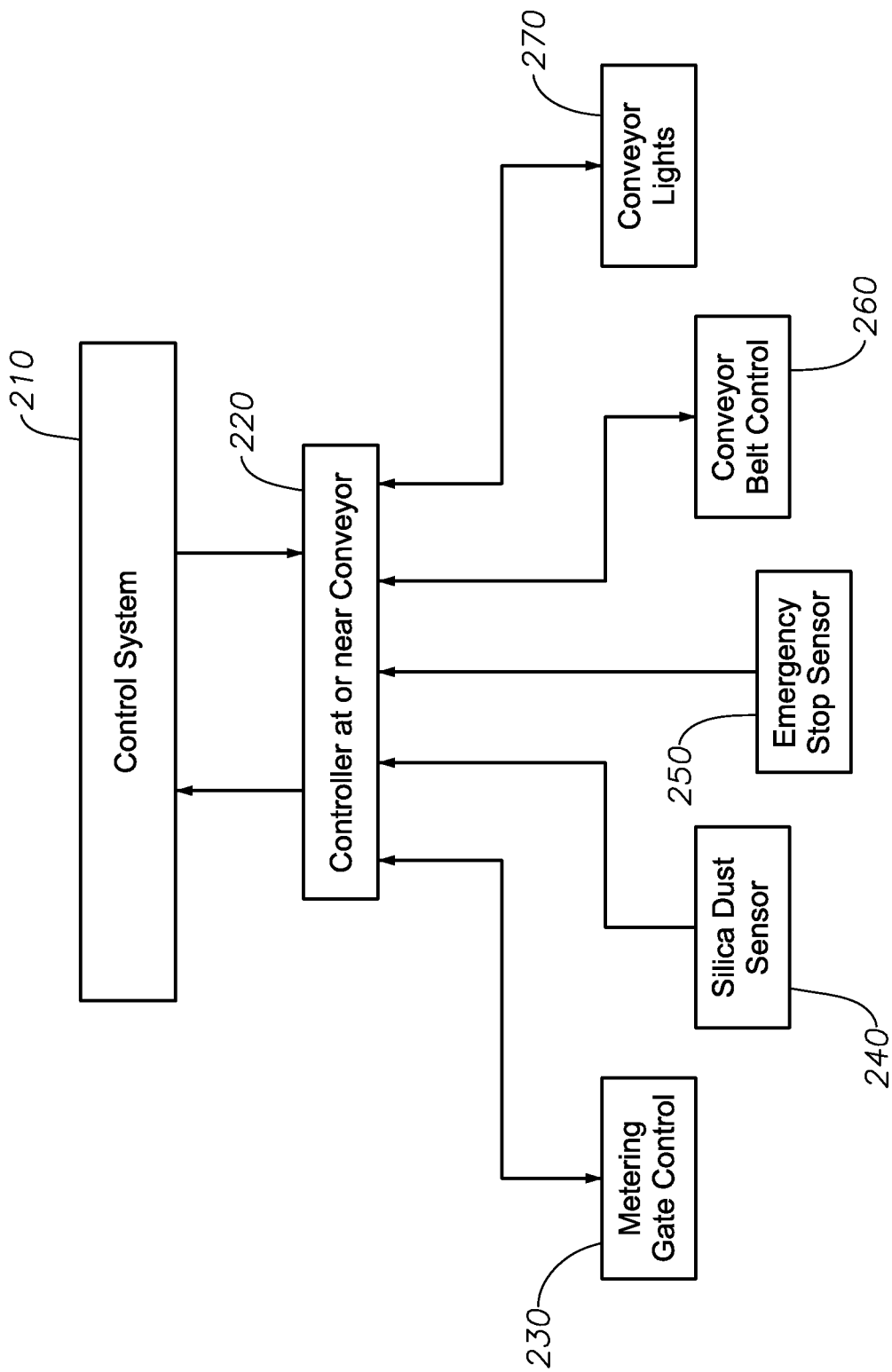
FIG. 14 is a flow diagram illustrating the control system according to an embodiment of the present invention.

FIG. 14 is a flow diagram showing the interaction between different elements of the control system of the present invention. Element 210 of the system is a control system, which may include such components as hardware, software, and other communications elements. The control system 210 is in communication, either wired or wireless, with a controller 220 located at or near the conveyor. As indicated by the arrows between the control system 210 and the controller 220 at the conveyor, communication between these components can be two way.

A series of devices related to different components of the conveyor system also are shown in the diagram. For example, a metering gate control 230, silica dust sensor 240, emergency stop sensor 250, conveyor belt control 260, and conveyor lights 270 are all shown. Each of these components communicates with the controller 220 at the conveyor, and in the case of some components, the communication is two way, as indicated by the arrows.

The system as shown in FIG. 14 allows for remote monitoring and control of different aspects of the system. For example, if an operator in a control room or vehicle at a remote location desires to control the position of the metering gate, the conveyor belt, or turn on/off the conveyor lights, he/she can send the appropriate signal to the controller 220 at the conveyor, which will in turn send the appropriate signal to the metering gate control 230, conveyor belt control 260, or conveyor lights 270. Similarly, sensors, such as the silica dust sensor 240, can send information or signals to the controller 220, which in turn send the information to the control system where it can be received by an operator.

Although particular components of the system are shown in FIG. 14 to have 2-way communication with the controller 220, any components can have such two-way communication.

Figure 15:
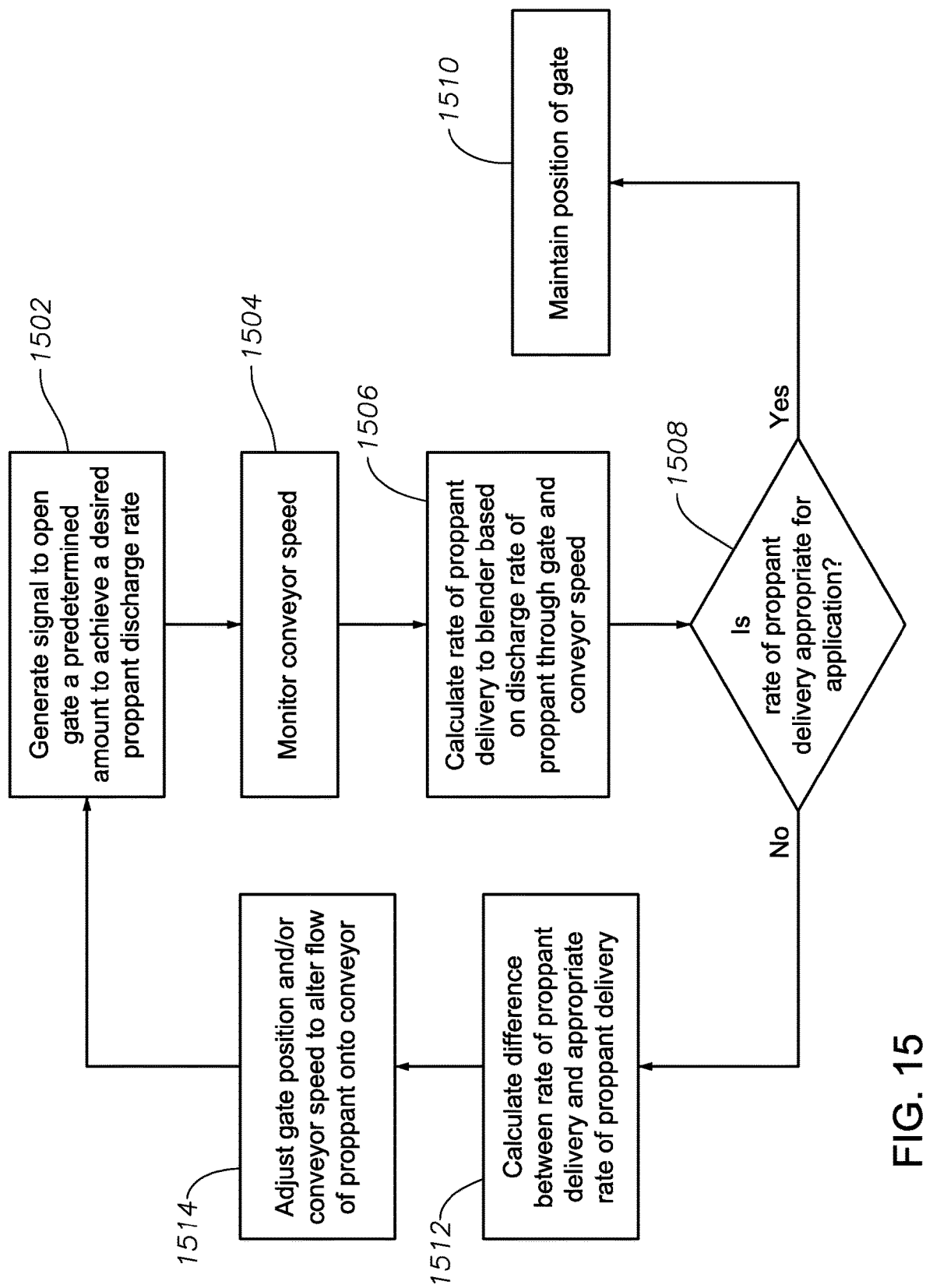
FIG. 15 is a flow diagram illustrating the sequence steps executed by software of the control system according to an embodiment of the present invention.

FIG. 15 is a flow diagram showing a series of steps executed by the control system according to an example embodiment. Specifically, the embodiment of FIG. 15 includes instructions to monitor and control the rate of proppant delivery to a blender using the conveyor. As a first step, the system generates a signal to open the gate a predetermined amount to achieve a desired proppant discharge rate 1502 from the container onto the conveyor. The system also monitors the speed of the conveyor 1504, such as by receiving a signal from the conveyor belt controller. Based on the discharge rate of the proppant from the container and the speed of the conveyor, the system calculates the rate of proppant delivery to a blender 1506. At step 1506, it is determined whether the rate of proppant delivery is appropriate 1508. If the rate of proppant delivery is acceptable, the system maintains the position of the gate 1510. If the rate needs to be adjusted, then the system can calculate the difference between the current rate of proppant delivery and an appropriate rate of proppant delivery 1512, and adjust the gate position and/or conveyor speed to adjust the rate of proppant delivery to the blender 1514.

Figure 16:
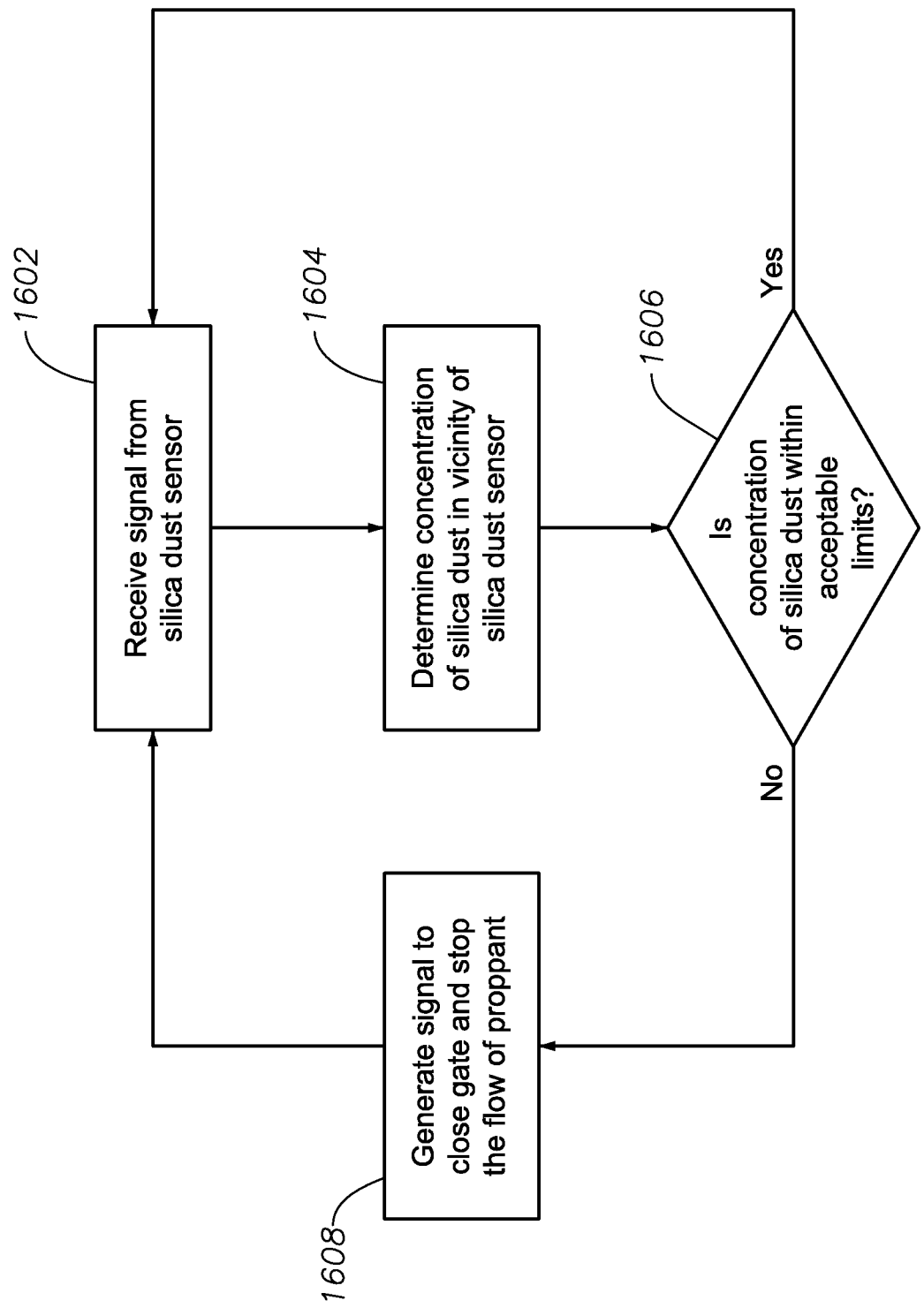
FIG. 16 is a flow diagram illustrating the sequence steps executed by software of the control system according to an alternate embodiment of the present invention.

FIG. 16 is a flow diagram showing a series of steps executed by the control system according to another example embodiment. Specifically, the embodiment of FIG. 16 includes receiving a signal from the silica dust sensor 1602 and determining the concentration of silica dust in the vicinity of one or more silica dust sensors 1604. At step 1606, a determination is made whether the concentration of silica dust is within acceptable limits. If the concentration of silica dust is not within acceptable limits, the system generates and sends a signal to close the gate and stop the flow of proppant 1608. The system can continue to receive signals from the silica dust sensor 1602.

The steps carried out in the embodiments exemplified in FIGS. 15 and 16 are illustrative only. In practice, the system and/or associated software can be programmed to carry out many different operations, as known by persons of ordinary skill in the art. For example, in certain embodiments, the steps disclosed herein can be performed in various orders. The foregoing disclosure and description of the invention is illustrative and explanatory thereof. Various changes in the details of the illustrated construction, or in the steps of the described method, can be made within the scope of the present invention without departing from the true spirit of the invention.

Work Flow for Transporting Proppant

Delivery of proppant from a sand mine to a well site is a multistep process that is typically inefficient and can be dangerous. The process starts at the sand mine, where issues such as limited rail infrastructure, limited storage facilities, and labor scheduling challenges increase cost and inefficiency. Next, proppant is moved from the sand mine by rail, where issues with equipment shortage, limited storage, rail car demurrage, gridlock, and shrinkage are encountered. The typical proppant logistics chain for the oil and gas industry is highly fragmented and many of the requisite functions are performed with manual labor. Data is poorly organized and market visibility is low. Companies that attempt to vertically integrate these functions are few and the market is highly "silo'd" in regard to proppant logistics management, in terms of both physical systems and data management systems.

From the rail line, the proppant is typically delivered to a trans-load storage facility, where issues such as limited storage, dust and conductivity issues, expensive vertical silos, non-mobility/non-scalability of storage containers, loading bottlenecks, and contamination can cause problems. Delivery from the trans-load storage facility to a well site can introduce issues such as unsafe levels of pad/road traffic, silica dust inhalation risks, detention charges, and long discharge times for pneumatic trailers. All of these issues can combine to result in lost revenue/productivity, excess capital investment, and increased safety, regulatory, and public relations risk. Thus, there is a need for a better proppant distribution and logistics solution. Described herein is a novel and highly efficient process in regard to physical proppant handling, alternative methods to date have not been available for streamlining communications and data handling (because such alternative methods do not exist or are not readily available to the industry. The business system described herein provides a capability by creating improved methods for handling data and managing the other functional elements (in addition to physical movements) required to efficiently manage a logistics chain.

Figure 17:
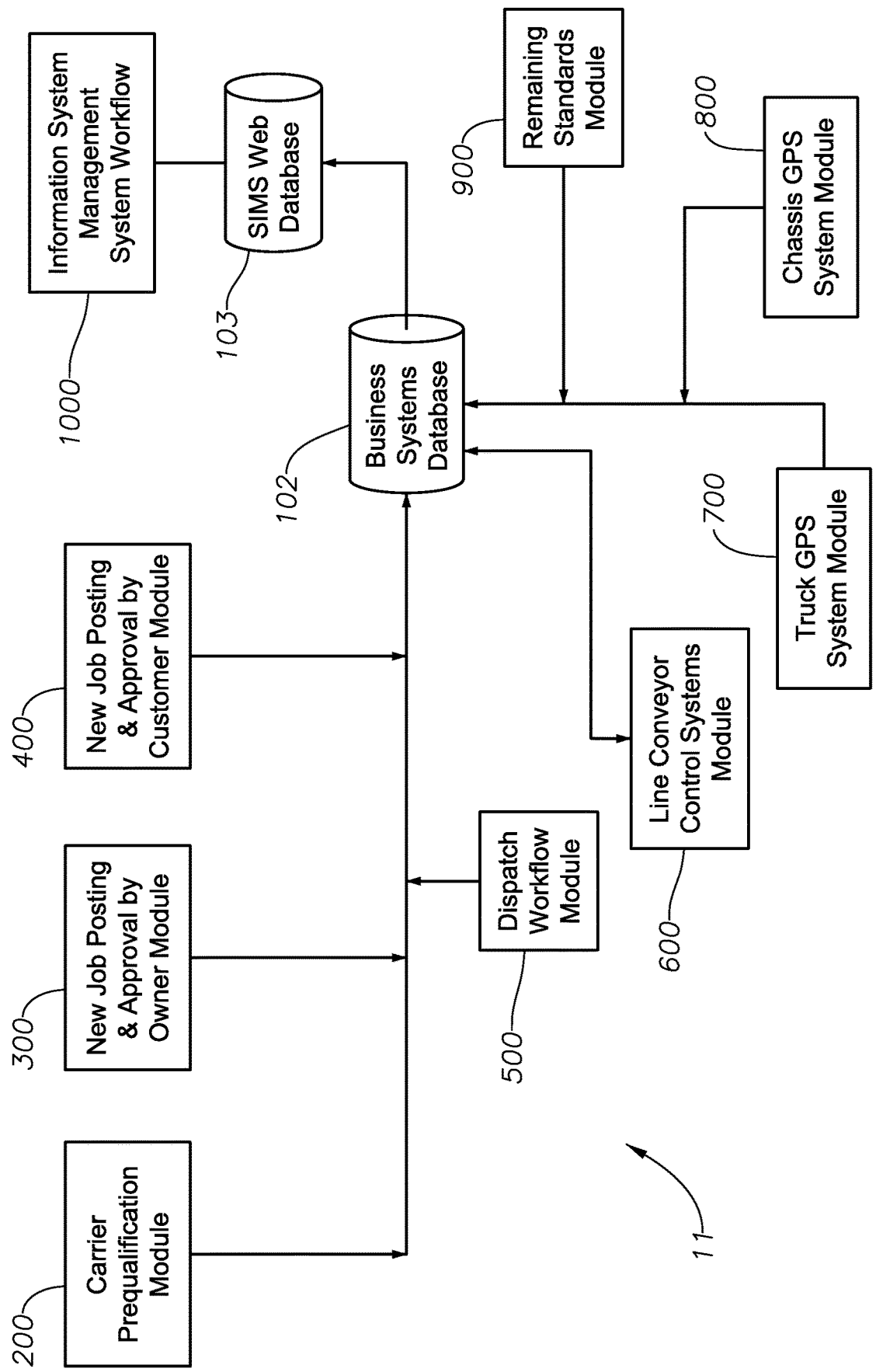
FIG. 17 is a schematic view of a database communicating with input and output modules.

Shown in a schematic view in FIG. 17 is one example of a business system workflow 11; where in an example the business system includes tools, technology, and intelligence working together to provide high-end visibility of movement/moment of a delivery system (such as for delivering proppant). An advantage provided with the business system workflow 11 is the ability of streamlined information management that reduces costs, improves visibility and transparency for customers, and that allows for more accurate tracking of products and field assets. In an example, the business system workflow 11 is an integrated collection of software tools, information technology and data collection equipment that provides high-end visibility for all movements of data and equipment used in a proppant delivery system. The business system workflow 11 can provide communication between all parties involved in a proppant logistics/delivery chain, such as including but not limited to sand mines, rail terminals, loading facilities, third party logistics (3PL's), trucking companies, manufacturers, repair shops, vendors and drivers, employees, and operations and management of customers and/or suppliers. Currently known methods of these activities are conducted in an ad hoc, uncoordinated fashion, resulting in increased operating costs, poor market visibility and a high degree of inefficiency. In an example, equipment used to transport/store proppant provides a unique, fully-integrated and fully containerized method for managing the physical transport, storage and handling of proppant across the entire logistics chain. In one exemplary embodiment, adding an integrated software solution to the proppant delivery system improves data management, improves sourcing of third party transportation assets, tracks product inventories, and manages other assets in the field. The system also allows this information to be integrated with back-office functions while providing customers with unprecedented access to real-time information pertaining to the status of jobs conducted by the operator of the business system workflow 11 (e.g. owner). In an embodiment the business system uses four types of communication, i.e., software applications, the world wide web, satellite, cellular, and a standalone back office application optionally supported by a central database. Embodiments exist where the systems illustrated in FIG. 1 use the combination of all or some of these types of communication to achieve the required task/s in their respective segments. Exemplary systems include: (1) a comprehensive system for managing data and information collected during proppant operations, including back-office integration and data transfer to customers and other parties; (2) a system for operating an automated reverse auction marketplace/load board to streamline the sourcing of third party trucking services; (3) a system to automate real-time job dispatch functions; and (4) a system for communication and control functions related to owner field assets, including conveyers, GPS tracking of owner trucks and chassis, and real time tracking of product inventory. An advantage of integrating the above described information technology functions with existing owner equipment and logistics processes creates a comprehensive and holistic proppant management system that addresses all aspects of the proppant logistics chain. Such a system is unique to the market time and provides a solution that represents a dramatic improvement to existing industry practices.

In the illustrated example of the business system workflow overview 11 of FIG. 17, a business systems database 100 receives information from modules, which include a prequalification process module 200, a new job posting and approval by owner module 300, new job posting and approval by customer module 400, a dispatch workflow module 500, a lime conveyor control systems module 600, a truck GPS system module 700, a chassis GPS system module 800, and a remaining standards module 900. The business systems database 100 selectively outputs at certain intervals information to a SIMS cloud web database 103, that then selectively outputs to an information management system workflow 1000. In an embodiment modules 200, 300, and 400 define a load auction board system and which integrates the logistics operations between carriers, customers, and owner/proppant provider. The example board system automates processes and increases productivity and visibility for carriers, drivers, dispatch teams and customers. Key features of the board system include approved carriers selection process, job bidding process, accepting/rejecting job by carriers, billing/payment transactions, as well as carrier driver management.

Figure 18:
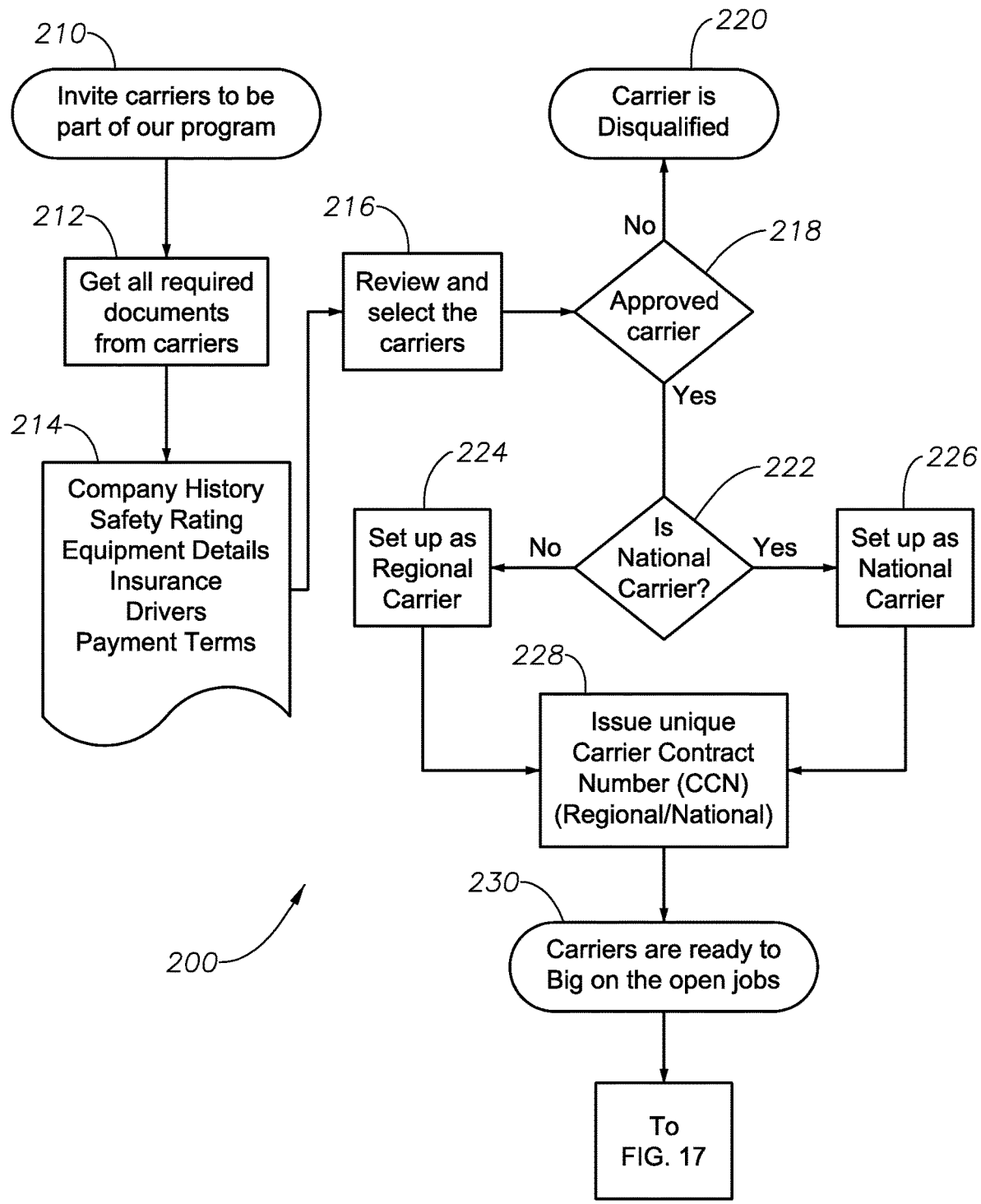
FIG. 18 is a schematic view of a prequalification process for a carrier module of FIG. 17.

Referring now to FIG. 18, shown in schematic view is a flowchart of an example of the prequalification process module 200, which in an initiation step 210 carriers are invited to be part of a program. In step 212 required documents are received from carriers, and then in step 214 outputs are made of company history, safety rating, equipment details, insurance, and driver's payment terms. In step 216, the carriers are reviewed and selected; this step optionally includes verifying the required documents. In step 218, a decision step asks if a carrier is approved, if carrier is not approved, then in step 220 the carrier is disqualified. If carrier is approved in step 218, then in step 222 the question is asked is the carrier is national, if no, then in step 224 carrier is set up as a regional carrier, if in step 222 the answer is yes, then in step 226 the carrier is set up as a national carrier. In step 228, which follows both steps 224 and 226, a unique carrier contract number ("CCN") is issued for both the regional and national carriers. In termination step 230, it is indicated that the carriers are ready to bid on the open jobs; further in step 230, information is input into the business systems database 101 (FIG. 17).

Figure 19:
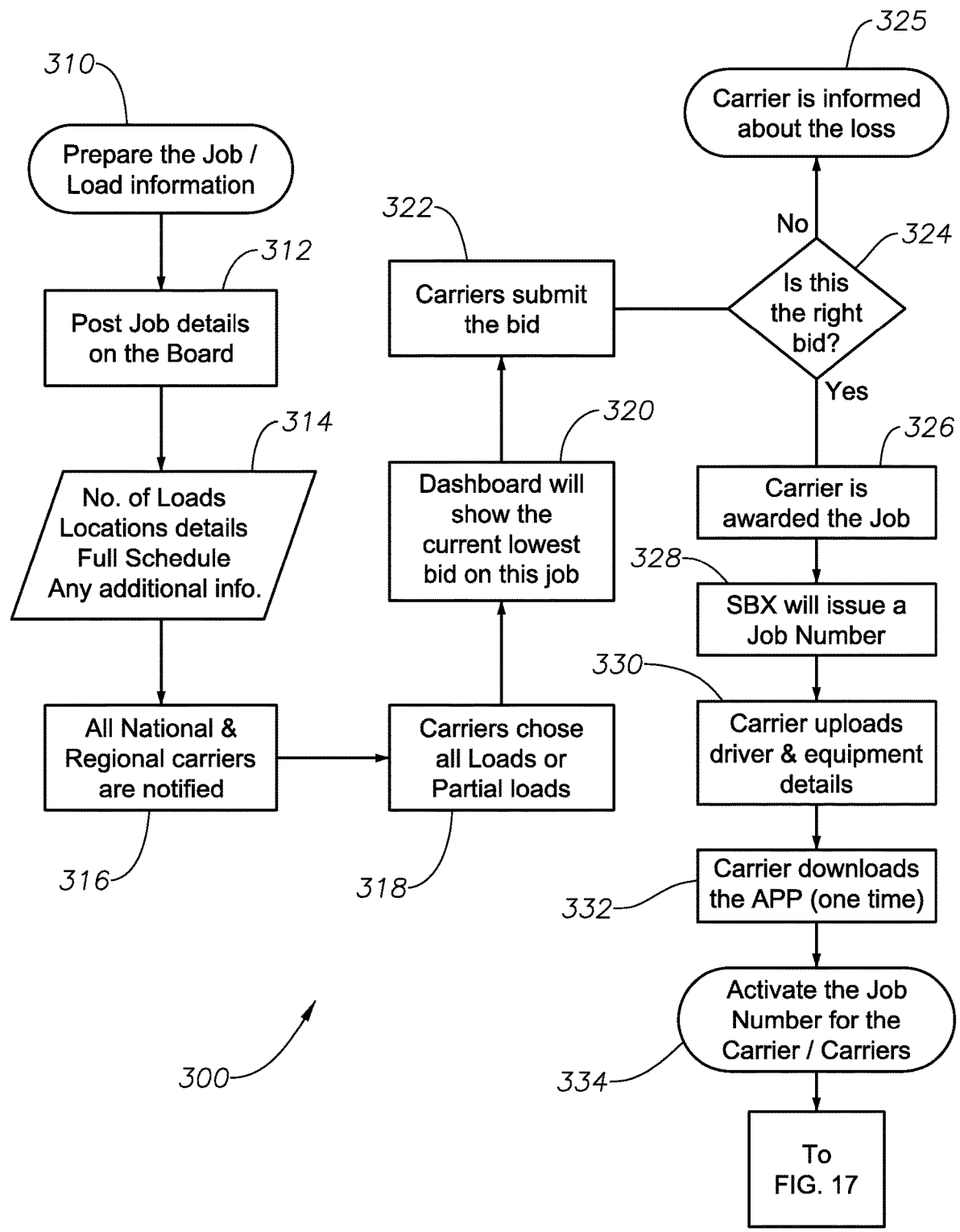
FIG. 19 is a schematic view of a new job posting and approval module by owner of FIG. 17.

FIG. 19 is a schematic flowchart of the new job posting and approval by customer module 300. Included in module 300 is initiation step 310 having an instruction that the job is prepared and information loaded. In step 312 the job details are posted on a board, where details include region, number of wells, total proppant volume, possible number of loads, and the like. Output from step 312, shown in step 314, reflects the number of loads, location details, full schedule, and any additional pertinent information. Shown in step 316 is that all national and regional carriers are then notified. In step 318, the carriers choose all loads or partial loads. In step 320 the dashboard reflects the current lowest bid on the job, and in step 322 the carriers submit the bid. Downstream of step 322 is decision step 324 that asks if the bid is correct. If the bid of step 324 is not correct, then in step 325 the carrier is informed about the loss of bid. If the answer is yes in decision step 324, then in step 326 the carrier is awarded the job. Subsequently, in step 328 a job number is issued, and in step 330 carrier uploads driver and equipment details, then in step 332 carrier downloads the application (one time). In termination step 334 the job number for the carrier or carriers is activated, and that output is transmitted to the business systems database 101 of FIG. 17.

Figure 20:
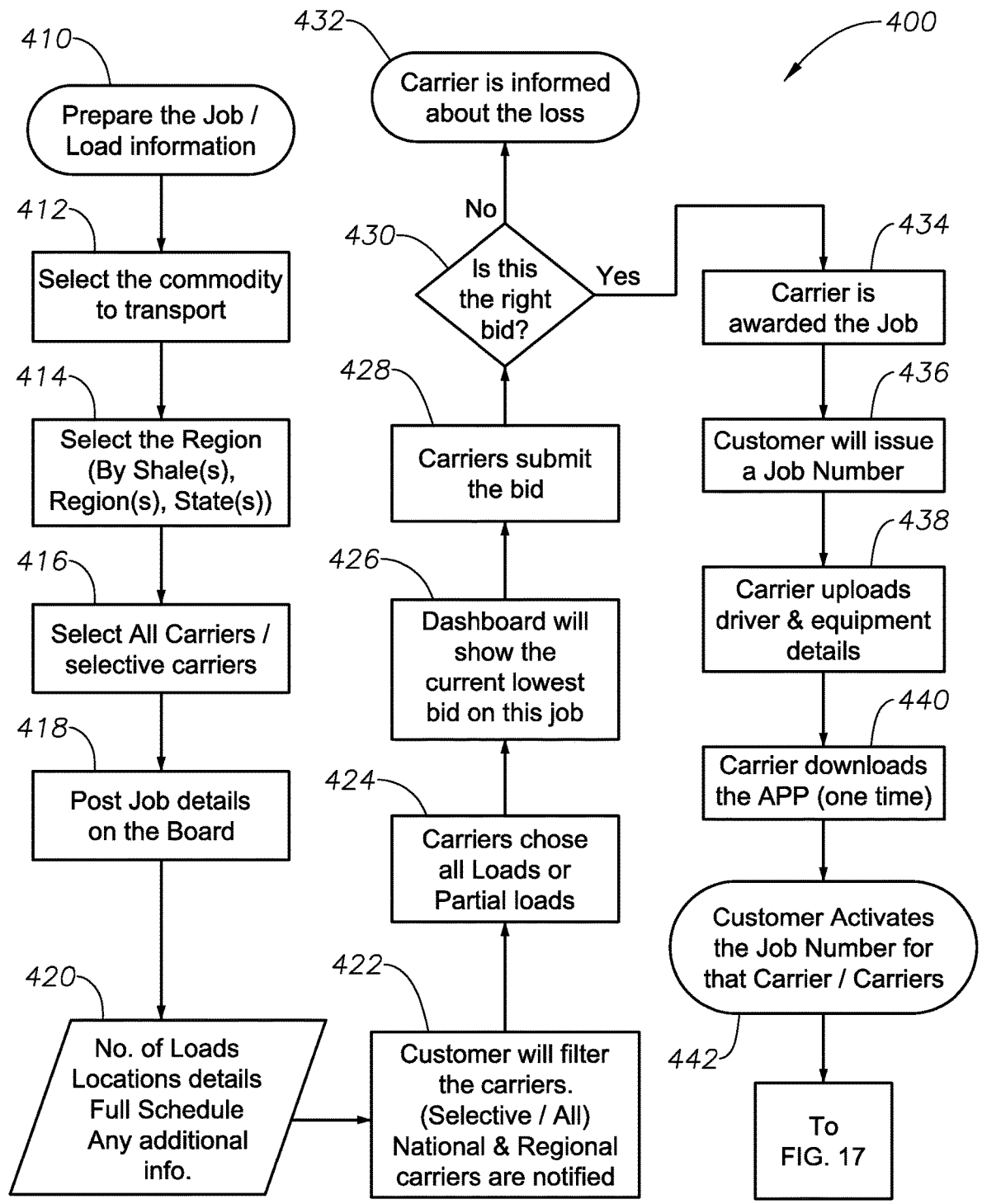
FIG. 20 is a schematic view of a new job posting and approval module by customer of FIG. 17.

FIG. 20 is a schematic flowchart of a new job posting and approval by customer that initiates in step 410 with an input that the job/load information is prepared, and in step 412 the commodity to transport is selected. In step 414 the decision by shale(s), region(s), state(s) is selected. In step 416 all carriers/selective carriers are selected and in step 418 job details are posted on the board. Optionally, selective carriers ae informed via application, text, email, and/or world wide web. In step 420 the number of loads, location details, well information, dates, full schedule, and any additional information is input, and in step 422 the customer filters the carriers (selective/all) national and regional carriers are notified. In step 424 the carriers choose all loads or partial loads, and in step 426 the dashboard shows the current lowest bid on the job. Subsequently, in step 428 the carriers submit the bids, and in decision step 430 it is asked if the bid is right, if not then in step 432 the carrier is informed about the loss. If the answer in step 430 is yes, then carrier is awarded the job in step 434. In step 436 the customer issues a job number, in step 438 the carrier uploads driver and equipment details and in step 440 carrier downloads the application (one time). In termination step 442, customer activates a job number for carrier/carriers, and that information is transmitted to the business systems database 100 of FIG. 1. In an alternative, the carrier has an option of rejecting the load, and if so, other carriers can be offered the load. Carriers can upload all drivers assigned for jobs with relevant contact information.

Figure 21:
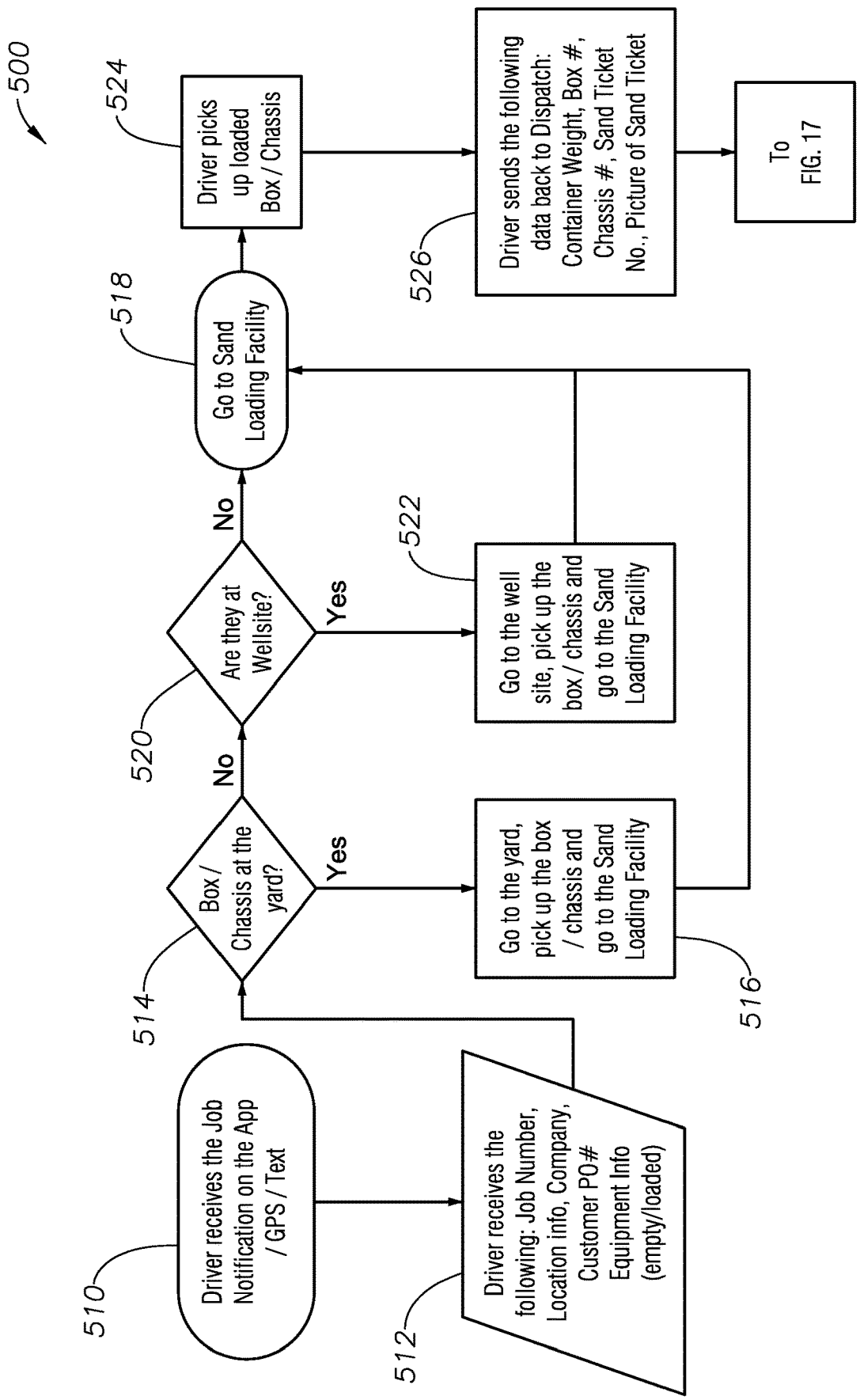
FIG. 21 is a schematic view of a dispatch work flow module of FIG. 17.

FIG. 21 shows an example schematic of a dispatch workflow module 500 that initiates with step 510 and where the driver optionally installs application, and thus driver can receives job notification via the application, as well as per GPS or text; and can otherwise communicate with one or more of owner, customer, and carrier dispatch team. In step 512 the driver receives job number, location information, company, customer purchase order number, equipment information (i.e., empty or loaded). In decision step 514 it is asked if the box/chassis is at the yard, if yes, then in step 516 the box/chassis is picked up at the yard and taken to a sand loading facility. Subsequently, in step 518 the workflow is taken to the sand loading facility. If the answer is no to decision step 514, a subsequent question is asked if the box or chassis is at the well site. If yes, then in step 522 an instruction is issued to go to the well site, pick up the box/chassis and go to the sand loading facility and proceed to step 518. In step 524 the driver picks up the loaded box/chassis and then in step 526 the driver sends data to the dispatch that contains one or more of container weight, box number, chassis number, sand ticket number, and image of sand ticket. This information is then transferred to the business systems database 100 of FIG. 1.

Figure 22:
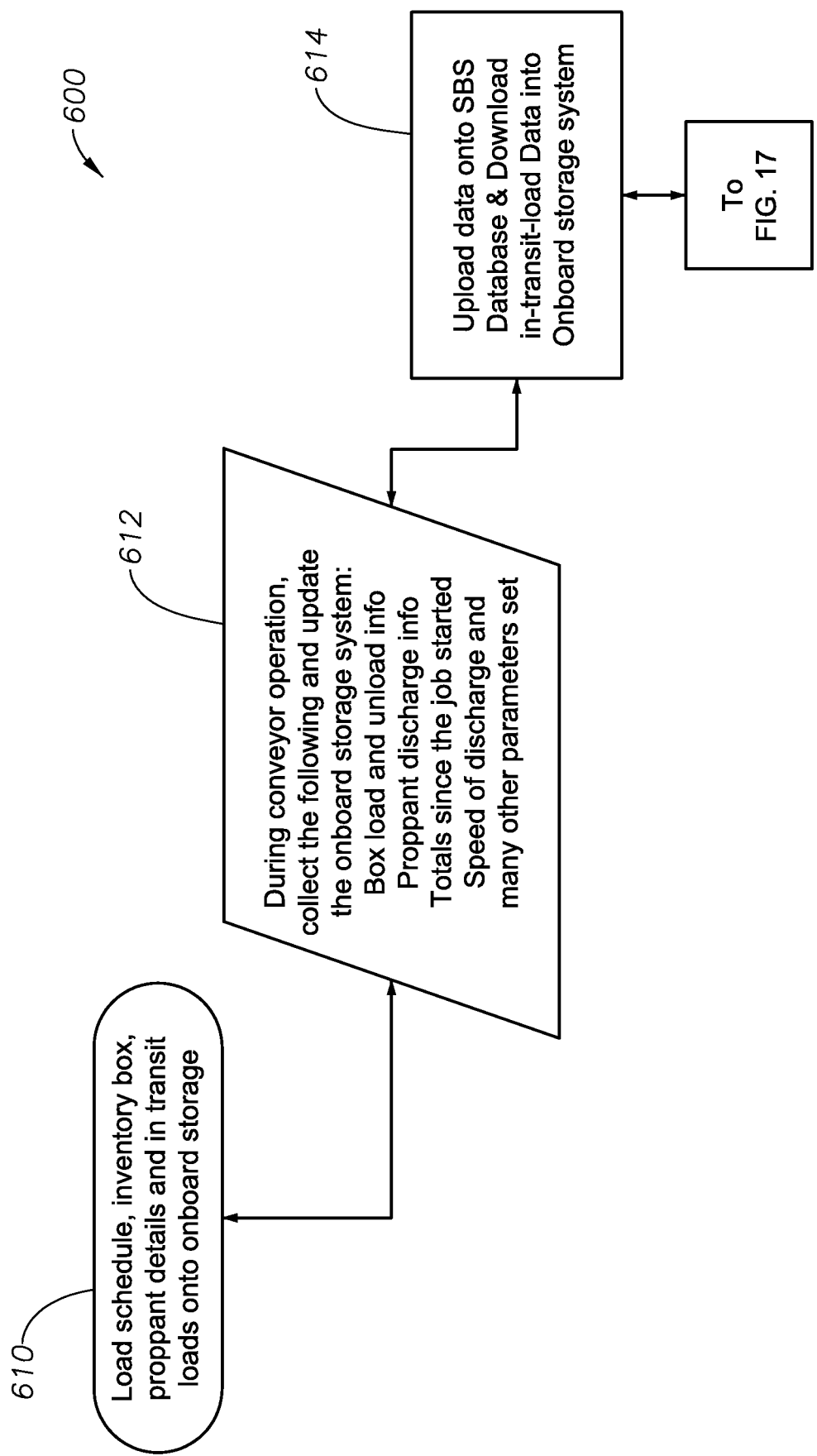
FIG. 22 is a schematic view of a line conveyer control system module of FIG. 17.

FIG. 22 is an example schematic of a line conveyor control system module 600 and which includes initiation step 610 where the load schedule, inventory, box, proppant details and in-transit loads onto onboard storage are input into a computer system. Optionally in this step the, conveyor is started and connection is made to the business system workflow (FIG. 17). Current onsite inventory data can be uploaded via a universal serial bus ("USB") drive (not shown). In step 612, during conveyor operation, the information is collected and updated (at optionally predefined intervals that includes onboard storage system, box load, unload info, proppant discharge info, total since job started, speed of discharge, and other relevant parameters are set In subsequent step 614, data is loaded onto the business systems database 100 of FIG. 1 and furthermore, data from database 100 is downloaded onto an onboard storage system.

Examples of the lime conveyor control system module 600 include on board highly sophisticated equipment, that integrates with the other modules of the business system overview 11 (FIG. 17) and which connects to a customer data van at a well site. An advantage of the above described module 600 is that real time data can be provided, such as proppant consumption and proppant inventory levels at: (1) well site; (2) to customers, (3) operations; (4) dispatch; (5) accounting and management. By using GPS and cellular technologies, box tags, the application, worldwide web, standalone application, combining with on board load cells, TAG Readers, transducers, encoders and display units, this highly integrated system can deliver valuable information real time. Advantages of implementing module 600 include: receiving/updating inventory data from/to owner, controlling slide gates on the box/hopper gates on a conveyor, reading the tags on the box with onboard tag readers, measuring the sand flow from the boxes to the conveyor and to the blender tub, measuring sand levels in the boxes, connecting to data van, providing data van with onsite inventory levels and in-route loads, updating data van and owner at regular intervals with data (i.e., total volume proppants planned, delivered, in use, total consumed, balance left), downloading newly arrived boxes, and updating empty box inventory level. Alternatively, box tags are read using onboard tag readers and proppant information (type, weight) is derived from onboard storage and show on the display unit. Operator can confirm the proppant type, which would update all systems (data van, business system, owner). In an embodiment, onboard transducer, encoder and other sensors calculate the speed and amount of sand being discharged into blender hopper. This information is optionally sent to data van in real time and updated to the business system workflow 11 at regular intervals. At any time a display unit (not shown) on the conveyor can show what boxes are currently loaded on the conveyor, proppant levels in each box, total inventory planned, available inventory on site, total consumed, and the balance due. System also optionally can read the times when the boxes were loaded and unloaded, time job started and ended and all other relevant calculations needed by various parties.

This business system workflow 11 further optionally provides real time equipment location and tracking capabilities to customers and dispatch teams, using on board interactive GPS tracking system for trucks and non-interactive GPS tracking system for container chassis. By combining equipment data from the business system workflow 11 and tracking information through vendor API's, complete visibility of the equipment assigned to each job/customer is provided, thus giving greater control to dispatch over the proppant delivery schedule. With high visibility of the equipment together with inventory information from business system workflow 11, dispatch can implement highly efficient delivery schedule, by matching proppant delivery schedule with pump schedule, and increase equipment utilization, thus increasing the returns on the capital investment. Key features include assigning equipment to different groups, by job number or customer, or region, ability to track and manage equipment on the fly individually or by group, ability to create geofences to record in and out of loading facilities and well sites, as well as repair facilities, ability to track equipment availability at various locations for better scheduling and utilization, ability to generate reports on current/historical mapping, land mark and geofence, exception-based and advanced fleet analysis. In an example of the work flow, a tractor has an onboard GPS with display unit, a driver confirms the control ID for that load along with container number, proppant type, proppant net weight, container gross weight, total unit weight (tractor, chassis, box and proppant). This information is uploaded into system 10, when the driver leaves the geofence, system records the event to system 10. When the driver reaches destination geofence, system records the event once again and updates system 10. System 10 automatically updates the inventory levels at destination with the details obtained from the driver earlier. In examples with the trailer having GPS, but not the tractor, driver uses the application, such as on his phone, to provide chassis, container and proppant information to dispatch. Here information is uploaded into business system workflow 11. When the chassis leaves the geofence (irrespective of the trucking company), system records the event in business system workflow 11. When the chassis reaches destination geofence, system updates the event once again and updates the inventory levels at destination. Tractor GPS collects engine data and uploads into system 10 for further analysis. System 10 can optionally generate all types of reports required by customer, carrier, driver, dispatch, fleet, accounting and management.

Figure 23:
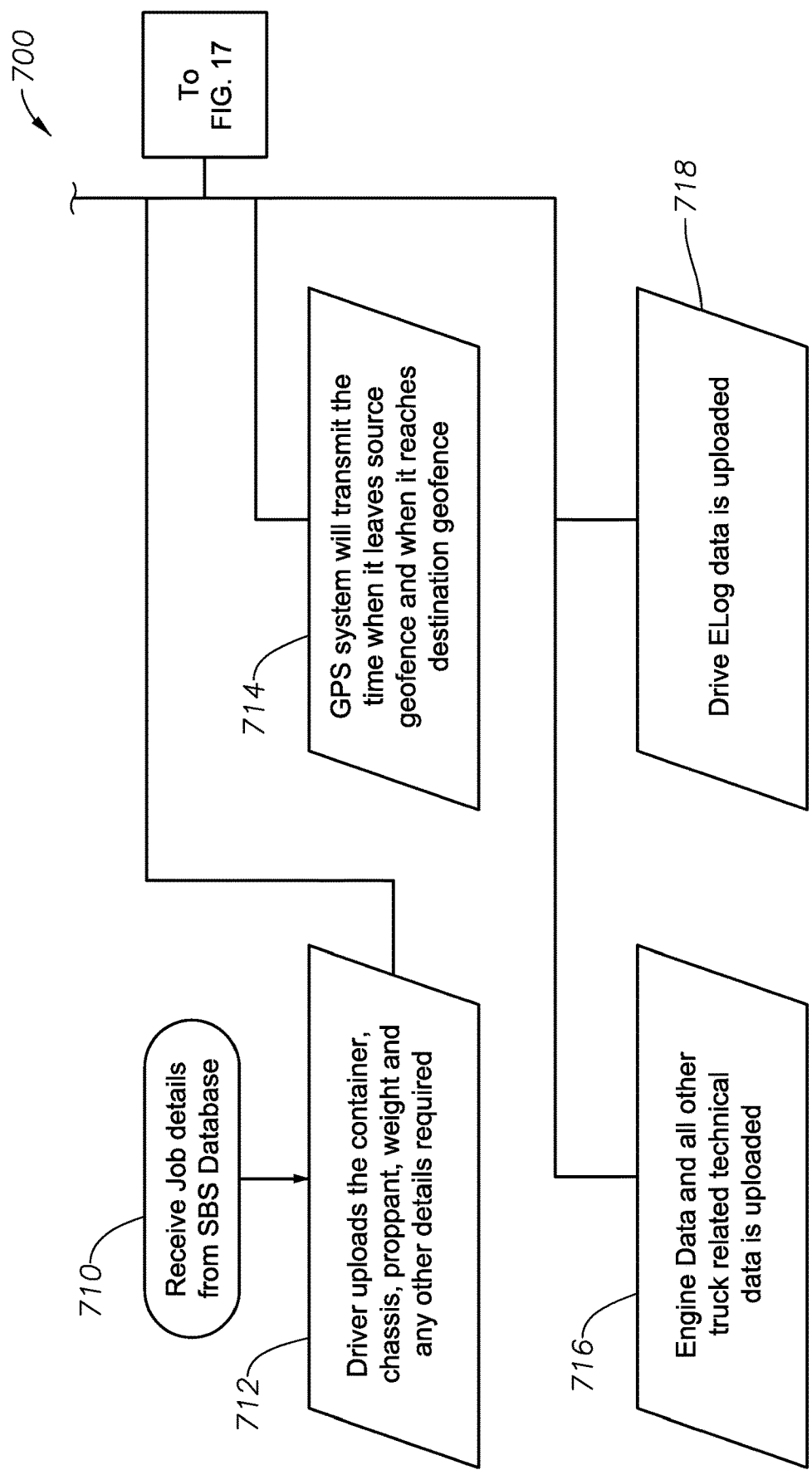
FIG. 23 is a schematic view of a truck GPS system module of FIG. 17.

FIG. 23 shows a schematic of a truck GPS system module 700, in an initiation step 710 job details are received from business systems database 101 of FIG. 17. In output step 712, driver uploads information about the container, chassis, proppant, weight and any other relevant details. An output of this information can be directed to the business systems database 100. In step 714, the GPS system transmits the time it leaves the source geofence and when it reaches destination geofence, this information is transmitted directly to the business systems database 100. Step 716 indicates engine data and all other truck related technical data is uploaded into the business systems database 100, and step 718 is that the driver c-log data is uploaded into the business systems database 101 of FIG. 17.

Figure 24:
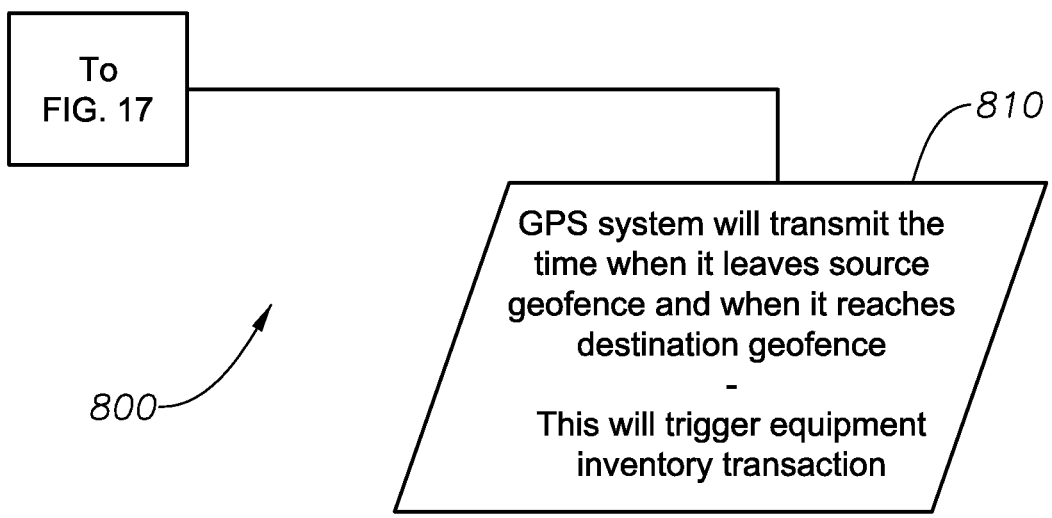
FIG. 24 is a schematic view of a chassis GPS system module of FIG. 17.

FIG. 24 shows a chassis GPS system module 800 and where it is shown the GPS system transmits the time it leaves the source geofence and when it reaches destination geofence and that will trigger equipment inventory transaction. This information is fed into the business systems database 101 of FIG. 17.

Figure 25:
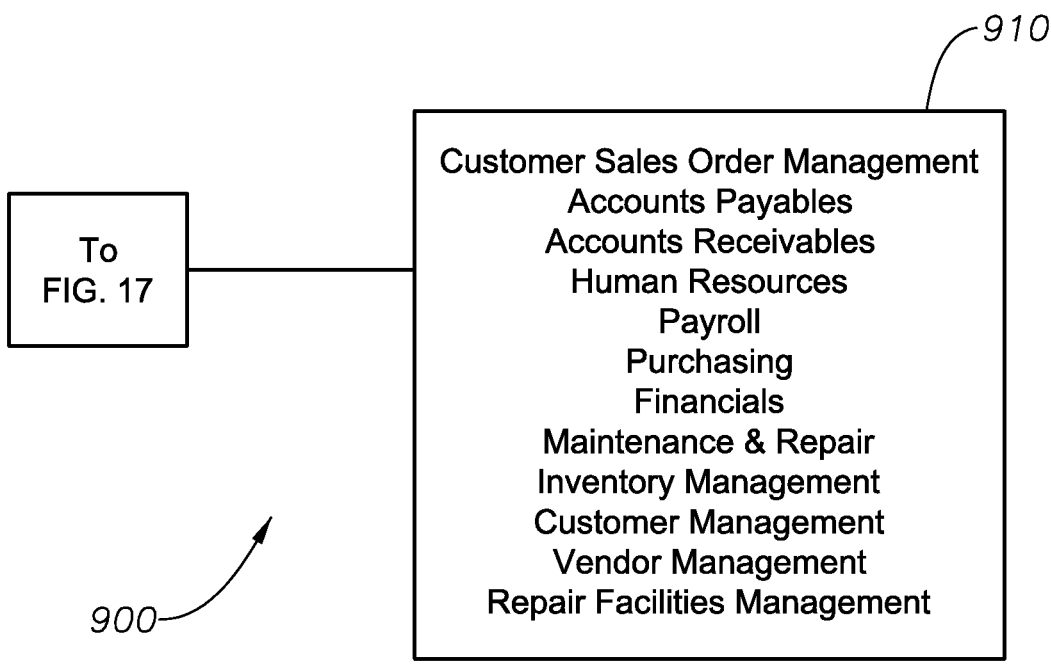
FIG. 25 is a schematic view of a remaining standard module of FIG. 17.

Referring now to FIG. 25, a remaining standards module 900 is illustrated in which the following information in step 910 is shown being uploaded to the business systems database 101 of FIG. 17: customer sales order management, accounts payable, accounts receivables, human resources, payroll, purchasing, financials, maintenance and repair, inventory management, customer management, vendor management, repairs and facilities management.

Figure 26:
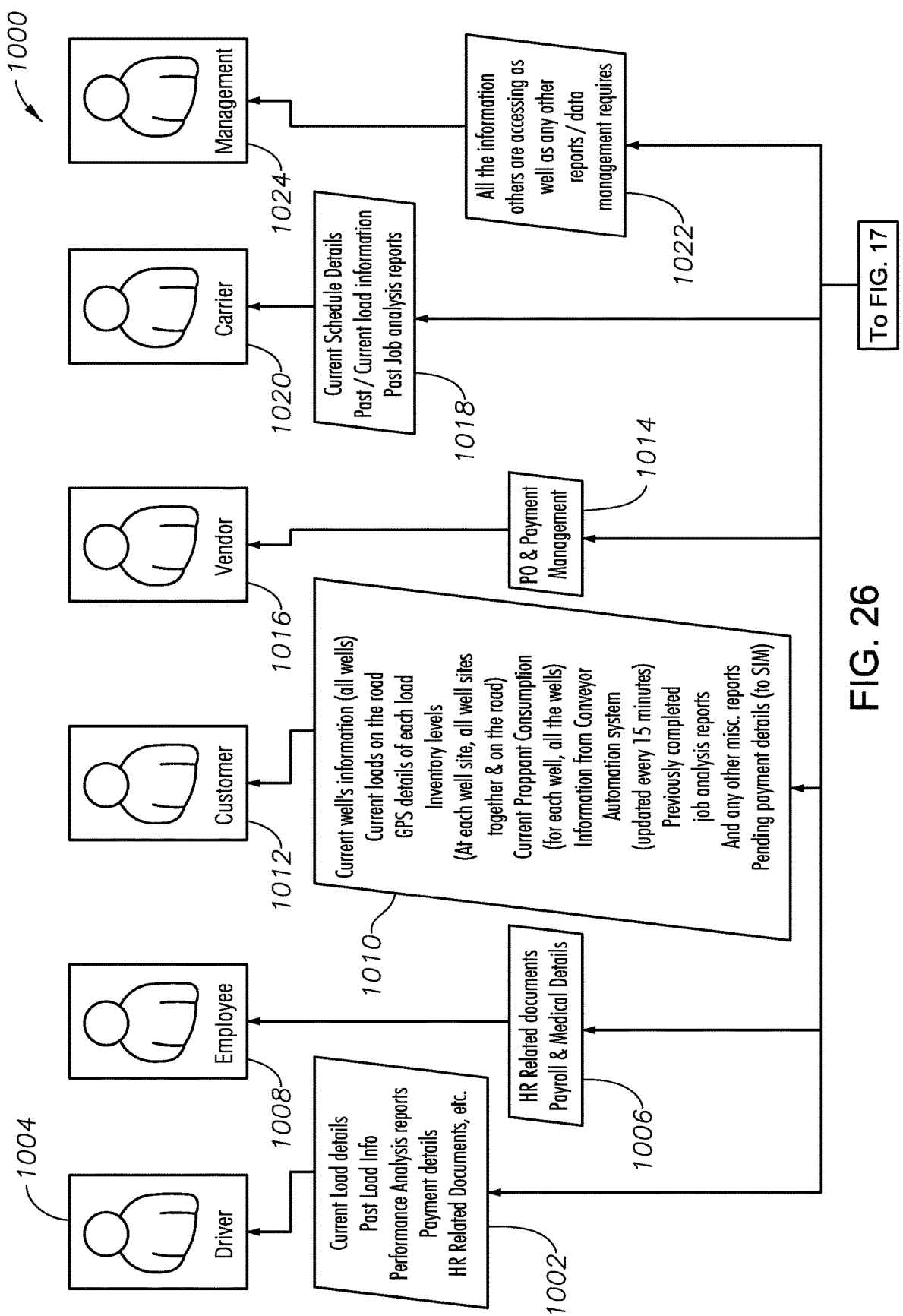
FIG. 26 is a schematic view of an information management system work flow module of FIG. 17.

In FIG. 26 an information management system workflow module 1000 is illustrated and reflects information that is received in from the SIMS (cloud/web) database 103 of FIG. 1. In initiation step 1002, the current load details, past load info, performance analysis, reports, payment details, and HR-related documents are received and which can be transmitted to driver 1004. In step 1006 HR-related documents, payroll, medical details are received from database 103 (FIG. 1) and which can be accessible or transmitted to employee 1008. In step 1010, the following information is received from database 103: current well information, current loads on the road, GPS details of each load, inventory levels at each well, all well sites together and on the road, current profit consumption for each well and all the wells, information from conveyor automation system (updated every 15 minutes), previously completed job analysis reports, other miscellaneous reports, pending payment details (to owner). This information is transmitted to customer 1012. In step 1014, purchase order and payment management information is received from database 103 and which can be transmitted to vendor 1016. In step 1018, current schedule details past forward current load information, past job analysis reports are received from database 103 and where they are selectively transmitted to carrier 1020. In step 1022, all information that may accessed by others, such as reports/data management requirements, can be transmitted to owner management 1024.

Still referring to the information management system, through highly interactive and sophisticated web application, customers, carriers, drivers, employees, dispatch, fleet, manufacturers, and vendors can communicate and retrieve the information required and generate analytical and performance reports. Users can also to perform basic operations of filling the forms or query certain data from different sources. For example, with regard to drivers, then can: (1) retrieve current assigned loads; (2) query past loads; (3) obtain past payment information; (4) obtain current, balance due (pending payment) details; (4) obtain analysis reports; (5) maintain contract management: (6) download miscellaneous queries and reports; (7) obtain human resources related activities. Carriers may: (1) apply to become an approved carrier; (2) bid for open jobs; (3) accept/reject loads; (4) communicate with dispatch and loading and destination facilities; (5) track the equipment through web mapping tools; (6) communicate with accounts payables; (7) upload all load related documentation for billing; (8) retrieve the data regarding past, current and future jobs; (9) obtain performance analysis reports; (10) perform driver management; (11) perform load management; and (12) perform billing and payment management. The discloses system enables employees to: (1) perform human resources related activities; (2) leave management; (3) obtain payroll details; (4) obtain personal health details; and (5) perform 401k management. In an example dispatch can: (1) manage drivers; (2) communicate with drivers and carriers; (3) communicate with loading facilities and well sites; (4) manage billing; (5) manage loads; (6) perform carrier payment management; (7) perform equipment inventory management; (8) monitor geofence activities and control the loads accordingly; (9) communicate with carriers/drivers with any changes to the loads, facilities, routes and proppant volumes; and (10) monitor pump schedule form various customers. By implementing this system 10, customers can: (1) post job details; (2) invite carrier quotes; (3) select and approve the bids and assign loads to carrier(s); (4) upload the schedule with well details, loading facilities information, proppant details, equipment required, dates, etc.; (5) track the equipment assigned for all of their jobs at all well sites in all regions, or individually; (6) monitor the inventory levels at all well sites, based on the available information (gathered by conveyor control systems, e-tracks and owner); (7) monitor the proppant consumption in real time; (8) update proppant details on the fly based on the job requirements; (9) inquire about the equipment, parts, load details; and (10) generate past, present job analysis reports. Further, owner management can perform all above mentioned tasks as we as generate custom made reports required by management team.

Examples of the application described herein include the ability to perform multiple tasks, such as the owner, customers, carriers, drivers, employees, dispatch and fleet, can report, communicate, retrieve and query the information deemed necessary. Parties can optionally communicate and retrieve the information required and generate analytical and performance reports. Users would also be able to perform basic operations of filling the forms or query certain data from different sources. For example, with respect to drivers, using the application they can: (1) retrieve current assigned loads; (2) choose the load (dispatched by dispatch team); (3) upload box, chassis, proppant details against the issued control ID; (4) report the departure time; (5) report the arrival time; (6) report exceptions; (7) upload load documents (pictures, files); (8) query past loads (limited records); (9) query past payment information (limited records); (10) obtain current, balance due (pending payment) details; (11) analyze reports; (12) obtain miscellaneous queries and reports; and (13) conduct limited human resources related activities. With the application carriers can: (1) bid for open jobs; (2) accept/reject loads; (3) communicate with dispatch and loading and destination facilities; (4) track the equipment through mapping tools; (5) communicate with accounts payables; (6) retrieve the data regarding past, current and future jobs; (7) obtain performance analysis reports; (8) driver management; (9) load management; (10) billing and payment management. With the application employees can: (1) perform human resources related activities; (2) leave management; (3) obtain payroll details; (4) obtain personal health details; and (5) manage their 401k. Examples of dispatch using the application include: (1) communicate with drivers and carriers; (2) track the equipment; (3) monitor the inventory levels; (4) monitor geofence activities and control the loads accordingly; (5) manage the changes to the loads, facilities, routes and proppant volumes; and (6) monitor pump schedule. Customers can use the application to: (1) post job details; (2) invite carrier quotes; (3) select and approve the bids and assign loads to carrier(s); (4) upload the schedule with well details, loading facilities information, proppant details, equipment required, dates, etc.; (5) track the equipment assigned for all of their jobs at all well sites in all regions, or individually; (6) monitor the inventory levels at all well sites, based on the available information (gathered by conveyor control systems, e-tracks and owner); (7) monitor the proppant consumption in real time; (8) update proppant details on the fly based on the job requirements; (9) inquire about the equipment, parts, load details; and (10) generate past, present job analysis reports. Owner can perform all tasks mentioned above, as well as generate custom reports that may be required by management team.

Disclosed herein is automated control system for a sand delivery system that delivers an accurate, consistent flow of different sand types while regularly updating a database, such as described above, with information. Software has been created to support the functionality of tasks described herein, as well as control interfaces for integrating data flow between owner equipment and software systems. Example applications of the system and method described herein include: a process for integrating this technology for managing a proppant logistics chain, a process for managing inventory and tracking assets employed by an owner process and equipment set, a process for sourcing trucking assets in a reverse auction that is dedicated to owner processes, a process for sourcing trucking assets in a reverse auction that is dedicated to owner processes, and a process for transferring data to and from customers and between drivers and owner.

Each box can include an upper hopper and a lower hopper. In embodiments, a cradle can hold up to four boxes at a time. It will be understood that a cradle can be configured to hold different quantities of boxes as well. For example, the cradle can hold between 1 and 10 boxes depending on the size of each box and a user's needs. Each box can feature a two-position outlet gate that, when open, allows sand to flow into a lower hopper. In addition, each box uses input/output channels to control and monitor the position of the outlet. The input/output channels can include one or more of an analog voltage output channel to actuate the gate, a digital input to detect when the gate is open (up), and a digital input to detect when the gate is closed (down). When a box is loaded onto a cradle, a user can optionally open and close the gate to the upper hopper. For example, this function can be accomplished via a virtual push-button on the client i.e. a touch screen. It will be understood that the gate can be opened or closed via other means as well, including, for example, mechanical means. When the gate is closed, the channel will output a user-specified minimum voltage, thereby to close the hydraulic valve. A physical limit switch is engaged, thereby sending a voltage to the "Hopper Down" digital input to inform the user of the gate status. When the gate is open, the channel will output the user-specified maximum voltage, thereby closing the hydraulic valve. A physical limit switch can be disengaged, thereby sending a voltage to the "Hopper Up" digital input to inform the user of the gate status.

Regarding the cradle-mounted lower hopper, below each box is a second, continuously variable gate to provide an adjustable flow of sand from the box to the conveyor. A linear displacement sensor and electronically controlled hydraulic valve provide the process and manipulated variables (respectively) for a proportional-integral-derivative (PID) control loop that will ensure the accurate position of each gate. Each box can use one or more of the following input/output channels to control and monitor the position of the outlet: an analog voltage output channel to actuate the gate, and an analog voltage input channel to detect the position of the gate. When a box is loaded onto a cradle, the user/operator can have the option to open the lower hopper gate to some degree via a virtual knob or slider on the client e.g. a knob or slider on a touch screen. This control can determine the set-point of the control loop that varies the output voltage to the actuator. A linear displacement sensor returns an analog voltage proportional to the position of the gate. This voltage is scaled between its user-defined minimum and maximum values before being used as the process variable in the PID loop. It will be understood that various means can be used to determine voltage ranges for the controls and sensors.

In addition, each box position on the cradle features a load cell to detect the weight of each box. This data will not only be used to detect whether there is a box loaded onto that position, but to inform the operator of the level of each box. This information will be useful in determining which boxes need to be replaced, the mass flow rate from each box, the concentration of different sand types and the total delivery rate. Each load cell requires a 4-20 milliAmpere analog current input to the control system.

The user-defined minimum current value will indicate when there is no box loaded onto that cradle slot. A current value proportional to the weight of an empty box will be stored as the threshold to sense when a box needs to be replaced. The specific gravity of each sand type should be known before any level, rate, or concentration calculations can be performed. The user will be given a configurable sand type input list so that the name, SGU, and other important details can be stored in the control system. The user must enter this information manually if the RFID, SCS, or backup USB systems are not functioning. Each time a new box is loaded onto the cradle the correct sand type should be specified to ensure accurate readings. Once a box is loaded and its correct sand type is selected, the system will use the detected weight to indicate how much sand is in the box initially. With this information the system will display the level of sand, calculate mass flow rate out of the box, and concentration of the total sand delivered. A low sand alarm can notify the forklift operator to prepare for a box change. In embodiments, RFID tags can be implemented on each box to automatically indicate sand type, SGU, or other sand properties. In addition, a densitometer can be implemented to more accurately determine sand concentration.

As noted above, a conveyor belt can be implemented according to embodiments of a system. The lower hopper at each box can dump sand onto a conveyor belt that delivers it to the back of the unit where it is carried up to a discharge chute. The conveyor belt is driven by an electronically controlled hydraulic motor located at the rear of the unit just before the chute. A rotary encoder provides feedback on the speed of the belt and a sensor indicates whether the belt is running forward or in reverse. The encoder and hydraulic motor provide the process and manipulated variables (respectively) for a PID control loop that ensures the speed of the belt. The conveyor belt uses the following one or more of the following input % output channels to control and monitor its speed and direction: an analog voltage output channel to control the variable-speed hydraulic motor, and one or more (e.g. three) digital inputs to detect pulses from the A&Z channels on the encoder, as well as the forward-reverse sensor on the belt.

A speed control knob or slider on the client can determine the set-point for the belt speed PID loop. Properly tuned the loop will accelerate the belt to the desired speed. Pulses from the rotary encoder can be sampled and the frequency feedback will be used to maintain the speed of the belt. Belt direction will be set by virtual push buttons on the client. As the belt changes direction a sensor will return a signal to update the client. In embodiments, the number of pulses or revolutions on the encoder can be user-specified. In other embodiments, this number is set according to a program product's internal logic. It will be understood that the encoder can be mounted to a roller of varying diameter. In addition, in embodiments there can be a master PID loop to relate the belt speed and lower hoppers to maintain a certain concentration and mass flow rate.

Regarding the engine and hydraulic system, actuators and belt drives on the unit can be controlled by a hydraulic system that is powered by a diesel engine towards the rear of the unit. The ECU can outfitted with CAN capabilities allowing the control system to communicate with the engine. The system can use one or more of the following IO channels: one output channel to signal the greaser (analog or digital with relay); one analog current output to receive a hydraulic system pressure signal; and CAN port to communicate with the ECU. Timed greaser logic will allow the user to set a wait and duration time for the greaser module. A tab on the client will display parameters of the engine and hydraulic system, including the hydraulic system pressure, which is scaled from the input current signal from a pressure transducer. CAN messages will be parsed and displayed under the engine section of the client. Certain commands will also be able to be sent to the engine if needed. It will be understood that various parameters can be displayed to the user and various commands can be sent to the engine. In addition, various signal types can be sent to the ECU. These include, but are not limited to, voltage, CAN, and digital signals. If digital signals are used, for example, the digital signals can include a switch for throttle up and throttle down.

In addition, various system features relate to data management. For example, the system can include RFID BTAG cards and readers. An RFID tag can be installed on each box for identification. The cradle will acknowledge the presence of each box with both RFID verification and current detection from the load cells. The serial number on each tag will correspond to data about each box in the user's corporate systems which the system will query as soon as the cradle detects that a box is present. This system can work in conjunction with the following hardware: one RFID tag per box; and four RFID readers per cradle (Ethernet or serial connectivity).

Figure 27:
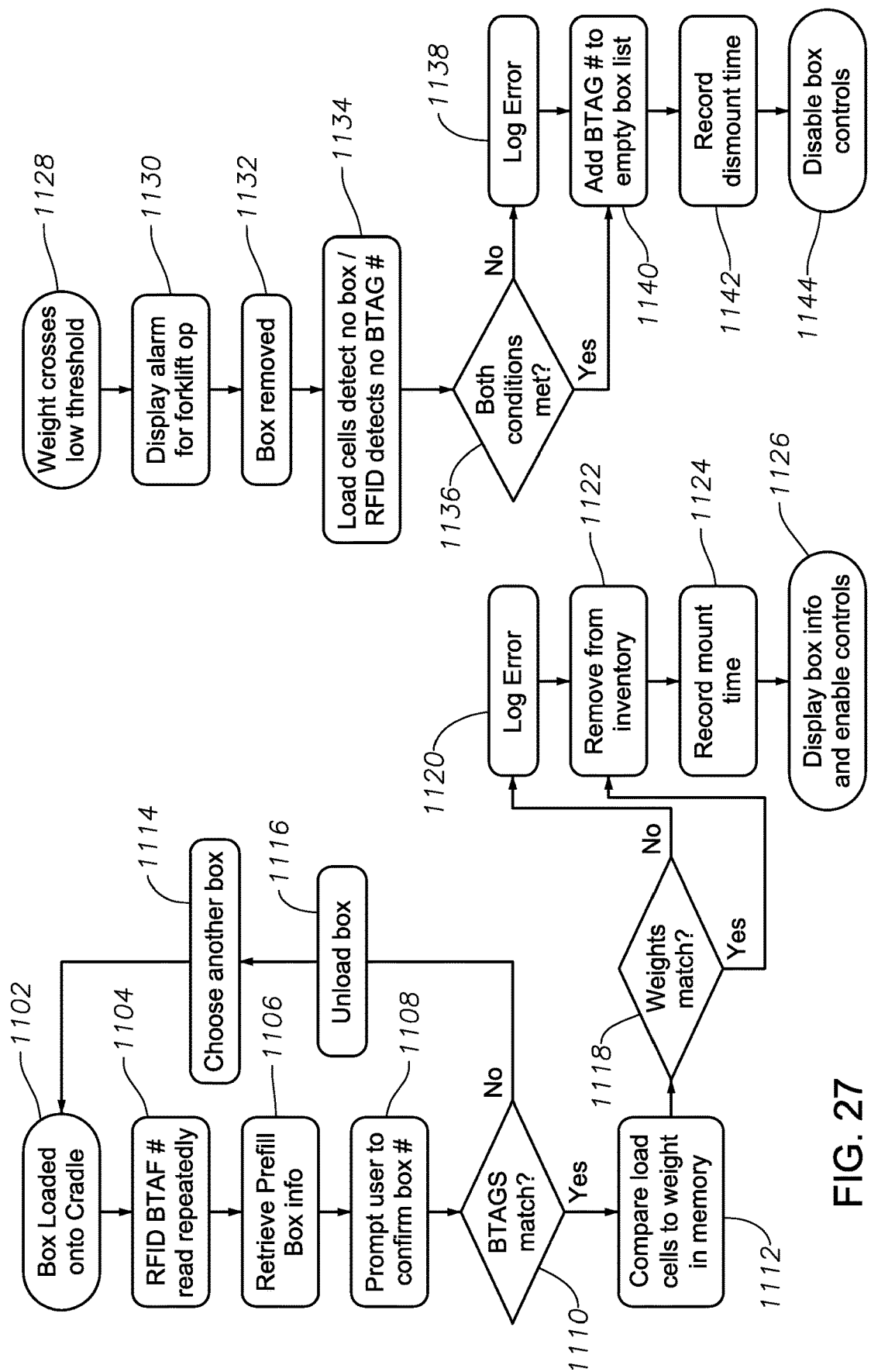
FIG. 27 is a schematic view of a box mounting sequence and box dismounting sequence.

FIG. 27 illustrates an exemplary box mounting sequence and box dismounting sequence. For example, a box can be loaded onto cradle 1102. The RFID BTAG number can be read repeatedly 1104. The prefill box information can be retrieved 1106. Then, the system can generate a user prompt for confirmation of the box number 1108. A determination is then made whether the BTAGs match 1110. If not, the box is unloaded 1116 and another box is chosen 1114, and then the new box is loaded onto the cradle 1102. If the BTAGs match then the system compares load cells to weight in memory 1112. If the weights match at 1118 then the box is removed from inventory at 1122. If not, an error is logged 1120 and then the box is removed from inventory 1122. Then the mount time is recorded 1124, and the box information is displayed and controls are enabled 1126.

An exemplary dismounting sequence also is illustrated in FIG. 11. If a weight crosses a low threshold 1128, an alarm is displayed to a forklift operator 1130. Then the box is removed at 1132. If load cells detect no box or the RFID detects no BTAG number 1134, then a determination step occurs at 1136. If both of these conditions are not met, an error is logged at 1138 and the BTAG number is added to the empty box list 1140. If both conditions are met at 1136, then no error is logged and the BTAG number is added to the empty box list 1140. A dismount time is then recorded 1142, and the box controls are disabled 1144.

Once a box is loaded onto the cradle the tag reader will continuously receive the serial number (BTAG number) of that box at the baud rate of the specific RFID reader. As long as the box is loaded onto the cradle the BTAG number is periodically detected. When the software no longer detects a BTAG number it will compare the reading from the load cells to the Empty Box Tare Weight. If these values correspond, then a RFID tag error will be displayed to the user and logged to user corporate systems. If the load cells detect weight less than the specified empty box weight then the system acknowledges that the box has been removed.

Additional features of embodiments of the invention relate to pre-job inventory updating. When the cradle is powered up at the start of each job the user is prompted to enter both the Box Job Number (BJN) and the Well Number (WN). The system will then connect to the user corporate systems to confirm the same values are in the database. The control system should then retrieve data regarding the boxes available on site and the types of proppant they contain.

Figure 28:
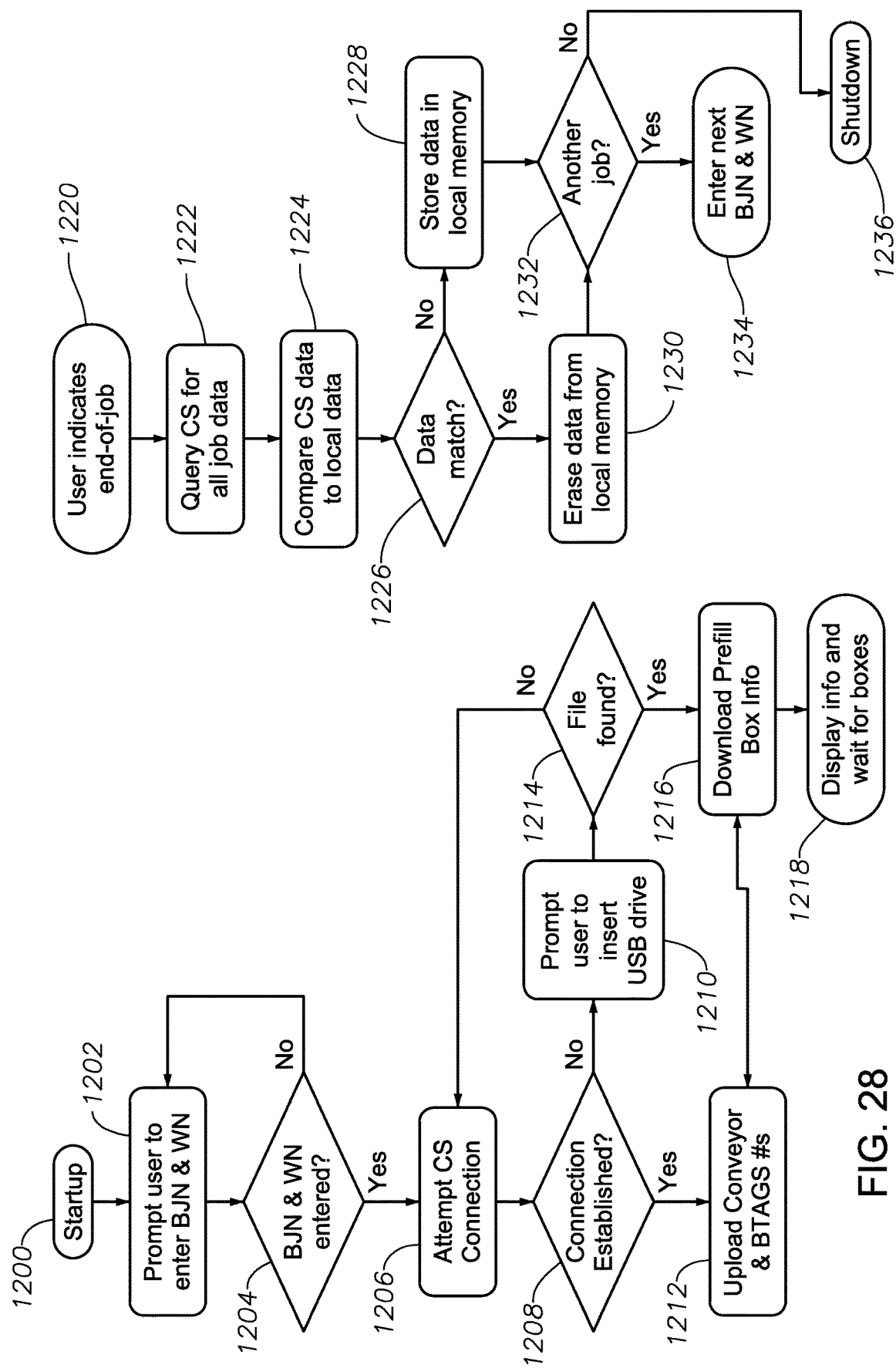
FIG. 28 is a schematic view of a box startup sequence and box shutdown sequence.

For example, FIG. 28 illustrates an exemplary box startup sequence. A startup at 1200 then prompts a user to enter a box job number and well number 1202. A decision is made whether these are entered 1204. If not, another prompt is generated 1202. If so, a connection is attempted 1206. If a connection is established 1208, the conveyor and BTAG numbers are uploaded 1212 and the prefill box information is downloaded 1216. If the connection is not established at 1208, then the user is prompted to insert a USB drive 1210. One or more of the following values can be entered from a USB drive: Box Job Number (BJN), Well Number (WN), BTAG Number, Box Gross Weight, Empty Box Tare Weight, Proppant Type, Proppant Tare Weight, types of proppants on site, number of boxes of each proppant type, total net weight of each proppant available on site. Similarly, before the job starts the following pieces of information can be uploaded to the corporate system: Conveyor Unit Number, serial numbers of the first four boxes. Then a determination is made whether a file is found 1214. If not, another attempt is made to connect to the corporate systems at 1206. If so, then the prefill box information is downloaded 1216. The information is then displayed and a user waits for the boxes 1218.

FIG. 28 also illustrates an exemplary box shutdown sequence. First, a user indicates the end of a job 1220. The corporate systems are queried for all job data 1222. The corporate system data is then compared to local data 1224. A determination is made whether the corporate system data and local data match 1226. If so, the data are stored in local memory 1228. Then a determination if made if there is another job 1232. If the data do match at 1226, then data is erased from local memory at 1230, and a determination is made if there is another job at 1232. If there is another job, then the next box job number and well number are entered at 1234, which can return a user to 1202 in the process. If there is not another job, then the system shuts down 1236.

In addition, features of embodiments of the invention relate to continuous database updating and querying. While the job is running and the software is connected to corporate systems, a number of data channels can be passed back-and-forth at regular time intervals. If the software is unable to connect to the corporate systems for whatever reason, the information collected can be stored on local memory until either a connection is made or the data is transferred to an external USB drive.

Figure 29:
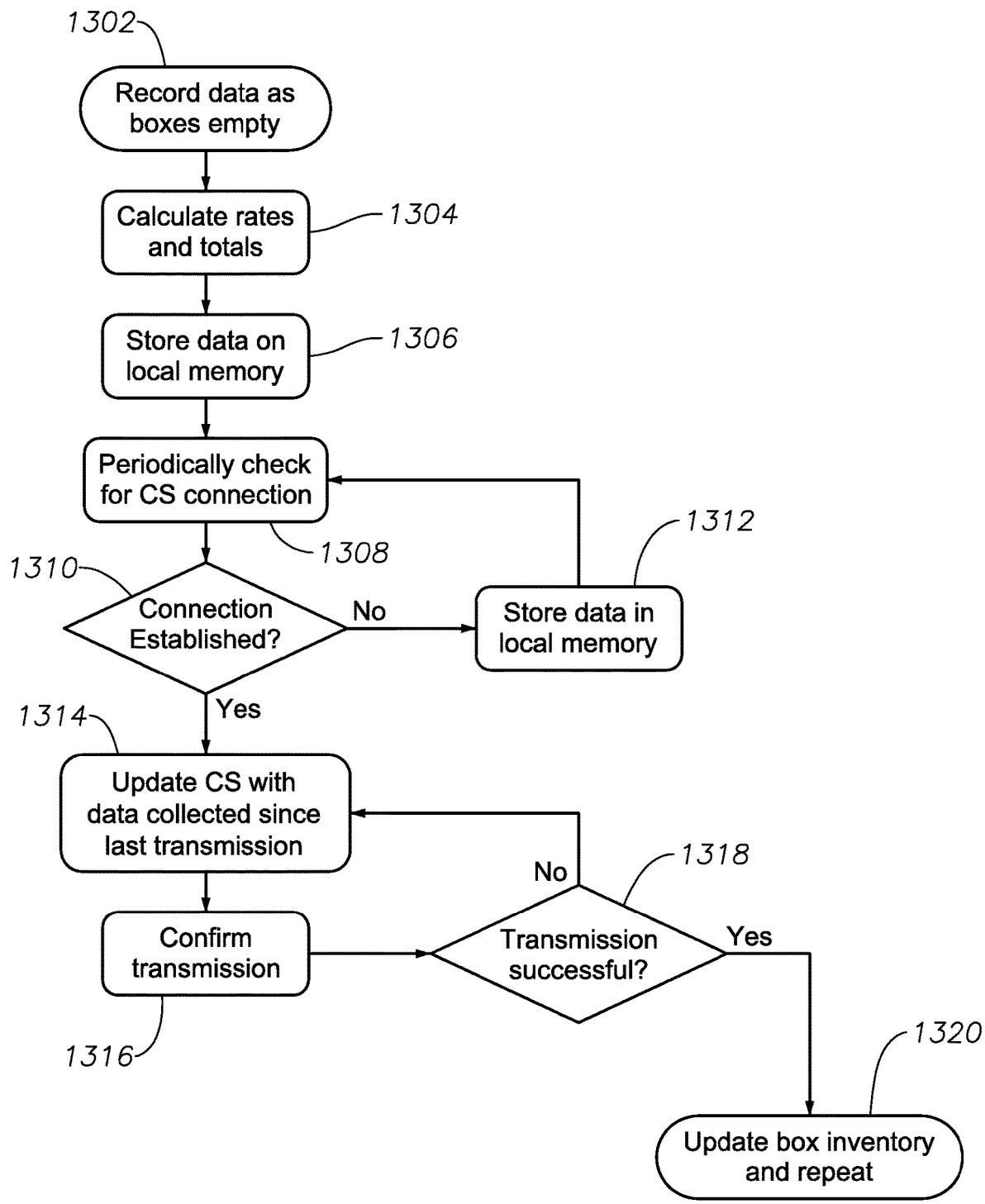
FIG. 29 is a schematic view of a box data management sequence.

FIG. 29 illustrates an exemplary box data management sequence. For example, data can be recorded as boxes are emptied 1302. Boxes and proppant types en route to the well site are regularly updated and displayed to the user. The data can be used to calculate rates and totals 1304. The data then can be stored on local memory 1306. The system can periodically check for a connection to the corporate systems 1308. A determination is made as to whether a connection has been established 1310. If not, the data can be stored in local memory 1312 and a connection can again be checked for periodically 1308. If a connection has been established, the corporate systems can be updated with data collected since the last transmission 1314. The update can include the following information: the time a box is placed onto the cradle, the time a box is taken off the cradle, the hopper number, the speed at which the proppant was discharged and total discharge time. Additionally, the following data channels can be updated at regular time intervals: total consumption of all types of proppants, total consumption for each type of proppant, total number of boxes for all types of proppants consumed, total number of boxes for each type of proppant, Conveyor Unit Number, Hopper Number each box was put on, time each box was put on the hopper, time each box was taken off of the hopper, start time of proppant discharge on the hopper of each box, end time of proppant discharge on the hopper of each box, speed at which proppant was being discharged, any stop and go (discharge) timings should be recorded as well, how much proppant still left in each box while it is being discharged, whether entire proppant was discharged from the box or not, how much proppant was discharged into the blender hopper, how much proppant is still inside conveyor hoppers or on the belt. Additionally, any issues with the conveyor, boxes, or proppant, should be recorded and transmitted with the corporate systems. User-selected channels should be sent to the customer's data van or data center for analysis. Then transmission is confirmed 1316. A determination is made whether the transmission was successful 1318. If not, another attempt is made to update the corporate systems with data collected since the last transmission 1314. If the transmission was successful then the box inventory is updated, and the process is repeated 1320. Once the data is confirmed to have been successfully transmitted to another location, it should be cleared from local memory to leave room for the next job.

Additional aspects of the invention relate to external interface requirements. The system relies on the consistency of supplied electrical power, the condition and integrity of the components, the operation of the IC engine, and the competency of the user. The accuracy of the encoder with regards to the mass flow rate of sand relies on the assumption that the conveyor belt does not slip or stretch on the roller to which the encoder is mounted. The calculated mass flow rate based on the change in signal from the load cells assumes that none of the sand is spilled, stuck, or wasted in any way before leaving the chute. The information in the corporate systems database is consistently accurate and available.

Figure 30A:
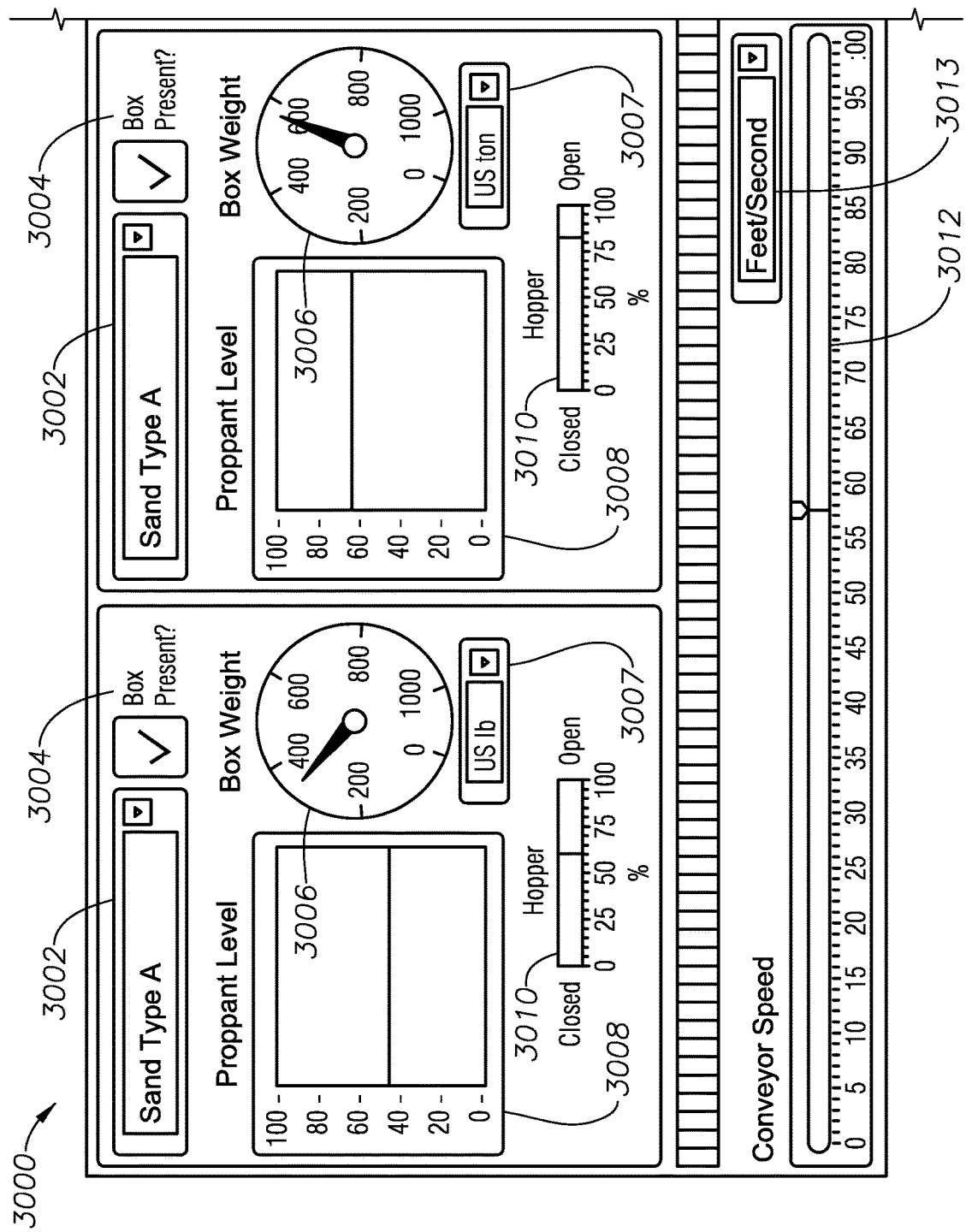
FIG. 30 is an exemplary interface panel.
Figure 30B:
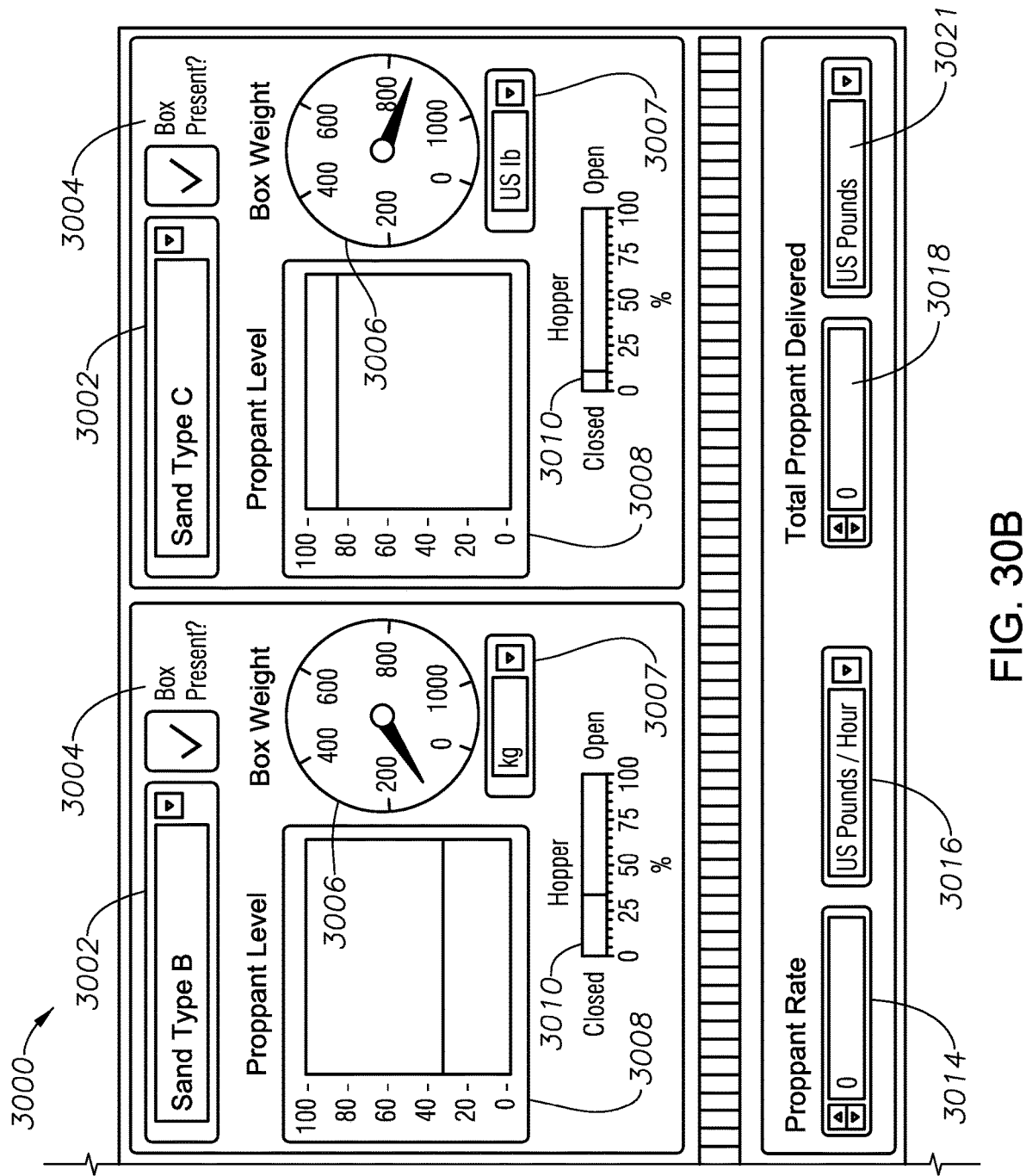

The two platforms on which the user will communicate with the software are the physical controls and the interface front panel 3000, for example, as shown in FIG. 30. Until now, all of the hydraulic valves have been operated manually. Manual control can still be made possible, but through the use of electronically controlled hydraulic valves, almost all of the hydraulic fluid routing can be controllable from the front panel.

An exemplary interface front panel 3000 can generate data indicating sand type 3002, whether a box is present 3004, box weight 3006 (with the option to define units 3007), and proppant level 3008. Advantageously, an interface front panel also can show by percentage or another metric the degree to which a hopper is open or closed 3010. In addition, conveyor speed 3012 can be displayed, again with conveyor speed units 3013 adjustable. Moreover, proppant rate 3014 can be displayed, and the proppant rate units 3016 can be adjusted. Likewise, the total proppant delivered 3018 can be displayed, and the units 3020 can be adjusted.

The user has the ability to update minimum and maximum values as well as other configuration parameters by accessing the a webpage. All hardware input and output routing can be handled, for example, by the FPGA. In embodiments, four NI C-series modules are used for all input/output in the system: 2 Channel CAN Module, 32 Channel Digital Module, 16 Channel Analog Input (V & mA) Module, 16 Channel Analog Output (V) Module, RFID Tag reader with Ethernet connectivity with 4 circularly polarized antennas, and Cell and Iridium satellite communication hardware.

Figure 31:
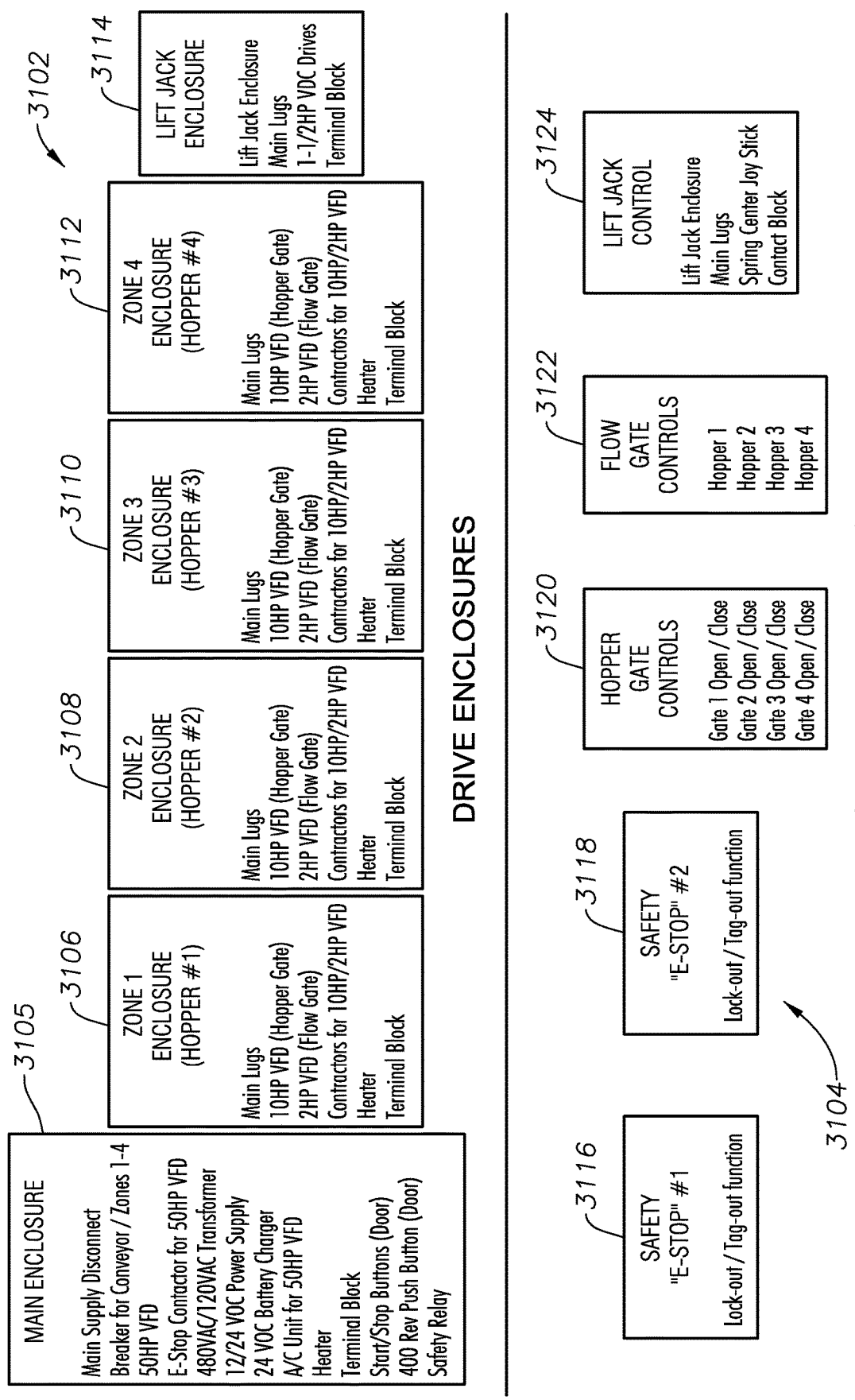
FIG. 31 is an exemplary controller diagram.
Figure 32:
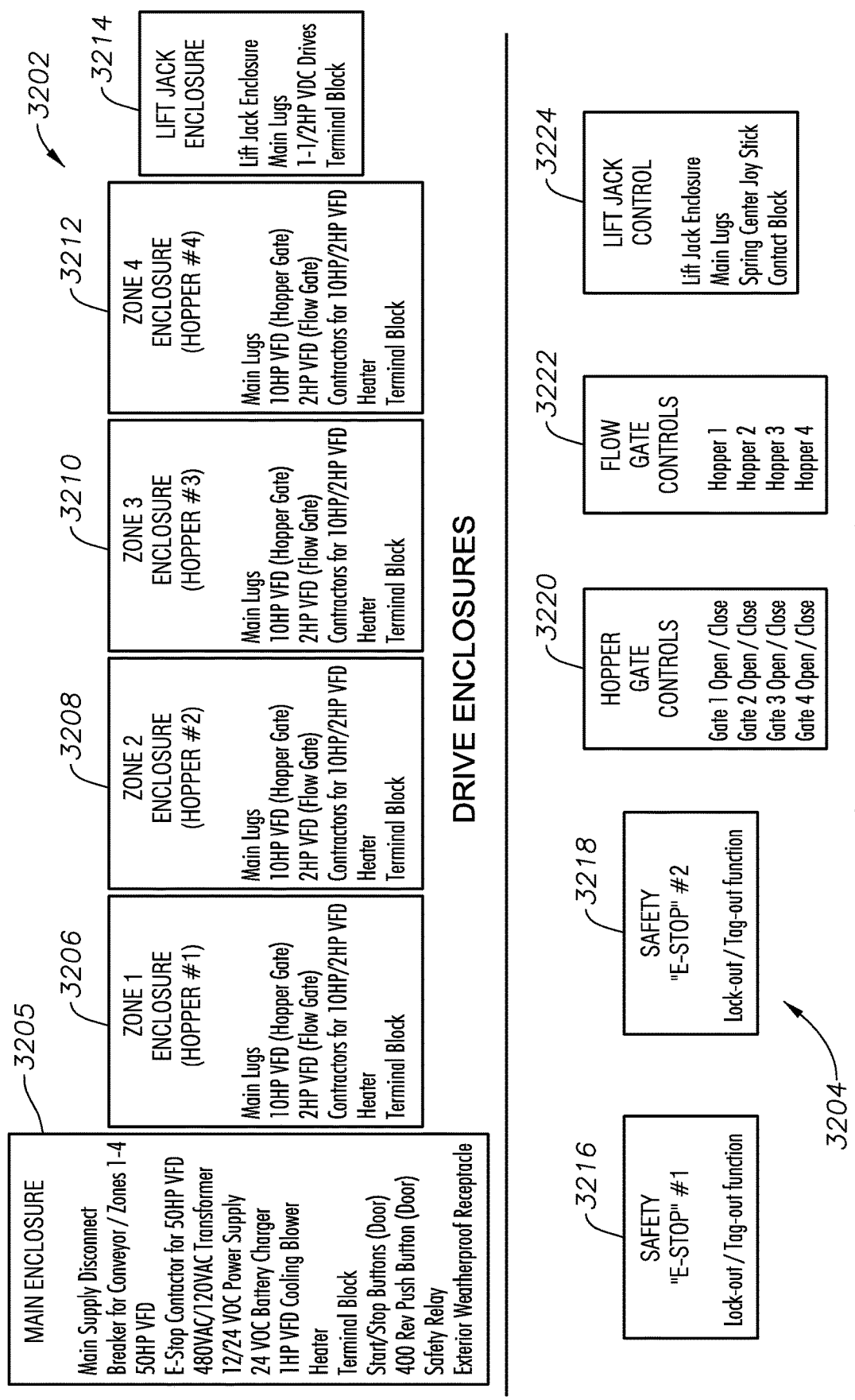
FIG. 32 is an exemplary controller diagram.
Figure 33:
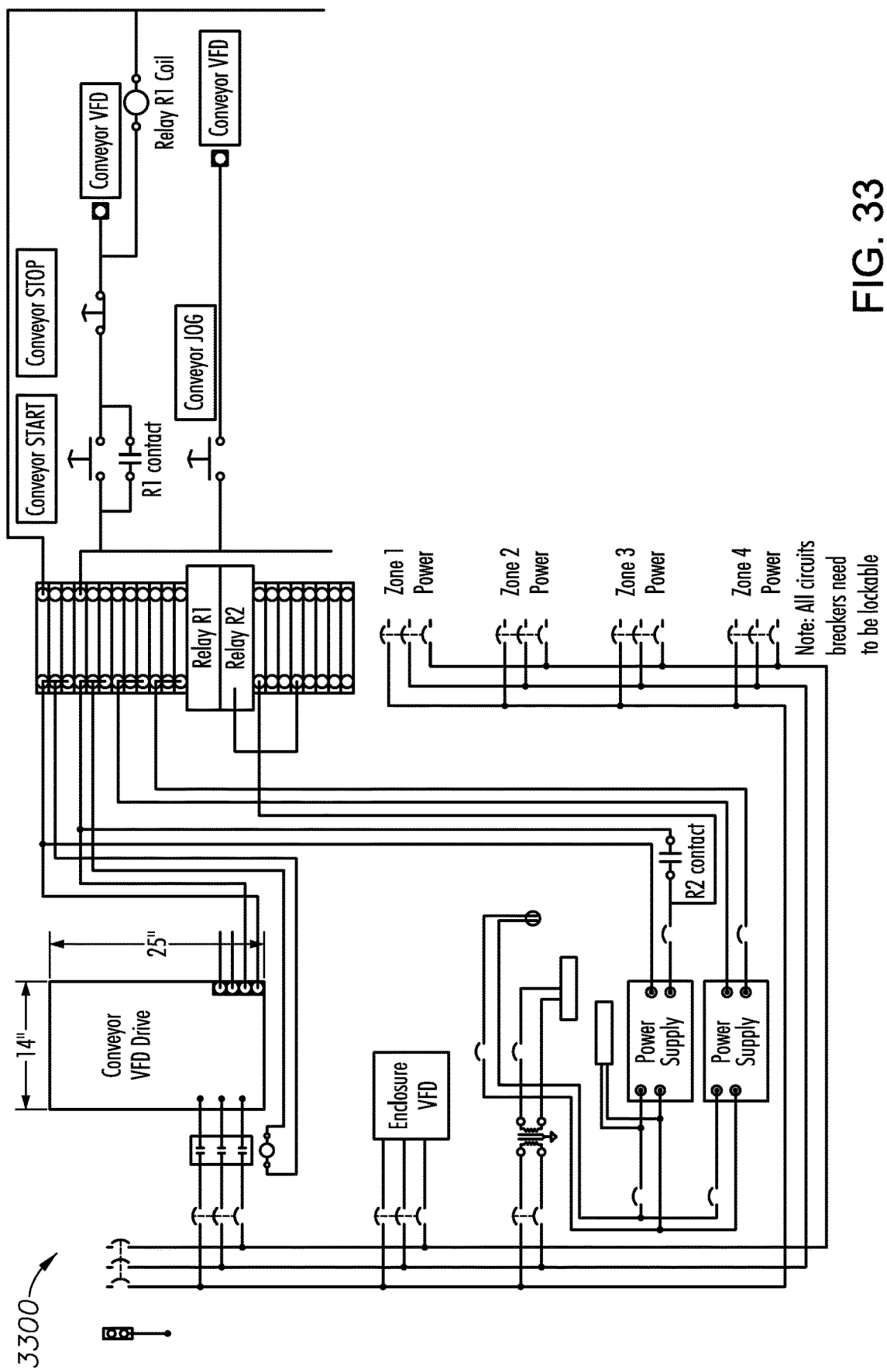
FIG. 33 is an exemplary circuitry diagram.
Figure 34:
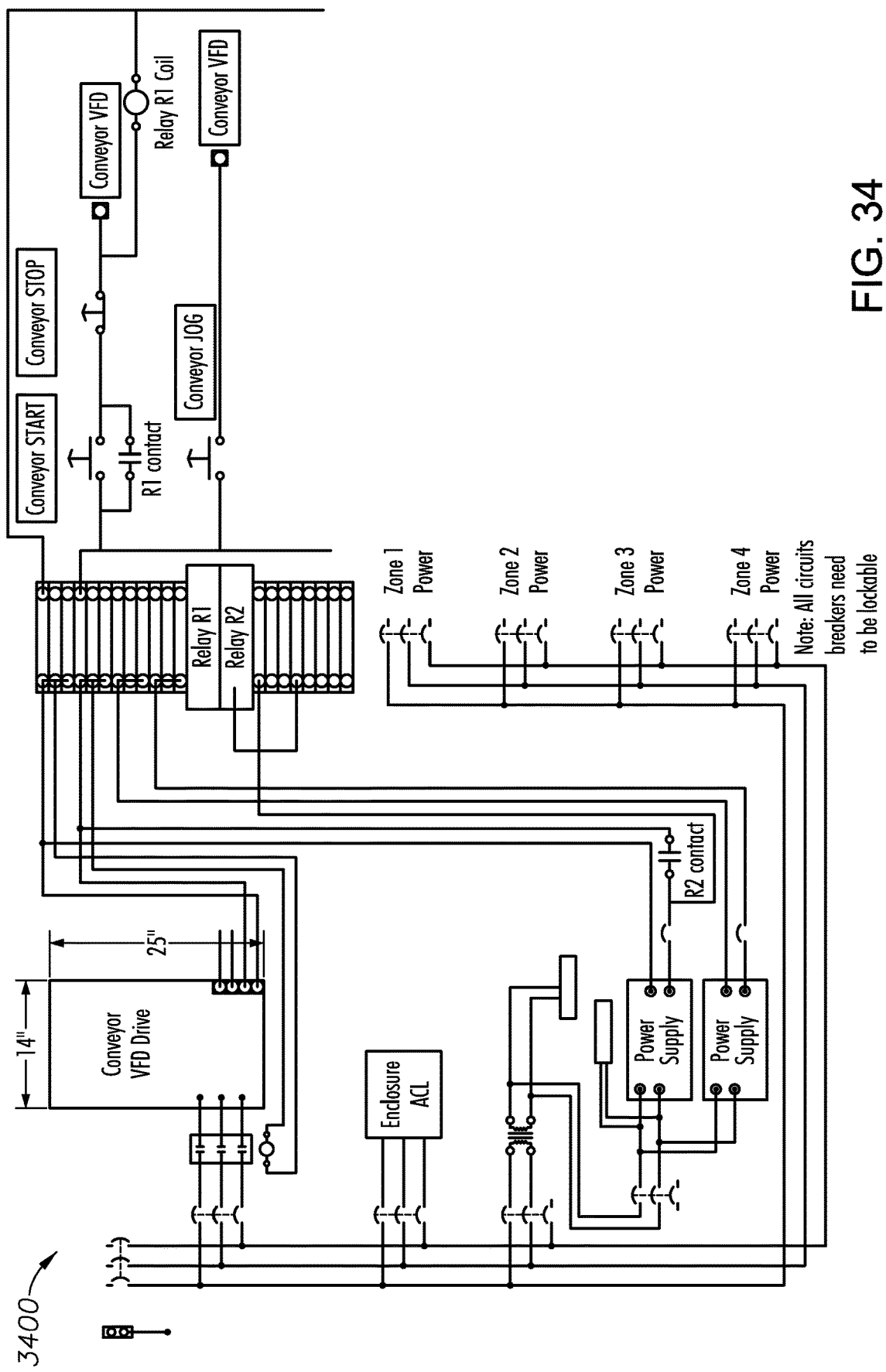
FIG. 34 is an exemplary circuitry diagram.
Figure 35:
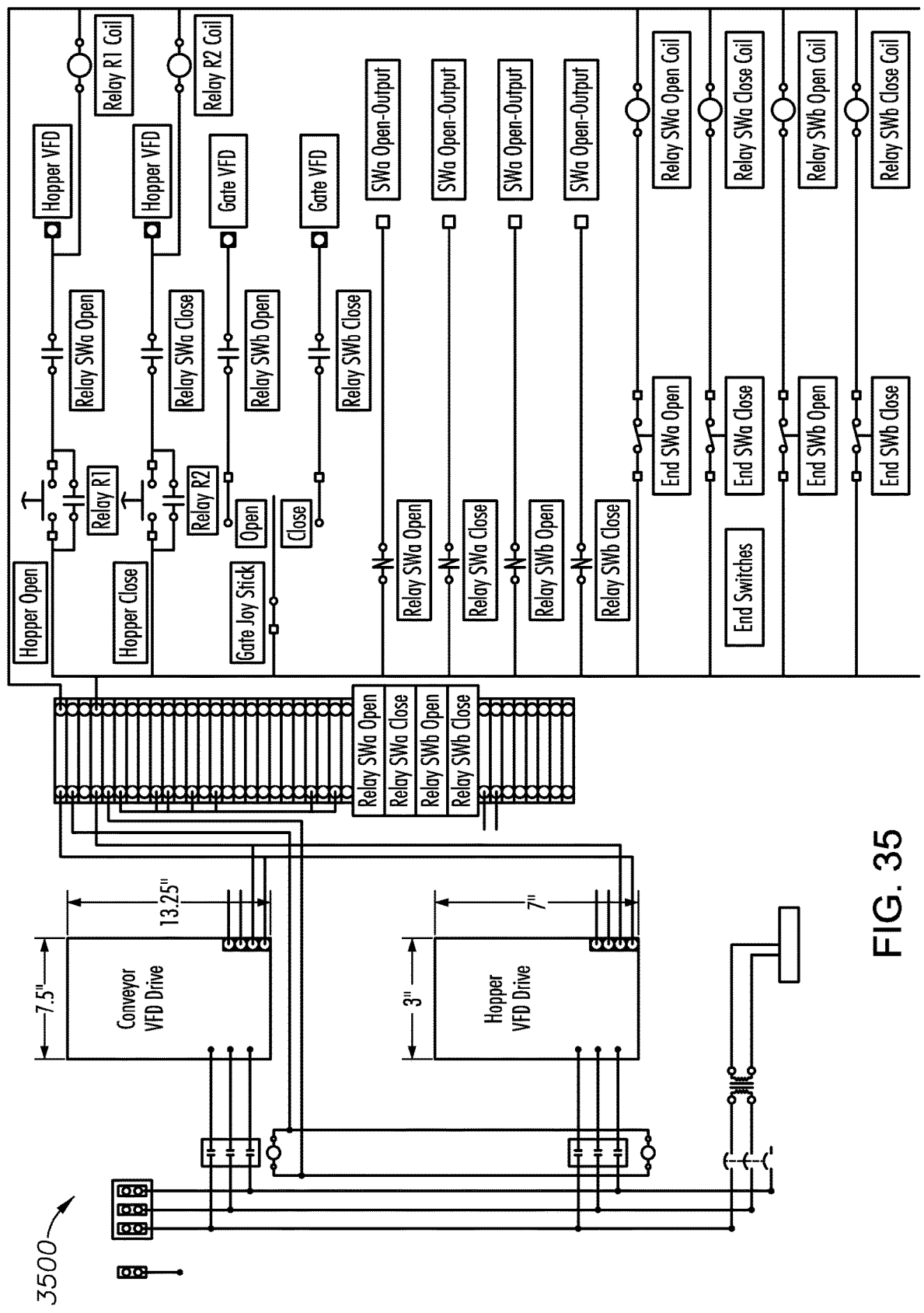
FIG. 35 is an exemplary circuitry diagram.
Figure 36:
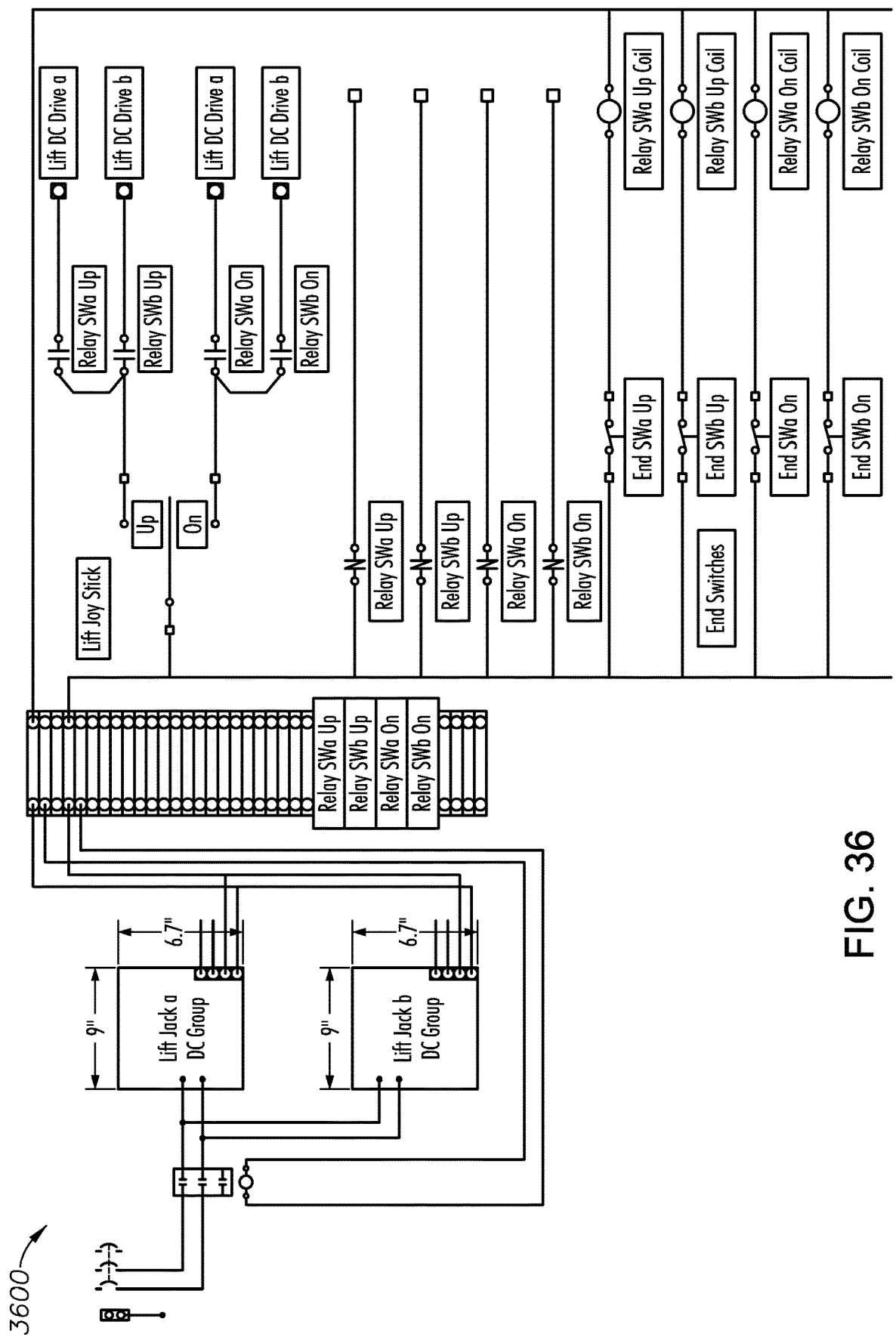
FIG. 36 is an exemplary circuitry diagram.

Drive enclosures and control stations are illustrated in FIG. 31 and FIG. 32, for example. Illustrated in FIG. 31, for instance, is an exemplary architecture of drive enclosures 3102 and control stations 3104. The drive enclosures 3102 can include a main enclosure 3105, zone enclosures for each hopper 3106, 3108, 3110, 3112, and a lift jack enclosure 3114. Control stations 3104 can include safety stop controls 3116, 3118, hopper gate controls 3120, flow gate controls 3122, and a lift jack control 3124. A trailer that incorporates one or more embodiments of the invention can include a main power connection supplied from a factory with Crouse-Hinds 200 amp Arktite heavy duty circuit breaking plug and receptacle. An exemplary power source rating can be 480 V/3 Ph/60 Hz/200 amp. Further, hopper top gate cylinders can be configured with (a) limit switch to signal open and closed positions: (b) transducer, 5000 ohm 10 turn potentiometer, to signal gate position (for future instrumentation by others); and (c) factory wiring of the transducer to terminal blocks in zone enclosures. Additionally, hopper bottom flow gate cylinders can be configured with: (a) limit switch to signal open and closed positions: (b) transducer, 5000 ohm 3 turn potentiometer, to signal gate position (for future instrumentation by others); and (c) factory wiring of the transducer to terminal blocks in zone enclosures. A conveyor motor drive can be equipped with a variable frequency drive. Further, the conveyor can be operated at a full speed of 700 FBM belt speed. Variable frequency drives can include, for example Siemens variable frequency drives and can be configured for Ethernet (e.g., a preselected Ethernet protocol). A trailer also can include manual controls, automated controls, or a combination of manual and automated controls. Additional hardware, wiring, cables, and programming can be added to baseline manual controls, for example, to provide automatic controls.

Illustrated in FIG. 32, for instance, is an exemplary architecture of drive enclosures 3202 and control stations 3204. The drive enclosures 3202 can include a main enclosure 3205, zone enclosures for each hopper 3206, 3208, 3210, 3212, and a lift jack enclosure 3214. Control stations 31204 can include safety stop controls 3216, 3218, hopper gate controls 3220, flow gate controls 3222, and a lift jack control 3224. For example, a trailer that incorporates one or more embodiments of the invention alternatively can include a main power connection supplied from a factory with Appleton 200 amp Powertite series plug and receptacle. FIGS. 33-36 show examples of various configurations of circuitry 3300, 3400, 3500, 3600 within the scope of the invention.

While different embodiments of the invention, including apparatuses, systems, and methods, have been shown or described in only some of its forms, it should be apparent to those skilled in the art that the invention is not so limited, but is susceptible to various changes without departing from the scope of the invention. Furthermore, it is to be understood that the above disclosed embodiments are merely illustrative of the principles and applications of the present invention. The business system overview 11 is applicable to not only proppant delivery in the oil and gas business, but also to any application pertaining to bulk commodity logistics and for a range of industries. Accordingly, numerous modifications may be made to the illustrative embodiments and other arrangements may be devised without departing from the spirit and scope of the present invention.

This application is related to and claims priority to, and the benefit of, U.S. Provisional Application No. 62/028,728, filed Jul. 24, 2014, titled "Computer Systems, and Computer Programs for Remotely Controlling Proppant Discharge System," U.S. Provisional Application No. 62/142,221, filed on Apr. 2, 2015, titled "Work Flow for Transporting Proppant," U.S. Provisional Application No. 62/143,692, filed Apr. 6, 2015, titled "Work Flow for Transporting Proppant," and U.S. Provisional Application No. 62/145,047, filed Apr. 9, 2015, titled "Work Flow for Transporting Proppant," each of which are incorporated herein in their entireties by reference.

That claimed is:

1. A method for controlled dispensing of proppant for a fracturing operation from a well bore at a fracturing site, the method comprising:

locating a plurality of proppant-filled containers at the fracturing site, each of the plurality of proppant-filled containers having a frame, an upper box section connected to the frame, a lower funnel section extending from the box section to an outlet adjacent a bottom region of the container and a gate movable between a first position covering the outlet and a second position opening the outlet, wherein each of the proppant-filled containers defines an interior volume storing the proppant therein;

receiving and inputting onsite inventory data into an operating system including box data and proppant details associated with a serial number for each of the proppant-filled containers at a control system, wherein the control system includes a processor, memory, and a remote control interface in communication with a conveyor controller via a communication network;

selecting a first container of the plurality of proppant-filled containers at the fracturing site based on the onsite inventory data of the first container, such that the box data associated with the serial number matches the onsite inventory data, for the fracturing operation stored in the memory of the control system;

positioning the first container on a top surface of a proppant delivery system to couple the gate of the first container with a first actuator affixed to a support structure, wherein the first actuator is operable to move the gate of the first container from the first position to the second position;

communicating a first control signal from the remote control interface to the conveyor controller for operating the first actuator to move the gate from the first position to the second position for gravity-feeding proppant from the first container into a hopper of the proppant delivery system;

communicating a second control signal from the remote control interface via the network to the conveyor controller for operating a second actuator to adjust a metering gate for gravity-feeding proppant from the hopper onto a conveyor of the proppant delivery system located below the metering gate, wherein the metering gate is adjustable to vary proppant discharged onto the conveyor;

communicating a third control signal from the remote control interface via the network to the conveyor controller for operating the conveyor at a conveyor speed to transport proppant along the conveyor to a blender hopper located at the end thereof;

measuring a process parameter indicating proppant discharged onto the conveyor;

determining a proppant consumption at the blender hopper based on the process parameter and the conveyor speed; and varying at least one of the second control signal and the third control signal to adjust the proppant consumption based on a desired rate of proppant delivery.

2. The method as defined in claim 1, further comprising:
varying the third control signal to alter the rate of proppant delivery.

3. The method as defined in claim 2, further comprising:
generating data during conveyor operation, the data indicating one or more of container loading information, container unloading information, total proppant discharged within a given time range, and proppant discharge rate.

4. The method as defined in claim 1, wherein each of the plurality of containers comprises a frame having a plurality of support bars associated with the pair of side walls and the pair of end walls of the container at locations between edges and corners of the container to enhance support of the pair of side walls and pair of end walls thereby to strengthen the container when fracking proppant is positioned therein.

5. The method as defined in claim 4, wherein the container comprises a ten foot ISO container, and wherein the plurality of support bars extend along exterior surfaces of each of the pair of side walls and each of the pair of end walls.

6. The method as defined in claim 1, wherein the remote control interface comprises a web-based platform to vary at least one of the second control signal and the third control signal.

7. The method as defined in claim 1, wherein positioning the first container on a top surface of a proppant delivery system further comprises locating a pin extending from the gate into a receptacle affixed to the first actuator for operatively coupling the gate to the actuator.

* * * * *